(12) United States Patent
Lindsley

(10) Patent No.: US 10,860,934 B2
(45) Date of Patent: *Dec. 8, 2020

(54) UNIVERSAL COGNITIVE GRAPH HAVING PERSISTENT KNOWLEDGE ELEMENTS

(71) Applicant: Cognitive Scale, Inc., Austin, TX (US)

(72) Inventor: Hannah R. Lindsley, Austin, TX (US)

(73) Assignee: Cognitive Scale, Inc., Austin, TX (US)

( * ) Notice: Subject to any disclaimer, the term of this patent is extended or adjusted under 35 U.S.C. 154(b) by 481 days.

This patent is subject to a terminal disclaimer.

(21) Appl. No.: 15/290,485

(22) Filed: Oct. 11, 2016

(65) Prior Publication Data

US 2017/0330094 A1 Nov. 16, 2017

Related U.S. Application Data

(60) Provisional application No. 62/335,970, filed on May 13, 2016.

(51) Int. Cl.
*G06N 5/02* (2006.01)
*G06N 5/04* (2006.01)
(Continued)

(52) U.S. Cl.
CPC .......... *G06N 5/02* (2013.01); *G06F 16/3329* (2019.01); *G06F 16/367* (2019.01); *G06F 16/84* (2019.01);
(Continued)

(58) Field of Classification Search
CPC .......... G06N 5/02; G06N 20/00; G06N 5/043; G06N 5/04; G06N 5/048; G06F 16/367;
(Continued)

(56) References Cited

U.S. PATENT DOCUMENTS 5,506,937 A * 4/1996 Ford .................. G09B 23/28
706/11
5,694,590 A 12/1997 Thuraisingham et al.
(Continued)

OTHER PUBLICATIONS

U.S. Appl. No. 15/290,485, filed Oct. 11, 2016.
(Continued)

*Primary Examiner* — Alexey Shmatov
*Assistant Examiner* — Tri T Nguyen
(74) *Attorney, Agent, or Firm* — Terrile, Cannatti & Chambers; Stephen A. Terrile

(57) ABSTRACT

A system comprising: a processor; a data bus coupled to the processor; and a non-transitory, computer-readable storage medium embodying computer program code, the non-transitory, computer-readable storage medium being coupled to the data bus. The computer program code interacting with a plurality of computer operations and comprising instructions executable by the processor and configured for: receiving data from a plurality of data sources; processing the data from the plurality of data sources, the processing the data from the plurality of data sources identifying a plurality of knowledge elements; and, storing the knowledge elements within the cognitive graph as a collection of knowledge elements, the storing universally representing knowledge obtained from the data, each knowledge element of the collection of knowledge elements being persisted in its original form.

12 Claims, 33 Drawing Sheets

(51) Int. Cl.
    *G06N 20/00*     (2019.01)
    *G06F 16/84*     (2019.01)
    *G06F 16/332*     (2019.01)
    *G06F 16/901*     (2019.01)
    *G06F 16/903*     (2019.01)
    *G06F 16/36*     (2019.01)
    *G06N 5/00*     (2006.01)

(52) U.S. Cl.
    CPC .... *G06F 16/9024* (2019.01); *G06F 16/90335* (2019.01); *G06N 5/022* (2013.01); *G06N 5/04* (2013.01); *G06N 5/043* (2013.01); *G06N 5/048* (2013.01); *G06N 20/00* (2019.01); *G06N 5/003* (2013.01)

(58) Field of Classification Search
    CPC ........... G06F 16/9024; G06F 16/90335; G06F 16/3329; G06F 16/84
    See application file for complete search history.

(56) References Cited

U.S. PATENT DOCUMENTS

| | | | |
|---|---|---|---|
| 5,926,784 A * | 7/1999 | Richardson | G06F 40/211 |
| | | | 704/9 |
| 6,038,560 A | 3/2000 | Wical | |
| 6,311,194 B1 | 10/2001 | Sheth et al. | |
| 6,516,308 B1 | 2/2003 | Cohen | |
| 7,027,975 B1 | 4/2006 | Pazandak et al. | |
| 7,080,073 B1 | 7/2006 | Jiang et al. | |
| 7,664,313 B1 | 2/2010 | Sproat | |
| 7,698,270 B2 | 4/2010 | Brave et al. | |
| 7,752,243 B2 | 7/2010 | Hoeber et al. | |
| 8,429,179 B1 | 4/2013 | Mirhaji | |
| 8,442,940 B1 | 5/2013 | Faletti et al. | |
| 8,719,005 B1 | 5/2014 | Lee et al. | |
| 9,053,210 B2 | 6/2015 | Elnikety et al. | |
| 9,098,492 B2 * | 8/2015 | Tunstall-Pedoe | G06F 17/28 |
| 9,224,103 B1 | 12/2015 | Subramanya et al. | |
| 9,230,019 B2 | 1/2016 | Koonce et al. | |
| 9,348,815 B1 * | 5/2016 | Estes | G06F 17/2785 |
| 9,501,565 B1 | 11/2016 | Ajmera et al. | |
| 9,542,447 B1 | 1/2017 | Brennan et al. | |
| 9,613,164 B2 | 4/2017 | Broecheler et al. | |
| 9,633,004 B2 | 4/2017 | Giuli et al. | |
| 10,007,879 B2 | 6/2018 | Kakrania et al. | |
| 10,062,031 B2 | 8/2018 | Faith et al. | |
| 10,262,261 B2 | 4/2019 | Sanchez et al. | |
| 10,318,561 B2 | 6/2019 | Kothe et al. | |
| 10,325,205 B2 | 6/2019 | Sanchez et al. | |
| 10,430,529 B1 | 10/2019 | Kanthasamy et al. | |
| 10,445,646 B2 | 10/2019 | Sanchez et al. | |
| 2002/0042711 A1 | 4/2002 | Lin | |
| 2002/0194223 A1 | 12/2002 | Meyers et al. | |
| 2003/0036900 A1 * | 2/2003 | Weise | G06F 40/253 |
| | | | 704/9 |
| 2003/0120681 A1 | 6/2003 | Baclawski | |
| 2005/0027512 A1 * | 2/2005 | Waise | G06F 40/211 |
| | | | 704/9 |
| 2005/0071135 A1 | 3/2005 | Vredenburgh et al. | |
| 2005/0137849 A1 | 6/2005 | Parkinson | |
| 2005/0240943 A1 | 10/2005 | Smith et al. | |
| 2008/0016020 A1 | 1/2008 | Estes | |
| 2008/0109392 A1 | 5/2008 | Nandy | |
| 2009/0012842 A1 | 1/2009 | Srinivasan et al. | |
| 2009/0019310 A1 | 1/2009 | Nastacio et al. | |
| 2009/0144609 A1 | 6/2009 | Liang et al. | |
| 2009/0192968 A1 * | 7/2009 | Tunstall-Pedoe | G06N 5/02 |
| | | | 706/47 |
| 2010/0250497 A1 | 9/2010 | Redlich et al. | |
| 2011/0119049 A1 | 5/2011 | Ylonen | |
| 2011/0307435 A1 * | 12/2011 | Overell | G06F 17/278 |
| | | | 706/46 |
| 2012/0166371 A1 | 6/2012 | Sweeney et al. | |
| 2012/0179642 A1 | 7/2012 | Sweeney et al. | |
| 2012/0230338 A1 | 9/2012 | Ganeshalingam et al. | |
| 2012/0330869 A1 | 12/2012 | Durham | |
| 2013/0066823 A1 * | 3/2013 | Sweeney | G06N 5/02 |
| | | | 706/50 |
| 2013/0262501 A1 | 10/2013 | Kuchmann-Beauger et al. | |
| 2014/0236570 A1 | 8/2014 | Heck et al. | |
| 2014/0279726 A1 | 9/2014 | Cheng et al. | |
| 2014/0337266 A1 | 11/2014 | Kalns et al. | |
| 2014/0337306 A1 | 11/2014 | Gramatica | |
| 2014/0351261 A1 | 11/2014 | Aswani et al. | |
| 2015/0347480 A1 | 12/2015 | Smart | |
| 2015/0356144 A1 | 12/2015 | Chawla et al. | |
| 2015/0356405 A1 | 12/2015 | Sanchez et al. | |
| 2015/0356414 A1 | 12/2015 | Sanchez et al. | |
| 2015/0356425 A1 | 12/2015 | Sanchez et al. | |
| 2015/0356437 A1 | 12/2015 | Sanchez et al. | |
| 2016/0019290 A1 | 1/2016 | Ratnaparkhi et al. | |
| 2016/0048564 A1 * | 2/2016 | Bassett, Jr. | G16B 50/00 |
| | | | 715/230 |
| 2016/0104070 A1 | 4/2016 | Eslami et al. | |
| 2016/0117322 A1 | 4/2016 | Ramaswamy et al. | |
| 2016/0140236 A1 | 5/2016 | Estes | |
| 2016/0260025 A1 * | 9/2016 | Goldberg | H04L 51/32 |
| 2016/0350441 A1 * | 12/2016 | Kakrania | G06N 5/022 |
| 2016/0378765 A1 | 12/2016 | Bernstein et al. | |
| 2017/0039602 A1 * | 2/2017 | Shi-Nash | G06Q 10/00 |
| 2017/0076206 A1 * | 3/2017 | Lastras-Montano | G06F 16/3344 |
| 2017/0078448 A1 | 3/2017 | Overman | |
| 2017/0249382 A1 | 8/2017 | Venkataraman et al. | |
| 2017/0330106 A1 | 11/2017 | Lindsley | |

OTHER PUBLICATIONS

U.S. Appl. No. 15/290,379, filed Oct. 11, 2016.
U.S. Appl. No. 15/290,389, filed Oct. 11, 2016.
U.S. Appl. No. 15/290,397, filed Oct. 11, 2016.
U.S. Appl. No. 15/290,404, filed Oct. 11, 2016.
U.S. Appl. No. 15/290,414, filed Oct. 11, 2016.
U.S. Appl. No. 15/290,427, filed Oct. 11, 2016.
U.S. Appl. No. 15/290,438, filed Oct. 11, 2016.
U.S. Appl. No. 15/290,447, filed Oct. 11, 2016.
U.S. Appl. No. 15/290,457, filed Oct. 11, 2016.
U.S. Appl. No. 15/290,465, filed Oct. 11, 2016.
U.S. Appl. No. 15/290,471, filed Oct. 11, 2016.
U.S. Appl. No. 15/290,479, filed Oct. 11, 2016.
U.S. Appl. No. 15/290,496, filed Oct. 11, 2016.
U.S. Appl. No. 15/290,506, filed Oct. 11, 2016.
U.S. Appl. No. 15/290,517, filed Oct. 11, 2016.
M. Müller, Inducing Content Based User Models with Inductive Logic Programming Techniques, Proceedings of the UM 2001 Workshop on Machine Learning for User Modeling, Sonthofen, Germany, pp. 1-10, 2001.
S. Earley, Cognitive Computing, Analytics, and Personalization, IT Professional, vol. 17, No. 4, pp. 12-18, Jul.-Aug. 2015.
Supplemental List of Patents or Patent Applications Treated as Related, Aug. 2019.
Resnik, Philip, "Semantic similarity in a taxonomy: An information-based measure and its application to problems of ambiguity in natural language." Journal of artificial intelligence research 11 (1999): 95-130. (Year: 1999).
Broniatowski, David A. et al., "Measuring Flexibility, Descriptive Complexity, and Rework Potential in Generic System Architectures." Systems Engineering, No. 3: 207 (Year: 2016).
List of Patents or Patent Applications Treated as Related.

* cited by examiner

UNIVERSAL COGNITIVE GRAPH HAVING PERSISTENT KNOWLEDGE ELEMENTS

BACKGROUND OF THE INVENTION

Field of the Invention

The present invention relates in general to the field of computers and similar technologies, and in particular to software utilized in this field. Still more particularly, it relates to a method, system and computer-usable medium for performing cognitive inference and learning operations.

Description of the Related Art

In general, "big data" refers to a collection of datasets so large and complex that they become difficult to process using typical database management tools and traditional data processing approaches. These datasets can originate from a wide variety of sources, including computer systems, mobile devices, credit card transactions, television broadcasts, and medical equipment, as well as infrastructures associated with cities, sensor-equipped buildings and factories, and transportation systems. Challenges commonly associated with big data, which may be a combination of structured, unstructured, and semi-structured data, include its capture, curation, storage, search, sharing, analysis and visualization. In combination, these challenges make it difficult to efficiently process large quantities of data within tolerable time intervals.

Nonetheless, big data analytics hold the promise of extracting insights by uncovering difficult-to-discover patterns and connections, as well as providing assistance in making complex decisions by analyzing different and potentially conflicting options. As such, individuals and organizations alike can be provided new opportunities to innovate, compete, and capture value.

One aspect of big data is "dark data," which generally refers to data that is either not collected, neglected, or underutilized. Examples of data that is not currently being collected includes location data prior to the emergence of companies such as Foursquare or social data prior to the advent companies such as Facebook. An example of data that is being collected, but is difficult to access at the right time and place, includes data associated with the side effects of certain spider bites while on a camping trip. As another example, data that is collected and available, but has not yet been productized of fully utilized, may include disease insights from population-wide healthcare records and social media feeds. As a result, a case can be made that dark data may in fact be of higher value than big data in general, especially as it can likely provide actionable insights when it is combined with readily-available data.

SUMMARY OF THE INVENTION

A method, system and computer-usable medium are disclosed for cognitive inference and learning operations.

In one embodiment, the invention relates to a system comprising: a processor; a data bus coupled to the processor; and a non-transitory, computer-readable storage medium embodying computer program code, the non-transitory, computer-readable storage medium being coupled to the data bus. The computer program code interacting with a plurality of computer operations and comprising instructions executable by the processor and configured for: receiving data from a plurality of data sources; processing the data from the plurality of data sources, the processing the data from the plurality of data sources identifying a plurality of knowledge elements; and, storing the knowledge elements within the cognitive graph as a collection of knowledge elements, the storing universally representing knowledge obtained from the data, each knowledge element of the collection of knowledge elements being persisted in its original form.

In another embodiment, the invention relates to a non-transitory, computer-readable storage medium embodying computer program code, the computer program code comprising computer executable instructions configured for: receiving data from a plurality of data sources; processing the data from the plurality of data sources, the processing the data from the plurality of data sources identifying a plurality of knowledge elements; and, storing the knowledge elements within the cognitive graph as a collection of knowledge elements, the storing universally representing knowledge obtained from the data, each knowledge element of the collection of knowledge elements being persisted in its original form.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
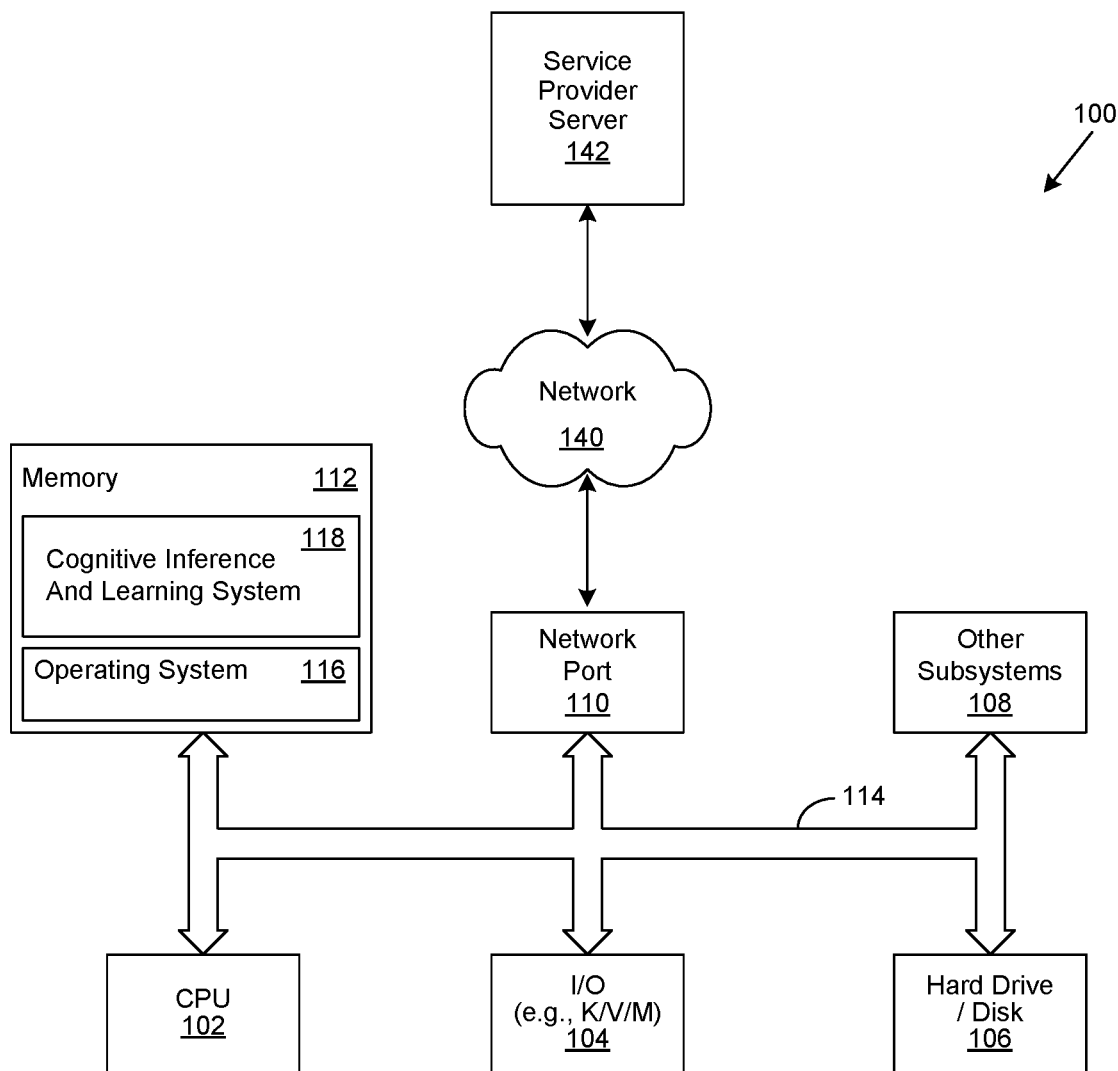
FIG. 1 depicts an exemplary client computer in which the present invention may be implemented.

A method, system and computer-usable medium are disclosed for cognitive inference and learning operations. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is a generalized illustration of an information processing system 100 that can be used to implement the system and method of the present invention. The information processing system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information processing system 100 also includes network port 110 operable to connect to a network 140, which is likewise accessible by a service provider server 142. The information processing system 100 likewise includes system memory 112, which is interconnected to the foregoing via one or more buses 114. System memory 112 further comprises operating system (OS) 116 and in various embodiments may also comprise cognitive inference and learning system (CILS) 118. In one embodiment, the information processing system 100 is able to download the CILS 118 from the service provider server 142. In another embodiment, the CILS 118 is provided as a service from the service provider server 142.

In various embodiments, the CILS 118 is implemented to perform various cognitive computing operations described in greater detail herein. As used herein, cognitive computing broadly refers to a class of computing involving self-learning systems that use techniques such as spatial navigation, machine vision, and pattern recognition to increasingly mimic the way the human brain works. To be more specific, earlier approaches to computing typically solved problems by executing a set of instructions codified within software. In contrast, cognitive computing approaches are data-driven, sense-making, insight-extracting, problem-solving systems that have more in common with the structure of the human brain than with the architecture of contemporary, instruction-driven computers.

To further differentiate these distinctions, traditional computers must first be programmed by humans to perform specific tasks, while cognitive systems learn from their interactions with data and humans alike, and in a sense, program themselves to perform new tasks. To summarize the difference between the two, traditional computers are designed to calculate rapidly. Cognitive systems are designed to quickly draw inferences from data and gain new knowledge.

Cognitive systems achieve these abilities by combining various aspects of artificial intelligence, natural language processing, dynamic learning, and hypothesis generation to render vast quantities of intelligible data to assist humans in making better decisions. As such, cognitive systems can be characterized as having the ability to interact naturally with people to extend what either humans, or machines, could do on their own. Furthermore, they are typically able to process natural language, multi-structured data, and experience much in the same way as humans. Moreover, they are also typically able to learn a knowledge domain based upon the best available data and get better, and more immersive, over time.

It will be appreciated that more data is currently being produced every day than was recently produced by human beings from the beginning of recorded time. Deep within this ever-growing mass of data is a class of data known as "dark data," which includes neglected information, ambient signals, and insights that can assist organizations and individuals in augmenting their intelligence and deliver actionable insights through the implementation of cognitive applications. As used herein, cognitive applications, or "cognitive apps," broadly refer to cloud-based, big data interpretive applications that learn from user engagement and data interactions. Such cognitive applications extract patterns and insights from dark data sources that are currently almost completely opaque. Examples of such dark data include disease insights from population-wide healthcare records and social media feeds, or from new sources of information, such as sensors monitoring pollution in delicate marine environments.

Over time, it is anticipated that cognitive applications will fundamentally change the ways in which many organizations operate as they invert current issues associated with data volume and variety to enable a smart, interactive data supply chain. Ultimately, cognitive applications hold the promise of receiving a user query and immediately providing a data-driven answer from a masked data supply chain in response. As they evolve, it is likewise anticipated that cognitive applications may enable a new class of "sixth sense" applications that intelligently detect and learn from relevant data and events to offer insights, predictions and advice rather than wait for commands. Just as web and mobile applications changed the way people access data, cognitive applications may change the way people listen to, and become empowered by, multi-structured data such as emails, social media feeds, doctors notes, transaction records, and call logs.

However, the evolution of such cognitive applications has associated challenges, such as how to detect events, ideas, images, and other content that may be of interest. For example, assuming that the role and preferences of a given user are known, how is the most relevant information discovered, prioritized, and summarized from large streams of multi-structured data such as news feeds, blogs, social media, structured data, and various knowledge bases? To further the example, what can a healthcare executive be told about their competitor's market share? Other challenges include the creation of a contextually-appropriate visual summary of responses to questions or queries.

Figure 2:
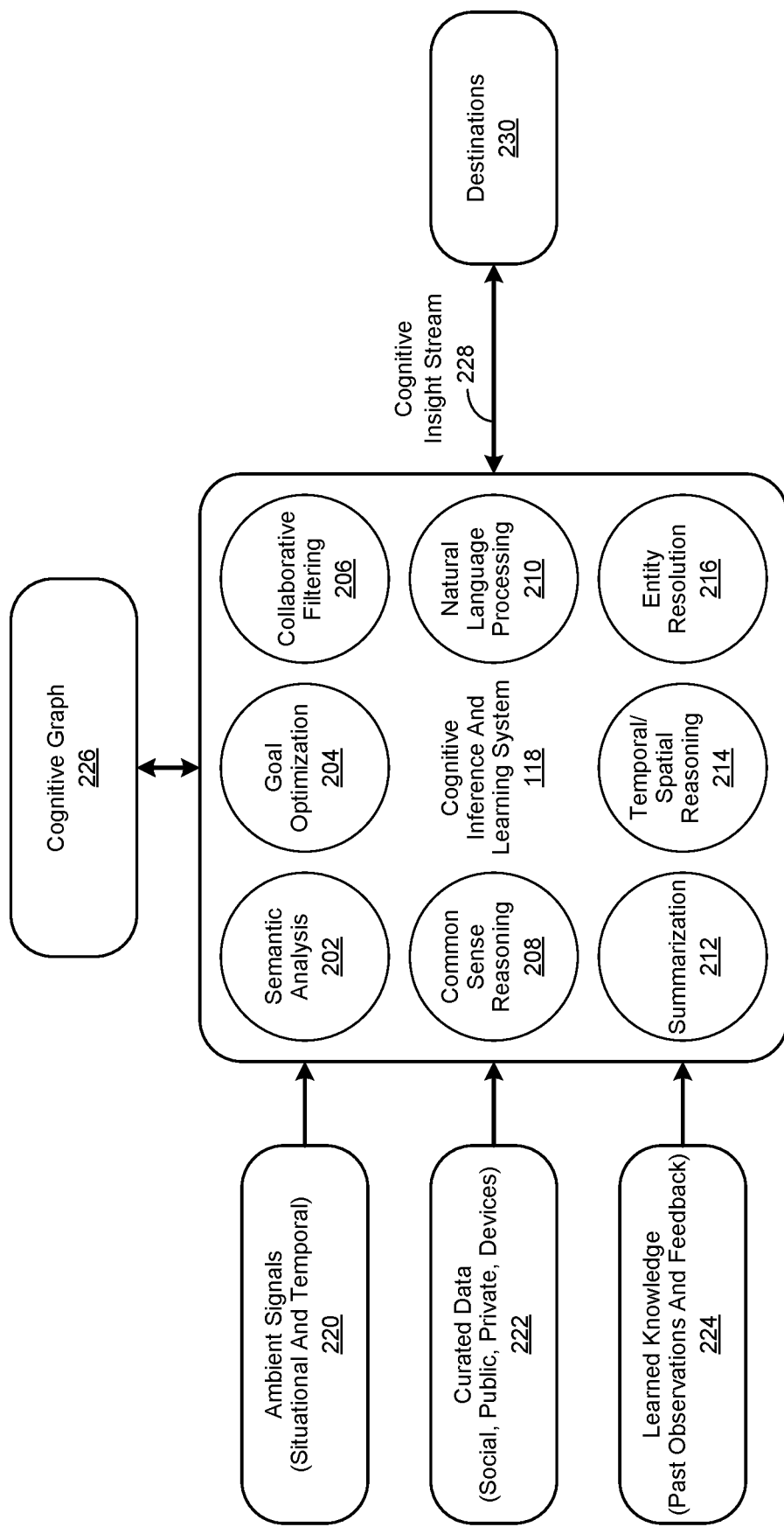
FIG. 2 is a simplified block diagram of a cognitive inference and learning system (CILS)

FIG. 2 is a simplified block diagram of a cognitive inference and learning system (CILS) implemented in accordance with an embodiment of the invention. In various embodiments, the CILS 118 is implemented to incorporate a variety of processes, including semantic analysis 202, goal optimization 204, collaborative filtering 206, common sense reasoning 208, natural language processing 210, summarization 212, temporal/spatial reasoning 214, and entity resolution 216 to generate cognitive insights.

As used herein, semantic analysis 202 broadly refers to performing various analysis operations to achieve a semantic level of understanding about language by relating syntactic structures. In various embodiments, various syntactic structures are related from the levels of phrases, clauses, sentences and paragraphs, to the level of the body of content as a whole and to its language-independent meaning. In certain embodiments, the semantic analysis 202 process includes processing a target sentence to parse it into its individual parts of speech, tag sentence elements that are related to predetermined items of interest, identify dependencies between individual words, and perform co-reference resolution. For example, if a sentence states that the author really likes the hamburgers served by a particular restaurant, then the name of the "particular restaurant" is co-referenced to "hamburgers."

As likewise used herein, goal optimization 204 broadly refers to performing multi-criteria decision making operations to achieve a given goal or target objective. In various embodiments, one or more goal optimization 204 processes are implemented by the CILS 118 to define predetermined goals, which in turn contribute to the generation of a cognitive insight. For example, goals for planning a vacation trip may include low cost (e.g., transportation and accommodations), location (e.g., by the beach), and speed (e.g., short travel time). In this example, it will be appreciated that certain goals may be in conflict with another. As a result, a cognitive insight provided by the CILS 118 to a traveler may indicate that hotel accommodations by a beach may cost more than they care to spend.

Collaborative filtering 206, as used herein, broadly refers to the process of filtering for information or patterns through the collaborative involvement of multiple agents, viewpoints, data sources, and so forth. The application of such collaborative filtering 206 processes typically involves very large and different kinds of data sets, including sensing and monitoring data, financial data, and user data of various kinds. Collaborative filtering 206 may also refer to the process of making automatic predictions associated with predetermined interests of a user by collecting preferences or other information from many users. For example, if person 'A' has the same opinion as a person 'B' for a given issue 'x', then an assertion can be made that person 'A' is more likely to have the same opinion as person 'B' opinion on a different issue 'y' than to have the same opinion on issue 'y' as a randomly chosen person. In various embodiments, the collaborative filtering 206 process is implemented with various recommendation engines familiar to those of skill in the art to make recommendations.

As used herein, common sense reasoning 208 broadly refers to simulating the human ability to make deductions from common facts they inherently know. Such deductions may be made from inherent knowledge about the physical properties, purpose, intentions and possible behavior of ordinary things, such as people, animals, objects, devices, and so on. In various embodiments, common sense reasoning 208 processes are implemented to assist the CILS 118 in understanding and disambiguating words within a predetermined context. In certain embodiments, the common sense reasoning 208 processes are implemented to allow the CILS 118 to generate text or phrases related to a target word or phrase to perform deeper searches for the same terms. It will be appreciated that if the context of a word is better understood, then a common sense understanding of the word can then be used to assist in finding better or more accurate information. In certain embodiments, this better or more accurate understanding of the context of a word, and its related information, allows the CILS 118 to make more accurate deductions, which are in turn used to generate cognitive insights.

As likewise used herein, natural language processing (NLP) 210 broadly refers to interactions with a system, such as the CILS 118, through the use of human, or natural, languages. In various embodiments, various NLP 210 processes are implemented by the CILS 118 to achieve natural language understanding, which enables it to not only derive meaning from human or natural language input, but to also generate natural language output.

Summarization 212, as used herein, broadly refers to processing a set of information, organizing and ranking it, and then generating a corresponding summary. As an example, a news article may be processed to identify its primary topic and associated observations, which are then extracted, ranked, and then presented to the user. As another example, page ranking operations may be performed on the same news article to identify individual sentences, rank them, order them, and determine which of the sentences are most impactful in describing the article and its content. As yet another example, a structured data record, such as a patient's electronic medical record (EMR), may be processed using the summarization 212 process to generate sentences and phrases that describes the content of the EMR. In various embodiments, various summarization 212 processes are implemented by the CILS 118 to generate summarizations of content streams, which are in turn used to generate cognitive insights.

As used herein, temporal/spatial reasoning 214 broadly refers to reasoning based upon qualitative abstractions of temporal and spatial aspects of common sense knowledge, described in greater detail herein. For example, it is not uncommon for a predetermined set of data to change over time. Likewise, other attributes, such as its associated metadata, may likewise change over time. As a result, these changes may affect the context of the data. To further the example, the context of asking someone what they believe they should be doing at 3:00 in the afternoon during the workday while they are at work may be quite different than asking the same user the same question at 3:00 on a Sunday afternoon when they are at home. In certain embodiments, various temporal/spatial reasoning 214 processes are implemented by the CILS 118 to determine the context of queries, and associated data, which are in turn used to generate cognitive insights.

As likewise used herein, entity resolution 216 broadly refers to the process of finding elements in a set of data that refer to the same entity across different data sources (e.g., structured, non-structured, streams, devices, etc.), where the target entity does not share a common identifier. In various embodiments, the entity resolution 216 process is implemented by the CILS 118 to identify significant nouns, adjectives, phrases or sentence elements that represent various predetermined entities within one or more domains. From the foregoing, it will be appreciated that the implementation of one or more of the semantic analysis 202, goal optimization 204, collaborative filtering 206, common sense reasoning 208, natural language processing 210, summarization 212, temporal/spatial reasoning 214, and entity resolution 216 processes by the CILS 118 can facilitate the generation of a semantic, cognitive model.

In various embodiments, the CILS 118 receives ambient signals 220, curated data 222, and learned knowledge 224, which is then processed by the CILS 118 to generate one or more cognitive graphs 226. In turn, the one or more cognitive graphs 226 are further used by the CILS 118 to generate cognitive insight streams, which are then delivered to one or more destinations 230, as described in greater detail herein.

As used herein, ambient signals 220 broadly refer to input signals, or other data streams, that may contain data providing additional insight or context to the curated data 222 and learned knowledge 224 received by the CILS 118. For example, ambient signals may allow the CILS 118 to understand that a user is currently using their mobile device, at location 'x', at time 'y', doing activity 'z'. To further the example, there is a difference between the user using their mobile device while they are on an airplane versus using their mobile device after landing at an airport and walking between one terminal and another. To extend the example even further, ambient signals may add additional context, such as the user is in the middle of a three leg trip and has two hours before their next flight. Further, they may be in terminal A1, but their next flight is out of C1, it is lunchtime, and they want to know the best place to eat. Given the available time the user has, their current location, restaurants that are proximate to their predicted route, and other factors such as food preferences, the CILS 118 can perform various cognitive operations and provide a recommendation for where the user can eat.

In various embodiments, the curated data 222 may include structured, unstructured, social, public, private, streaming, device or other types of data described in greater detail herein. In certain embodiments, the learned knowledge 224 is based upon past observations and feedback from the presentation of prior cognitive insight streams and recommendations. In various embodiments, the learned knowledge 224 is provided via a feedback look that provides the learned knowledge 224 in the form of a learning stream of data.

As likewise used herein, a cognitive graph 226 refers to a representation of expert knowledge, associated with individuals and groups over a period of time, to depict relationships between people, places, and things using words, ideas, audio and images. As such, a cognitive graph is a machine-readable formalism for knowledge representation that provides a common framework allowing data and knowledge to be shared and reused across user, application, organization, and community boundaries. In certain embodiments, the cognitive graph includes integrated machine learning functionality. In certain embodiments, the machine learning functionality includes cognitive functionality which uses feedback to improve the accuracy of knowledge stored within the cognitive graph. In certain embodiments, the cognitive graph is configured to seamlessly function with a cognitive system such as the cognitive inference and learning system 118.

In various embodiments, the information contained in, and referenced by, a cognitive graph 226 is derived from many sources (e.g., public, private, social, device), such as curated data 222. In certain of these embodiments, the cognitive graph 226 assists in the identification and organization of information associated with how people, places and things are related to one other. In various embodiments, the cognitive graph 226 enables automated agents, described in greater detail herein, to access the Web more intelligently, enumerate inferences through utilization of curated, structured data 222, and provide answers to questions by serving as a computational knowledge engine.

In certain embodiments, the cognitive graph 226 not only elicits and maps expert knowledge by deriving associations from data, it also renders higher level insights and accounts for knowledge creation through collaborative knowledge modeling. In various embodiments, the cognitive graph 226 is a machine-readable, declarative memory system that stores and learns both episodic memory (e.g., specific personal experiences associated with an individual or entity), and semantic memory, which stores factual information (e.g., geo location of an airport or restaurant).

For example, the cognitive graph 226 may know that a given airport is a place, and that there is a list of related places such as hotels, restaurants and departure gates. Furthermore, the cognitive graph 226 may know that people such as business travelers, families and college students use the airport to board flights from various carriers, eat at various restaurants, or shop at certain retail stores. The cognitive graph 226 may also have knowledge about the key attributes from various retail rating sites that travelers have used to describe the food and their experience at various venues in the airport over the past six months.

In certain embodiments, the cognitive insight stream 228 is bidirectional, and supports flows of information both to and from destinations 230. In these embodiments, the first flow is generated in response to receiving a query, and subsequently delivered to one or more destinations 230. The second flow is generated in response to detecting information about a user of one or more of the destinations 230. Such use results in the provision of information to the CILS 118. In response, the CILS 118 processes that information, in the context of what it knows about the user, and provides additional information to the user, such as a recommendation. In various embodiments, the cognitive insight stream 228 is configured to be provided in a "push" stream configuration familiar to those of skill in the art. In certain embodiments, the cognitive insight stream 228 is implemented to use natural language approaches familiar to skilled practitioners of the art to support interactions with a user.

In various embodiments, the cognitive insight stream 228 may include a stream of visualized insights. As used herein, visualized insights broadly refers to cognitive insights that are presented in a visual manner, such as a map, an infographic, images, and so forth. In certain embodiments, these visualized insights may include various cognitive insights, such as "What happened?", "What do I know about it?", "What is likely to happen next?", or "What should I do about it?" In these embodiments, the cognitive insight stream is generated by various cognitive agents, which are applied to various sources, datasets, and cognitive graphs 226. As used herein, a cognitive agent broadly refers to a computer program that performs a task with minimum specific directions from users and learns from each interaction with data and human users.

In various embodiments, the CILS 118 delivers Cognition as a Service (CaaS). As such, it provides a cloud-based development and execution platform that allow various cognitive applications and services to function more intelligently and intuitively. In certain embodiments, cognitive applications powered by the CILS 118 are able to think and interact with users as intelligent virtual assistants. As a result, users are able to interact with such cognitive applications by asking them questions and giving them commands. In response, these cognitive applications will be able to assist the user in completing tasks and managing their work more efficiently.

In these and other embodiments, the CILS 118 can operate as an analytics platform to process big data, and dark data as well, to provide data analytics through a public, private or hybrid cloud environment. As used herein, cloud analytics broadly refers to a service model wherein data sources, data models, processing applications, computing power, analytic models, and sharing or storage of results are implemented within a cloud environment to perform one or more aspects of analytics.

In various embodiments, users submit queries and computation requests in a natural language format to the CILS 118. In response, they are provided with a ranked list of relevant answers and aggregated information with useful links and pertinent visualizations through a graphical representation. In these embodiments, the cognitive graph 226 generates semantic and temporal maps to reflect the organization of unstructured data and to facilitate meaningful learning from potentially millions of lines of text, much in the same way as arbitrary syllables strung together create meaning through the concept of language.

Figure 3:
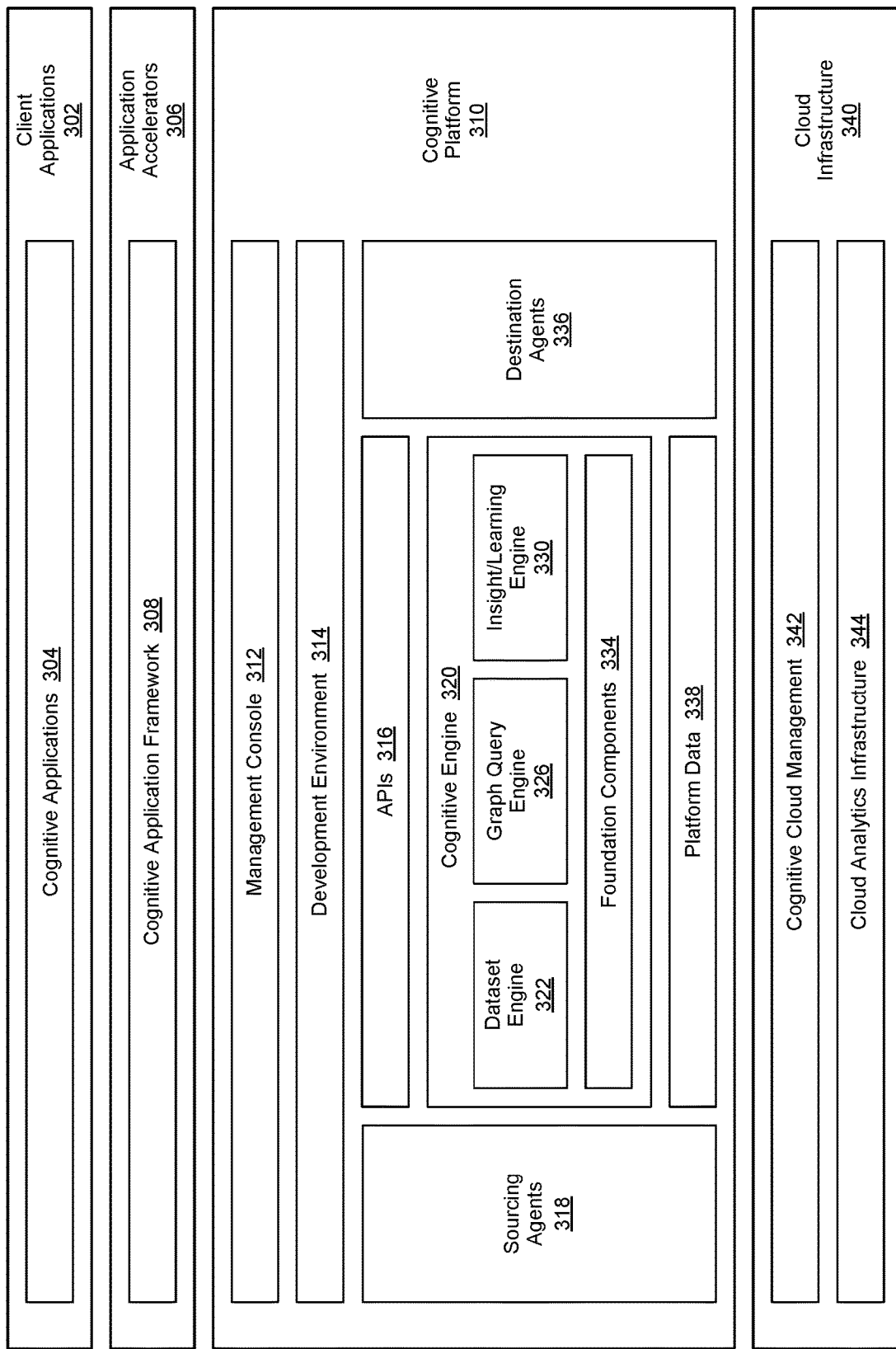
FIG. 3 is a simplified block diagram of a CILS reference model implemented in accordance with an embodiment of the invention.

FIG. 3 is a simplified block diagram of a cognitive inference and learning system (CILS) reference model implemented in accordance with an embodiment of the invention. In this embodiment, the CILS reference model is associated with the CILS 118 shown in FIG. 2. As shown in FIG. 3, the CILS 118 includes client applications 302, application accelerators 306, a cognitive platform 310, and cloud infrastructure 340. In various embodiments, the client applications 302 include cognitive applications 304, which are implemented to understand and adapt to the user, not the other way around, by natively accepting and understanding human forms of communication, such as natural language text, audio, images, video, and so forth.

In these and other embodiments, the cognitive applications 304 possess situational and temporal awareness based upon ambient signals from users and data, which facilitates understanding the user's intent, content, context and meaning to drive goal-driven dialogs and outcomes. Further, they are designed to gain knowledge over time from a wide variety of structured, non-structured, and device data sources, continuously interpreting and autonomously reprogramming themselves to better understand a given domain. As such, they are well-suited to support human decision making, by proactively providing trusted advice, offers and recommendations while respecting user privacy and permissions.

In various embodiments, the application accelerators 306 include a cognitive application framework 308. In certain embodiments, the application accelerators 306 and the cognitive application framework 308 support various plug-ins and components that facilitate the creation of client applications 302 and cognitive applications 304. In various embodiments, the application accelerators 306 include widgets, user interface (UI) components, reports, charts, and back-end integration components familiar to those of skill in the art.

As likewise shown in FIG. 3, the cognitive platform 310 includes a management console 312, a development environment 314, application program interfaces (APIs) 316, sourcing agents 317, a cognitive engine 320, destination agents 336, and platform data 338, all of which are described in greater detail herein. In various embodiments, the management console 312 is implemented to manage accounts and projects, along with user-specific metadata that is used to drive processes and operations within the cognitive platform 310 for a predetermined project.

In certain embodiments, the development environment 314 is implemented to create custom extensions to the CILS 118 shown in FIG. 2. In various embodiments, the development environment 314 is implemented for the development of a custom application, which may subsequently be deployed in a public, private or hybrid cloud environment. In certain embodiments, the development environment 314 is implemented for the development of a custom sourcing agent, a custom bridging agent, a custom destination agent, or various analytics applications or extensions.

In various embodiments, the APIs 316 are implemented to build and manage predetermined cognitive applications 304, described in greater detail herein, which are then executed on the cognitive platform 310 to generate cognitive insights. Likewise, the sourcing agents 317 are implemented in various embodiments to source a variety of multi-site, multi-structured source streams of data described in greater detail herein. In various embodiments, the cognitive engine 320 includes a dataset engine 322, a graph query engine 326, an insight/learning engine 330, and foundation components 334. In certain embodiments, the dataset engine 322 is implemented to establish and maintain a dynamic data ingestion and enrichment pipeline. In these and other embodiments, the dataset engine 322 may be implemented to orchestrate one or more sourcing agents 317 to source data. Once the data is sourced, the data set engine 322 performs data enriching and other data processing operations, described in greater detail herein, and generates one or more sub-graphs that are subsequently incorporated into a target cognitive graph.

In various embodiments, the graph query engine 326 is implemented to receive and process queries such that they can be bridged into a cognitive graph, as described in greater detail herein, through the use of a bridging agent. In certain embodiments, the graph query engine 326 performs various natural language processing (NLP), familiar to skilled practitioners of the art, to process the queries. In various embodiments, the insight/learning engine 330 is implemented to encapsulate a predetermined algorithm, which is then applied to a cognitive graph to generate a result, such as a cognitive insight or a recommendation. In certain embodiments, one or more such algorithms may contribute to answering a specific question and provide additional cognitive insights or recommendations. In various embodiments, two or more of the dataset engine 322, the graph query engine 326, and the insight/learning engine 330 may be implemented to operate collaboratively to generate a cognitive insight or recommendation. In certain embodiments, one or more of the dataset engine 322, the graph query engine 326, and the insight/learning engine 330 may operate autonomously to generate a cognitive insight or recommendation.

The foundation components 334 shown in FIG. 3 include various reusable components, familiar to those of skill in the art, which are used in various embodiments to enable the dataset engine 322, the graph query engine 326, and the insight/learning engine 330 to perform their respective operations and processes. Examples of such foundation components 334 include natural language processing (NLP) components and core algorithms, such as cognitive algorithms.

In various embodiments, the platform data 338 includes various data repositories, described in greater detail herein, that are accessed by the cognitive platform 310 to generate cognitive insights. In various embodiments, the destination agents 336 are implemented to publish cognitive insights to a consumer of cognitive insight data. Examples of such consumers of cognitive insight data include target databases, business intelligence applications, and mobile applications. It will be appreciated that many such examples of cognitive insight data consumers are possible and the foregoing is not intended to limit the spirit, scope or intent of the invention. In various embodiments, as described in greater detail herein, the cloud infrastructure 340 includes cognitive cloud management 342 components and cloud analytics infrastructure components 344.

Figure 4A:
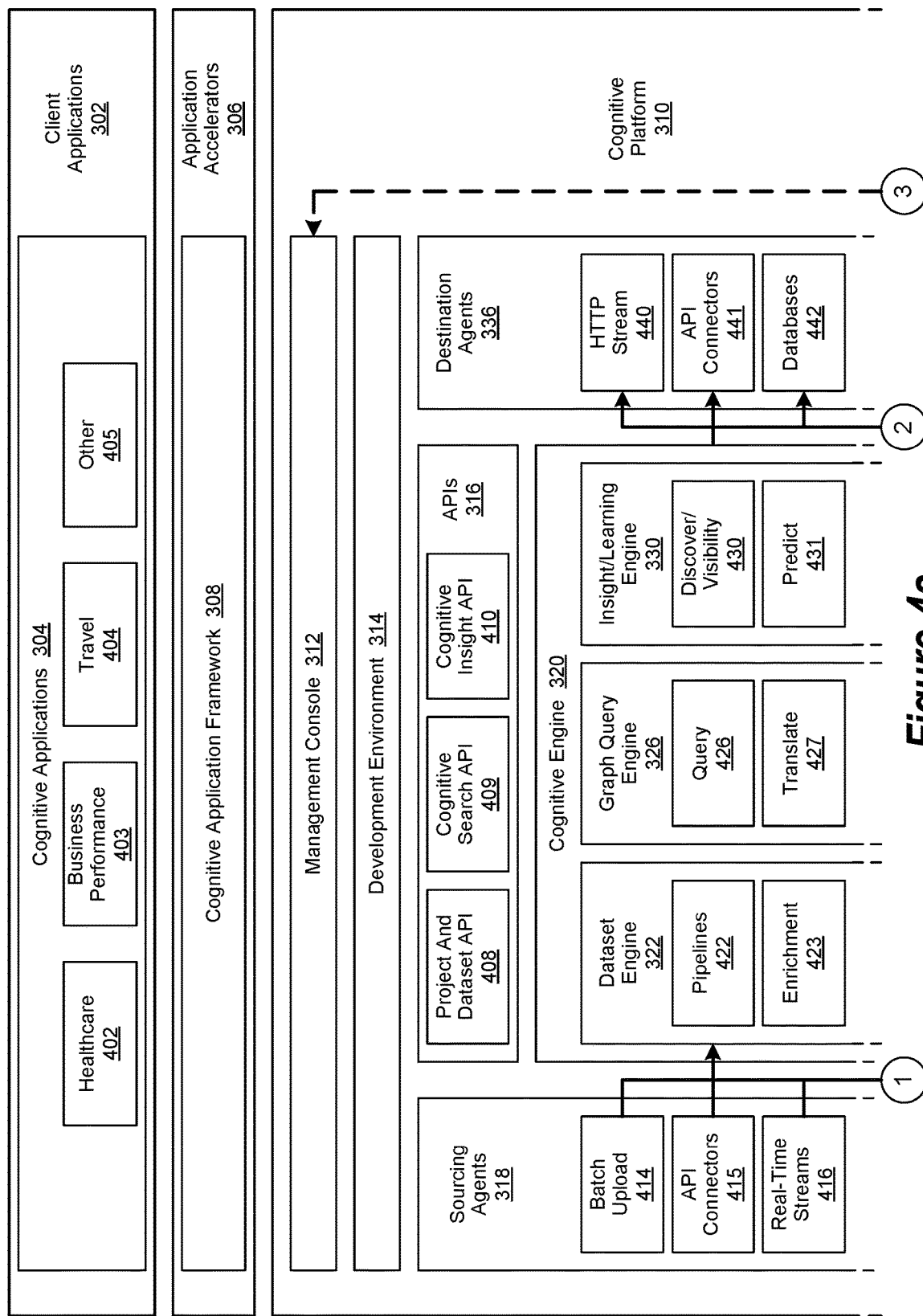
FIGS. 4a through 4c depict additional components of the CILS reference model shown in FIG. 3.
Figure 4B:
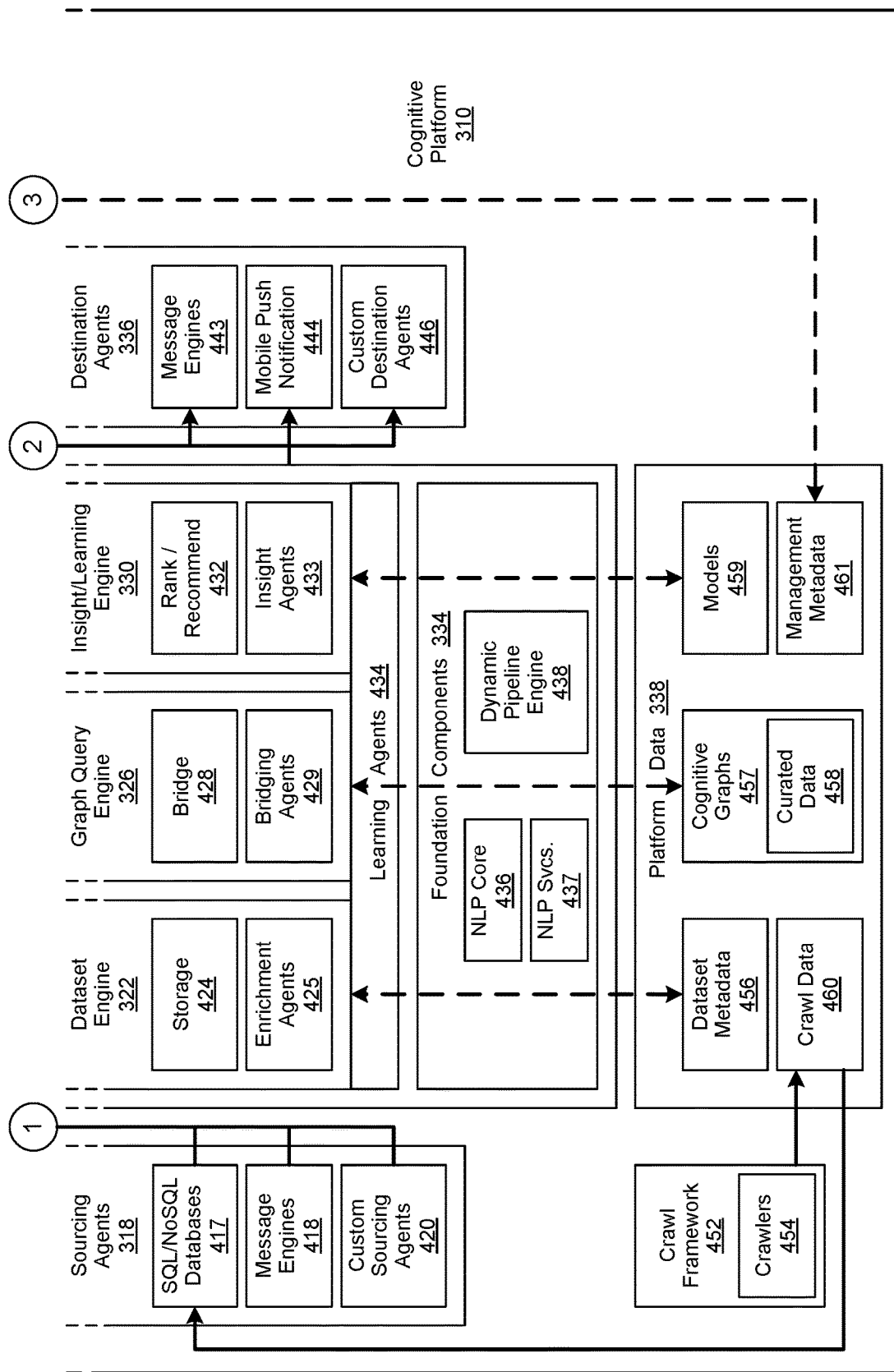
Figure 4C:
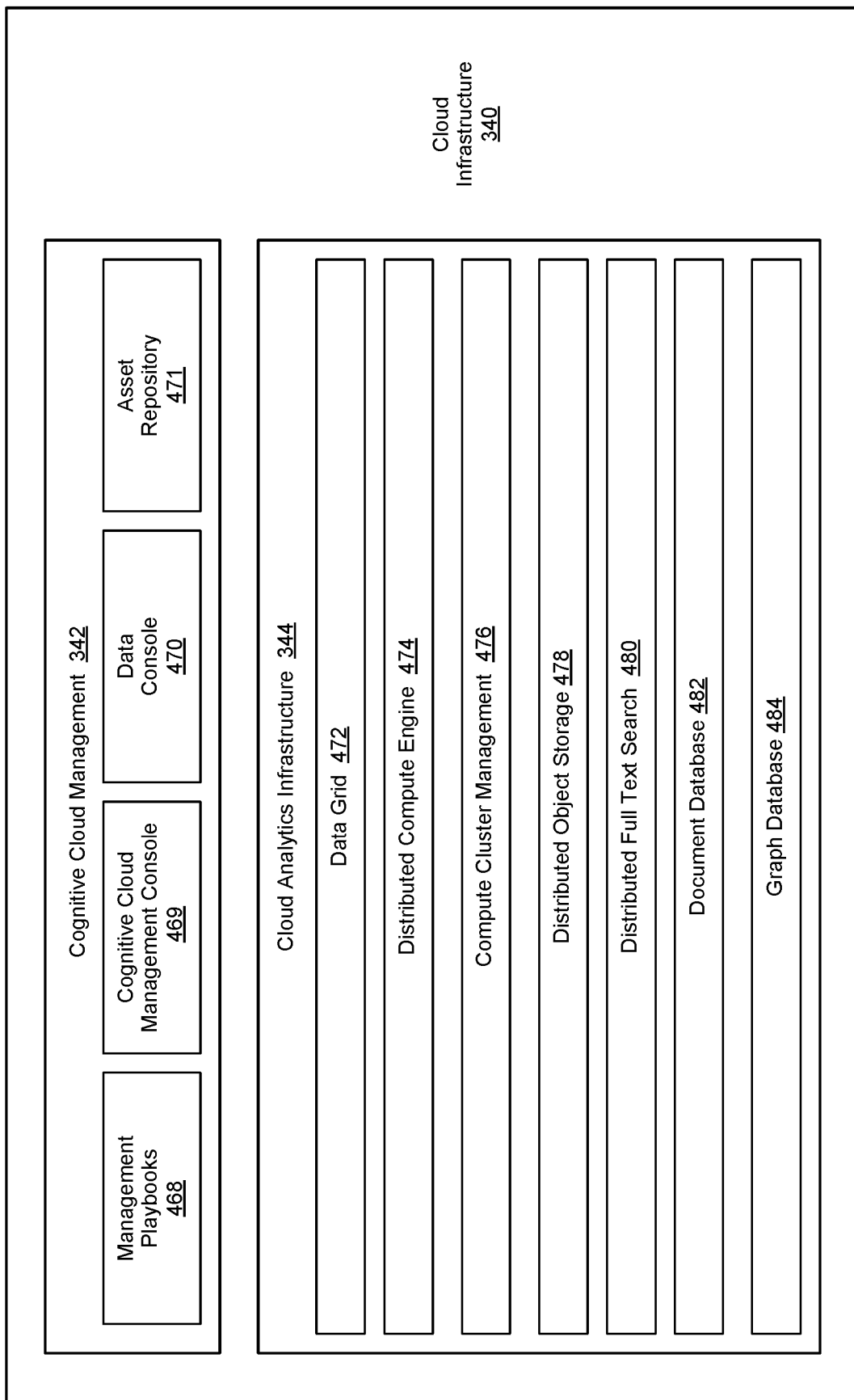

FIGS. 4a through 4c depict additional cognitive inference and learning system (CILS) components implemented in accordance with an embodiment of the CILS reference model shown in FIG. 3. In this embodiment, the CILS reference model includes client applications 302, application accelerators 306, a cognitive platform 310, and cloud infrastructure 340. As shown in FIG. 4a, the client applications 302 include cognitive applications 304. In various embodiments, the cognitive applications 304 are implemented natively accept and understand human forms of communication, such as natural language text, audio, images, video, and so forth. In certain embodiments, the cognitive applications 304 may include healthcare 402, business performance 403, travel 404, and various other 405 applications familiar to skilled practitioners of the art. As such, the foregoing is only provided as examples of such cognitive applications 304 and is not intended to limit the intent, spirit of scope of the invention.

In various embodiments, the application accelerators 306 include a cognitive application framework 308. In certain embodiments, the application accelerators 308 and the cognitive application framework 308 support various plug-ins and components that facilitate the creation of client applications 302 and cognitive applications 304. In various embodiments, the application accelerators 306 include widgets, user interface (UI) components, reports, charts, and back-end integration components familiar to those of skill in the art. It will be appreciated that many such application accelerators 306 are possible and their provided functionality, selection, provision and support are a matter of design choice. As such, the application accelerators 306 described in greater detail herein are not intended to limit the spirit, scope or intent of the invention.

As shown in FIGS. 4a and 4b, the cognitive platform 310 includes a management console 312, a development environment 314, application program interfaces (APIs) 316, sourcing agents 317, a cognitive engine 320, destination agents 336, platform data 338, and a crawl framework 452. In various embodiments, the management console 312 is implemented to manage accounts and projects, along with management metadata 461 that is used to drive processes and operations within the cognitive platform 310 for a predetermined project.

In various embodiments, the management console 312 is implemented to run various services on the cognitive platform 310. In certain embodiments, the management console 312 is implemented to manage the configuration of the cognitive platform 310. In certain embodiments, the management console 312 is implemented to establish the development environment 314. In various embodiments, the management console 312 may be implemented to manage the development environment 314 once it is established. Skilled practitioners of the art will realize that many such embodiments are possible and the foregoing is not intended to limit the spirit, scope or intent of the invention.

In various embodiments, the development environment 314 is implemented to create custom extensions to the CILS 118 shown in FIG. 2. In these and other embodiments, the development environment 314 is implemented to support various programming languages, such as Python, Java, R, and others familiar to skilled practitioners of the art. In various embodiments, the development environment 314 is implemented to allow one or more of these various programming languages to create a variety of analytic models and applications. As an example, the development environment 314 may be implemented to support the R programming language, which in turn can be used to create an analytic model that is then hosted on the cognitive platform 310.

In certain embodiments, the development environment 314 is implemented for the development of various custom applications or extensions related to the cognitive platform 310, which may subsequently be deployed in a public, private or hybrid cloud environment. In various embodiments, the development environment 314 is implemented for the development of various custom sourcing agents 317, custom enrichment agents 425, custom bridging agents 429, custom insight agents 433, custom destination agents 336, and custom learning agents 434, which are described in greater detail herein.

In various embodiments, the APIs 316 are implemented to build and manage predetermined cognitive applications 304, described in greater detail herein, which are then executed on the cognitive platform 310 to generate cognitive insights. In these embodiments, the APIs 316 may include one or more of a project and dataset API 408, a cognitive search API 409, a cognitive insight API 410, and other APIs. The selection of the individual APIs 316 implemented in various embodiments is a matter design choice and the foregoing is not intended to limit the spirit, scope or intent of the invention.

In various embodiments, the project and dataset API 408 is implemented with the management console 312 to enable the management of a variety of data and metadata associated with various cognitive insight projects and user accounts hosted or supported by the cognitive platform 310. In one embodiment, the data and metadata managed by the project and dataset API 408 are associated with billing information familiar to those of skill in the art. In one embodiment, the project and dataset API 408 is used to access a data stream that is created, configured and orchestrated, as described in greater detail herein, by the dataset engine 322.

In various embodiments, the cognitive search API 409 uses natural language processes familiar to those of skill in the art to search a target cognitive graph. Likewise, the cognitive insight API 410 is implemented in various embodiments to configure the insight/learning engine 330 to provide access to predetermined outputs from one or more cognitive graph algorithms that are executing in the cognitive platform 310. In certain embodiments, the cognitive insight API 410 is implemented to subscribe to, or request, such predetermined outputs.

In various embodiments, the sourcing agents 317 may include a batch upload 414 agent, an API connectors 415 agent, a real-time streams 416 agent, a Structured Query Language (SQL)/Not Only SQL (NoSQL) databases 417 agent, a message engines 417 agent, and one or more custom sourcing 420 agents. Skilled practitioners of the art will realize that other types of sourcing agents 317 may be used in various embodiments and the foregoing is not intended to limit the spirit, scope or intent of the invention. In various embodiments, the sourcing agents 317 are implemented to source a variety of multi-site, multi-structured source streams of data described in greater detail herein. In certain embodiments, each of the sourcing agents 317 has a corresponding API.

In various embodiments, the batch uploading 414 agent is implemented for batch uploading of data to the cognitive platform 310. In these embodiments, the uploaded data may include a single data element, a single data record or file, or a plurality of data records or files. In certain embodiments, the data may be uploaded from more than one source and the uploaded data may be in a homogenous or heterogeneous form. In various embodiments, the API connectors 415 agent is implemented to manage interactions with one or more predetermined APIs that are external to the cognitive platform 310. As an example, Associated Press® may have their own API for news stories, Expedia® for travel information, or the National Weather Service for weather information. In these examples, the API connectors 415 agent would be implemented to determine how to respectively interact with each organization's API such that the cognitive platform 310 can receive information.

In various embodiments, the real-time streams 416 agent is implemented to receive various streams of data, such as social media streams (e.g., Twitter feeds) or other data streams (e.g., device data streams). In these embodiments, the streams of data are received in near-real-time. In certain embodiments, the data streams include temporal attributes.

As an example, as data is added to a blog file, it is time-stamped to create temporal data. Other examples of a temporal data stream include Twitter feeds, stock ticker streams, device location streams from a device that is tracking location, medical devices tracking a patient's vital signs, and intelligent thermostats used to improve energy efficiency for homes.

In certain embodiments, the temporal attributes define a time window, which can be correlated to various elements of data contained in the stream. For example, as a given time window changes, associated data may have a corresponding change. In various embodiments, the temporal attributes do not define a time window. As an example, a social media feed may not have predetermined time windows, yet it is still temporal. As a result, the social media feed can be processed to determine what happened in the last 24 hours, what happened in the last hour, what happened in the last 15 minutes, and then determine related subject matter that is trending.

In various embodiments, the SQL/NoSQL databases 417 agent is implemented to interact with one or more target databases familiar to those of skill in the art. For example, the target database may include a SQL, NoSQL, delimited flat file, or other form of database. In various embodiments, the message engines 417 agent is implemented to provide data to the cognitive platform 310 from one or more message engines, such as a message queue (MQ) system, a message bus, a message broker, an enterprise service bus (ESB), and so forth. Skilled practitioners of the art will realize that there are many such examples of message engines with which the message engines 417 agent may interact and the foregoing is not intended to limit the spirit, scope or intent of the invention.

In various embodiments, the custom sourcing agents 420, which are purpose-built, are developed through the use of the development environment 314, described in greater detail herein. Examples of custom sourcing agents 420 include sourcing agents for various electronic medical record (EMR) systems at various healthcare facilities. Such EMR systems typically collect a variety of healthcare information, much of it the same, yet it may be collected, stored and provided in different ways. In this example, the custom sourcing agents 420 allow the cognitive platform 310 to receive information from each disparate healthcare source.

In various embodiments, the cognitive engine 320 includes a dataset engine 322, a graph engine 326, an insight/learning engine 330, learning agents 434, and foundation components 334. In these and other embodiments, the dataset engine 322 is implemented as described in greater detail to establish and maintain a dynamic data ingestion and enrichment pipeline. In various embodiments, the dataset engine 322 may include a pipelines 422 component, an enrichment 423 component, a storage component 424, and one or more enrichment agents 425.

In various embodiments, the pipelines 422 component is implemented to ingest various data provided by the sourcing agents 317. Once ingested, this data is converted by the pipelines 422 component into streams of data for processing. In certain embodiments, these managed streams are provided to the enrichment 423 component, which performs data enrichment operations familiar to those of skill in the art. As an example, a data stream may be sourced from Associated Press® by a sourcing agent 317 and provided to the dataset engine 322. The pipelines 422 component receives the data stream and routes it to the enrichment 423 component, which then enriches the data stream by performing sentiment analysis, geotagging, and entity detection operations to generate an enriched data stream. In certain embodiments, the enrichment operations include filtering operations familiar to skilled practitioners of the art. To further the preceding example, the Associated Press® data stream may be filtered by a predetermined geography attribute to generate an enriched data stream.

The enriched data stream is then subsequently stored, as described in greater detail herein, in a predetermined location. In various embodiments, the enriched data stream is cached by the storage 424 component to provide a local version of the enriched data stream. In certain embodiments, the cached, enriched data stream is implemented to be "replayed" by the cognitive engine 320. In one embodiment, the replaying of the cached, enriched data stream allows incremental ingestion of the enriched data stream instead of ingesting the entire enriched data stream at one time. In various embodiments, one or more enrichment agents 425 are implemented to be invoked by the enrichment component 423 to perform one or more enrichment operations described in greater detail herein.

In various embodiments, the graph query engine 326 is implemented to receive and process queries such that they can be bridged into a cognitive graph, as described in greater detail herein, through the use of a bridging agent. In these embodiments, the graph query engine may include a query 426 component, a translate 427 component, a bridge 428 component, and one or more bridging agents 429.

In various embodiments, the query 426 component is implemented to support natural language queries. In these and other embodiments, the query 426 component receives queries, processes them (e.g., using NLP processes), and then maps the processed query to a target cognitive graph. In various embodiments, the translate 427 component is implemented to convert the processed queries provided by the query 426 component into a form that can be used to query a target cognitive graph. To further differentiate the distinction between the functionality respectively provided by the query 426 and translate 427 components, the query 426 component is oriented toward understanding a query from a user. In contrast, the translate 427 component is oriented to translating a query that is understood into a form that can be used to query a cognitive graph.

In various embodiments, the bridge 428 component is implemented to generate an answer to a query provided by the translate 427 component. In certain embodiments, the bridge 428 component is implemented to provide domain-specific responses when bridging a translated query to a cognitive graph. For example, the same query bridged to a target cognitive graph by the bridge 428 component may result in different answers for different domains, dependent upon domain-specific bridging operations performed by the bridge 428 component.

To further differentiate the distinction between the translate 427 component and the bridging 428 component, the translate 427 component relates to a general domain translation of a question. In contrast, the bridging 428 component allows the question to be asked in the context of a specific domain (e.g., healthcare, travel, etc.), given what is known about the data. In certain embodiments, the bridging 428 component is implemented to process what is known about the translated query, in the context of the user, to provide an answer that is relevant to a specific domain.

As an example, a user may ask, "Where should I eat today?" If the user has been prescribed a particular health regimen, the bridging 428 component may suggest a restaurant with a "heart healthy" menu. However, if the user is a business traveler, the bridging 428 component may suggest the nearest restaurant that has the user's favorite food. In various embodiments, the bridging 428 component may provide answers, or suggestions, that are composed and ranked according to a specific domain of use. In various embodiments, the bridging agent 429 is implemented to interact with the bridging component 428 to perform bridging operations described in greater detail herein. In these embodiments, the bridging agent interprets a translated query generated by the query 426 component within a predetermined user context, and then maps it to predetermined nodes and links within a target cognitive graph.

In various embodiments, the insight/learning engine 330 is implemented to encapsulate a predetermined algorithm, which is then applied to a target cognitive graph to generate a result, such as a cognitive insight or a recommendation. In certain embodiments, one or more such algorithms may contribute to answering a specific question and provide additional cognitive insights or recommendations. In these and other embodiments, the insight/learning engine 330 is implemented to perform insight/learning operations, described in greater detail herein. In various embodiments, the insight/learning engine 330 may include a discover/visibility 430 component, a predict 431 component, a rank/recommend 432 component, and one or more insight 433 agents.

In various embodiments, the discover/visibility 430 component is implemented to provide detailed information related to a predetermined topic, such as a subject or an event, along with associated historical information. In certain embodiments, the predict 431 component is implemented to perform predictive operations to provide insight into what may next occur for a predetermined topic. In various embodiments, the rank/recommend 432 component is implemented to perform ranking and recommendation operations to provide a user prioritized recommendations associated with a provided cognitive insight.

In certain embodiments, the insight/learning engine 330 may include additional components. For example the additional components may include classification algorithms, clustering algorithms, and so forth. Skilled practitioners of the art will realize that many such additional components are possible and that the foregoing is not intended to limit the spirit, scope or intent of the invention. In various embodiments, the insights agents 433 are implemented to create a visual data story, highlighting user-specific insights, relationships and recommendations. As a result, it can share, operationalize, or track business insights in various embodiments. In various embodiments, the learning agent 434 work in the background to continually update the cognitive graph, as described in greater detail herein, from each unique interaction with data and users.

In various embodiments, the destination agents 336 are implemented to publish cognitive insights to a consumer of cognitive insight data. Examples of such consumers of cognitive insight data include target databases, business intelligence applications, and mobile applications. In various embodiments, the destination agents 336 may include a Hypertext Transfer Protocol (HTTP) stream 440 agent, an API connectors 441 agent, a databases 442 agent, a message engines 443 agent, a mobile push notification 444 agent, and one or more custom destination 446 agents. Skilled practitioners of the art will realize that other types of destination agents 317 may be used in various embodiments and the foregoing is not intended to limit the spirit, scope or intent of the invention. In certain embodiments, each of the destination agents 317 has a corresponding API.

In various embodiments, the HTTP stream 440 agent is implemented for providing various HTTP streams of cognitive insight data to a predetermined cognitive data consumer. In these embodiments, the provided HTTP streams may include various HTTP data elements familiar to those of skill in the art. In certain embodiments, the HTTP streams of data are provided in near-real-time. In various embodiments, the API connectors 441 agent is implemented to manage interactions with one or more predetermined APIs that are external to the cognitive platform 310. As an example, various target databases, business intelligence applications, and mobile applications may each have their own unique API.

In various embodiments, the databases 442 agent is implemented for provision of cognitive insight data to one or more target databases familiar to those of skill in the art. For example, the target database may include a SQL, NoSQL, delimited flat file, or other form of database. In these embodiments, the provided cognitive insight data may include a single data element, a single data record or file, or a plurality of data records or files. In certain embodiments, the data may be provided to more than one cognitive data consumer and the provided data may be in a homogenous or heterogeneous form. In various embodiments, the message engines 443 agent is implemented to provide cognitive insight data to one or more message engines, such as a message queue (MQ) system, a message bus, a message broker, an enterprise service bus (ESB), and so forth. Skilled practitioners of the art will realize that there are many such examples of message engines with which the message engines 443 agent may interact and the foregoing is not intended to limit the spirit, scope or intent of the invention.

In various embodiments, the custom destination agents 420, which are purpose-built, are developed through the use of the development environment 314, described in greater detail herein. Examples of custom destination agents 420 include destination agents for various electronic medical record (EMR) systems at various healthcare facilities. Such EMR systems typically collect a variety of healthcare information, much of it the same, yet it may be collected, stored and provided in different ways. In this example, the custom destination agents 420 allow such EMR systems to receive cognitive insight data in a form they can use.

In various embodiments, data that has been cleansed, normalized and enriched by the dataset engine, as described in greater detail herein, is provided by a destination agent 336 to a predetermined destination, likewise described in greater detail herein. In these embodiments, neither the graph query engine 326 nor the insight/learning engine 330 are implemented to perform their respective functions.

In various embodiments, the foundation components 334 are implemented to enable the dataset engine 322, the graph query engine 326, and the insight/learning engine 330 to perform their respective operations and processes. In these and other embodiments, the foundation components 334 may include an NLP core 436 component, an NLP services 437 component, and a dynamic pipeline engine 438. In various embodiments, the NLP core 436 component is implemented to provide a set of predetermined NLP components for performing various NLP operations described in greater detail herein.

In these embodiments, certain of these NLP core components are surfaced through the NLP services 437 component, while some are used as libraries. Examples of operations that are performed with such components include dependency parsing, parts-of-speech tagging, sentence pattern detection, and so forth. In various embodiments, the NLP services 437 component is implemented to provide various internal NLP services, which are used to perform entity detection, summarization, and other operations, likewise described in greater detail herein. In these embodiments, the NLP services 437 component is implemented to interact with the NLP core 436 component to provide predetermined NLP services, such as summarizing a target paragraph.

In various embodiments, the dynamic pipeline engine 438 is implemented to interact with the dataset engine 322 to perform various operations related to receiving one or more sets of data from one or more sourcing agents, apply enrichment to the data, and then provide the enriched data to a predetermined destination. In these and other embodiments, the dynamic pipeline engine 438 manages the distribution of these various operations to a predetermined compute cluster and tracks versioning of the data as it is processed across various distributed computing resources. In certain embodiments, the dynamic pipeline engine 438 is implemented to perform data sovereignty management operations to maintain sovereignty of the data.

In various embodiments, the platform data 338 includes various data repositories, described in greater detail herein, that are accessed by the cognitive platform 310 to generate cognitive insights. In these embodiments, the platform data 338 repositories may include repositories of dataset metadata 456, cognitive graphs 457, models 459, crawl data 460, and management metadata 461. In various embodiments, the dataset metadata 456 is associated with curated data 458 contained in the repository of cognitive graphs 457. In these and other embodiments, the repository of dataset metadata 456 contains dataset metadata that supports operations performed by the storage 424 component of the dataset engine 322. For example, if a Mongo® NoSQL database with ten million items is being processed, and the cognitive platform 310 fails after ingesting nine million of the items, then the dataset metadata 456 may be able to provide a checkpoint that allows ingestion to continue at the point of failure instead restarting the ingestion process.

Those of skill in the art will realize that the use of such dataset metadata 456 in various embodiments allows the dataset engine 322 to be stateful. In certain embodiments, the dataset metadata 456 allows support of versioning. For example versioning may be used to track versions of modifications made to data, such as in data enrichment processes described in greater detail herein. As another example, geotagging information may have been applied to a set of data during a first enrichment process, which creates a first version of enriched data. Adding sentiment data to the same million records during a second enrichment process creates a second version of enriched data. In this example, the dataset metadata stored in the dataset metadata 456 provides tracking of the different versions of the enriched data and the differences between the two.

In various embodiments, the repository of cognitive graphs 457 is implemented to store cognitive graphs generated, accessed, and updated by the cognitive engine 320 in the process of generating cognitive insights. In various embodiments, the repository of cognitive graphs 457 may include one or more repositories of curated data 458, described in greater detail herein. In certain embodiments, the repositories of curated data 458 includes data that has been curated by one or more users, machine operations, or a combination of the two, by performing various sourcing, filtering, and enriching operations described in greater detail herein. In these and other embodiments, the curated data 458 is ingested by the cognitive platform 310 and then processed, as likewise described in greater detail herein, to generate cognitive insights. In various embodiments, the repository of models 459 is implemented to store models that are generated, accessed, and updated by the cognitive engine 320 in the process of generating cognitive insights. As used herein, models broadly refer to machine learning models. In certain embodiments, the models include one or more statistical models.

In various embodiments, the crawl framework 452 is implemented to support various crawlers 454 familiar to skilled practitioners of the art. In certain embodiments, the crawlers 454 are custom configured for various target domains. For example, different crawlers 454 may be used for various travel forums, travel blogs, travel news and other travel sites. In various embodiments, data collected by the crawlers 454 is provided by the crawl framework 452 to the repository of crawl data 460. In these embodiments, the collected crawl data is processed and then stored in a normalized form in the repository of crawl data 460. The normalized data is then provided to SQL/NoSQL database 417 agent, which in turn provides it to the dataset engine 322. In one embodiment, the crawl database 460 is a NoSQL database, such as Mongo®.

In various embodiments, the repository of management metadata 461 is implemented to store user-specific metadata used by the management console 312 to manage accounts (e.g., billing information) and projects. In certain embodiments, the user-specific metadata stored in the repository of management metadata 461 is used by the management console 312 to drive processes and operations within the cognitive platform 310 for a predetermined project. In various embodiments, the user-specific metadata stored in the repository of management metadata 461 is used to enforce data sovereignty. It will be appreciated that many such embodiments are possible and the foregoing is not intended to limit the spirit, scope or intent of the invention.

Referring now to FIG. 4c, the cloud infrastructure 340 may include a cognitive cloud management 342 component and a cloud analytics infrastructure 344 component in various embodiments. Current examples of a cloud infrastructure 340 include Amazon Web Services (AWS®), available from Amazon.com® of Seattle, Wash., IBM® Softlayer, available from International Business Machines of Armonk, N.Y., and Nebula/Openstack, a joint project between Raskspace Hosting®, of Windcrest, Tex. and the National Aeronautics and Space Administration (NASA). In these embodiments, the cognitive cloud management 342 component may include a management playbooks 468 sub-component, a cognitive cloud management console 469 sub-component, a data console 470 sub-component, an asset repository 471 sub-component. In certain embodiments, the cognitive cloud management 342 component may include various other sub-components.

In various embodiments, the management playbooks 468 sub-component is implemented to automate the creation and management of the cloud analytics infrastructure 344 component along with various other operations and processes related to the cloud infrastructure 340. As used herein, "management playbooks" broadly refers to any set of instructions or data, such as scripts and configuration data, that is implemented by the management playbooks 468 sub-component to perform its associated operations and processes.

In various embodiments, the cognitive cloud management console 469 sub-component is implemented to provide a user visibility and management controls related to the cloud analytics infrastructure 344 component along with various other operations and processes related to the cloud infrastructure 340. In various embodiments, the data console 470 sub-component is implemented to manage platform data 338, described in greater detail herein. In various embodiments, the asset repository 471 sub-component is implemented to provide access to various cognitive cloud infrastructure assets, such as asset configurations, machine images, and cognitive insight stack configurations.

In various embodiments, the cloud analytics infrastructure 344 component may include a data grid 472 sub-component, a distributed compute engine 474 sub-component, and a compute cluster management 476 sub-component. In these embodiments, the cloud analytics infrastructure 344 component may also include a distributed object storage 478 sub-component, a distributed full text search 480 sub-component, a document database 482 sub-component, a graph database 484 sub-component, and various other sub-components. In various embodiments, the data grid 472 sub-component is implemented to provide distributed and shared memory that allows the sharing of objects across various data structures. One example of a data grid 472 sub-component is Redis, an open-source, networked, in-memory, key-value data store, with optional durability, written in ANSI C. In various embodiments, the distributed compute engine 474 sub-component is implemented to allow the cognitive platform 310 to perform various cognitive insight operations and processes in a distributed computing environment. Examples of such cognitive insight operations and processes include batch operations and streaming analytics processes.

In various embodiments, the compute cluster management 476 sub-component is implemented to manage various computing resources as a compute cluster. One such example of such a compute cluster management 476 sub-component is Mesos/Nimbus, a cluster management platform that manages distributed hardware resources into a single pool of resources that can be used by application frameworks to efficiently manage workload distribution for both batch jobs and long-running services. In various embodiments, the distributed object storage 478 sub-component is implemented to manage the physical storage and retrieval of distributed objects (e.g., binary file, image, text, etc.) in a cloud environment. Examples of a distributed object storage 478 sub-component include Amazon S3®, available from Amazon.com of Seattle, Wash., and Swift, an open source, scalable and redundant storage system.

In various embodiments, the distributed full text search 480 sub-component is implemented to perform various full text search operations familiar to those of skill in the art within a cloud environment. In various embodiments, the document database 482 sub-component is implemented to manage the physical storage and retrieval of structured data in a cloud environment. Examples of such structured data include social, public, private, and device data, as described in greater detail herein. In certain embodiments, the structured data includes data that is implemented in the JavaScript Object Notation (JSON) format. One example of a document database 482 sub-component is Mongo, an open source cross-platform document-oriented database. In various embodiments, the graph database 484 sub-component is implemented to manage the physical storage and retrieval of cognitive graphs. One example of a graph database 484 sub-component is GraphDB, an open source graph database familiar to those of skill in the art.

Figure 5:
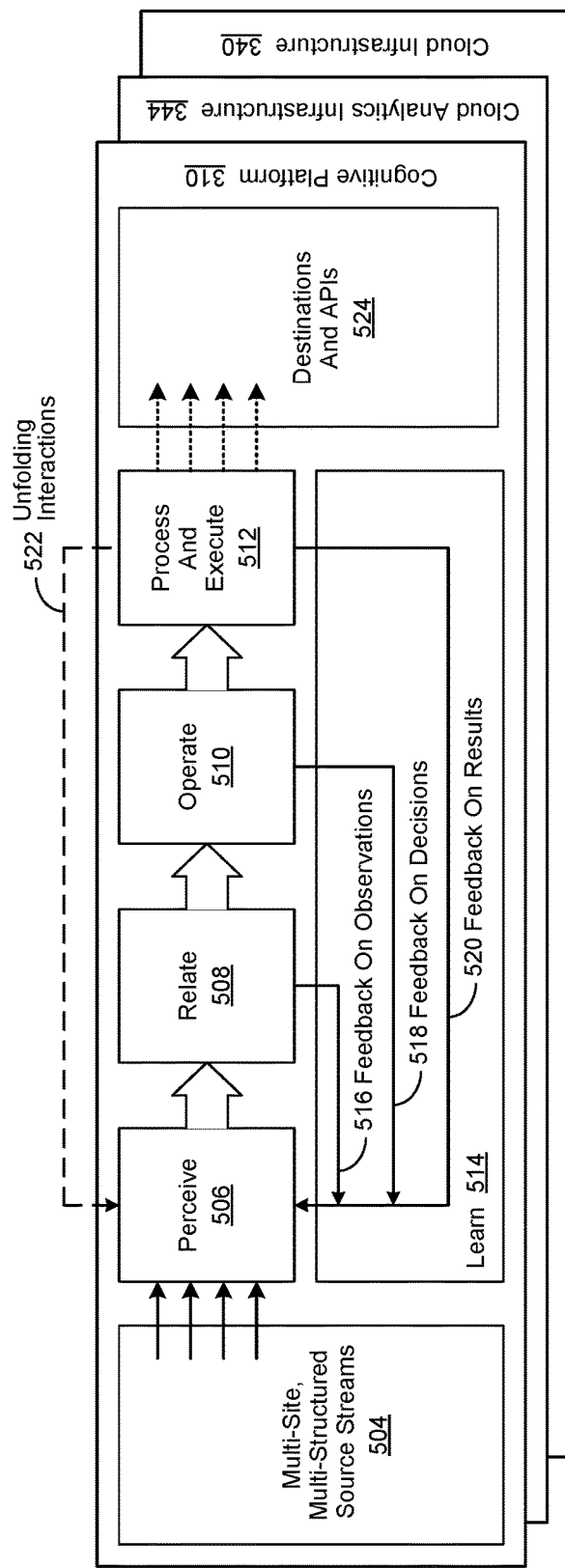
FIG. 5 is a simplified process diagram of CILS operations.

FIG. 5 is a simplified process diagram of cognitive inference and learning system (CILS) operations performed in accordance with an embodiment of the invention. In various embodiments, these CILS operations may include a perceive 506 phase, a relate 508 phase, an operate 510 phase, a process and execute 512 phase, and a learn 514 phase. In these and other embodiments, the CILS 118 shown in FIG. 2 is implemented to mimic cognitive processes associated with the human brain. In various embodiments, the CILS operations are performed through the implementation of a cognitive platform 310, described in greater detail herein. In these and other embodiments, the cognitive platform 310 may be implemented within a cloud analytics infrastructure 344, which in turn is implemented within a cloud infrastructure 340, likewise described in greater detail herein.

In various embodiments, multi-site, multi-structured source streams 504 are provided by sourcing agents, as described in greater detail herein. In these embodiments, the source streams 504 are dynamically ingested in real-time during the perceive 506 phase, and based upon a predetermined context, extraction, parsing, and tagging operations are performed on language, text and images contained in the source streams 504. Automatic feature extraction and modeling operations are then performed with the previously processed source streams 504 during the relate 508 phase to generate queries to identify related data (i.e., corpus expansion).

In various embodiments, operations are performed during the operate 510 phase to discover, summarize and prioritize various concepts, which are in turn used to generate actionable recommendations and notifications associated with predetermined plan-based optimization goals. The resulting actionable recommendations and notifications are then processed during the process and execute 512 phase to provide cognitive insights, such as recommendations, to various predetermined destinations and associated application programming interfaces (APIs) 524.

In various embodiments, features from newly-observed data are automatically extracted from user feedback during the learn 514 phase to improve various analytical models. In these embodiments, the learn 514 phase includes feedback on observations generated during the relate 508 phase, which is provided to the perceive 506 phase. Likewise, feedback on decisions resulting from operations performed during the operate 510 phase, and feedback on results resulting from operations performed during the process and execute 512 phase, are also provided to the perceive 506 phase.

In various embodiments, user interactions result from operations performed during the process and execute 512 phase. In these embodiments, data associated with the user interactions are provided to the perceive 506 phase as unfolding interactions 522, which include events that occur external to the CILS operations described in greater detail herein. As an example, a first query from a user may be submitted to the CILS system, which in turn generates a first cognitive insight, which is then provided to the user. In response, the user may respond by providing a first response, or perhaps a second query, either of which is provided in the same context as the first query. The CILS receives the first response or second query, performs various CILS operations, and provides the user a second cognitive insight. As before, the user may respond with a second response or a third query, again in the context of the first query. Once again, the CILS performs various CILS operations and provides the user a third cognitive insight, and so forth. In this example, the provision of cognitive insights to the user, and their various associated responses, results in unfolding interactions 522, which in turn result in a stateful dialog that evolves over time. Skilled practitioners of the art will likewise realize that such unfolding interactions 522, occur outside of the CILS operations performed by the cognitive platform 310.

Figure 6:
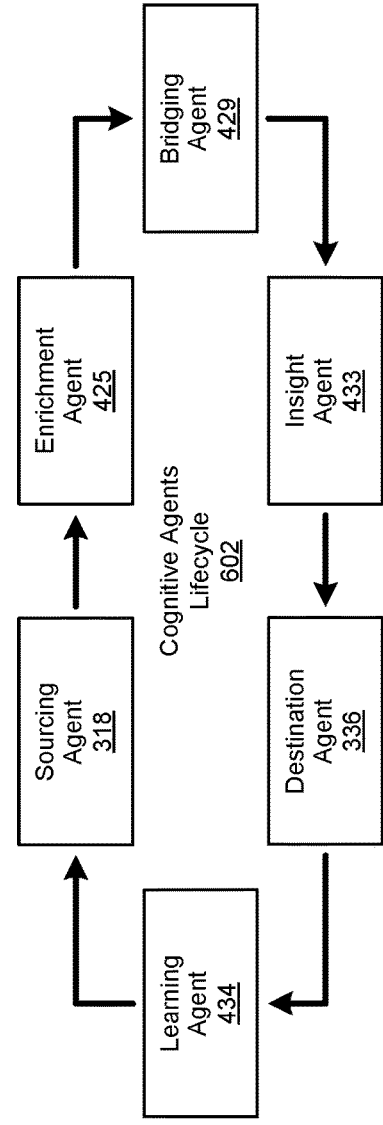
FIG. 6 depicts the lifecycle of CILS agents implemented to perform CILS operations.

FIG. 6 depicts the lifecycle of CILS agents implemented in accordance with an embodiment of the invention to perform CILS operations. In various embodiments, the CILS agents lifecycle 602 may include implementation of a sourcing 317 agent, an enrichment 425 agent, a bridging 429 agent, an insight 433 agent, a destination 336 agent, and a learning 434 agent. In these embodiments, the sourcing 317 agent is implemented to source a variety of multi-site, multi-structured source streams of data described in greater detail herein. These sourced data streams are then provided to an enrichment 425 agent, which then invokes an enrichment component to perform enrichment operations to generate enriched data streams, likewise described in greater detail herein.

The enriched data streams are then provided to a bridging 429 agent, which is used to perform bridging operations described in greater detail herein. In turn, the results of the bridging operations are provided to an insight 433 agent, which is implemented as described in greater detail herein to create a visual data story, highlighting user-specific insights, relationships and recommendations. The resulting visual data story is then provided to a destination 336 agent, which is implemented to publish cognitive insights to a consumer of cognitive insight data, likewise as described in greater detail herein. In response, the consumer of cognitive insight data provides feedback to a learning 434 agent, which is implemented as described in greater detail herein to provide the feedback to the sourcing agent 317, at which point the CILS agents lifecycle 602 is continued. From the foregoing, skilled practitioners of the art will recognize that each iteration of the cognitive agents lifecycle 602 provides more informed cognitive insights.

Figure 7:
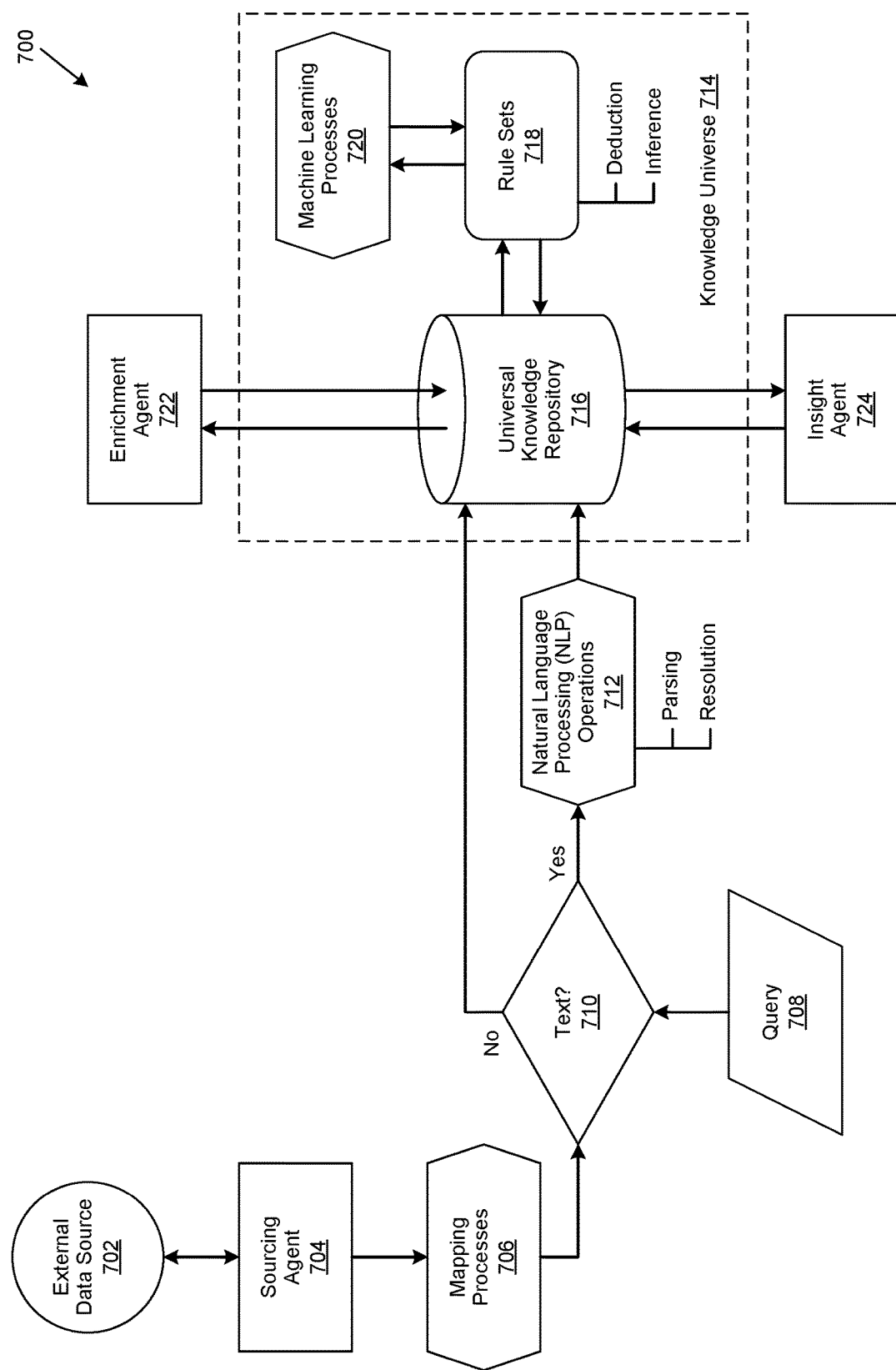
FIG. 7 is a simplified block diagram of a universal knowledge repository used to perform CILS operations.

FIG. 7 is a simplified block diagram of a universal knowledge repository environment 700 implemented in accordance with an embodiment of the invention to perform Cognitive Inference and Learning System (CILS) operations. As used herein, a universal knowledge repository broadly refers to a collection of knowledge elements that can be used in various embodiments to generate one or more cognitive insights described in greater detail herein. In various embodiments, these knowledge elements may include facts (e.g., milk is a dairy product), information (e.g., an answer to a question), descriptions (e.g., the color of an automobile), skills (e.g., the ability to install plumbing fixtures), and other classes of knowledge familiar to those of skill in the art. In these embodiments, the knowledge elements may be explicit or implicit. As an example, the fact that water freezes at zero degrees centigrade would be an explicit knowledge element, while the fact that an automobile mechanic knows how to repair an automobile would be an implicit knowledge element.

In this embodiment, a sourcing agent 704 is implemented by a CILS 700 to perform data sourcing operations, as described in greater detail herein, to source data from an external data source 702, which is one of a plurality of data sources on which data sourcing operations are performed. In various embodiments, the data sourced from an external data source may include social data, public data, licensed data, proprietary data, or any combination thereof. Mapping processes 706, likewise described in greater detail herein, are then performed on the sourced data, followed by a determination being made in decision block 710 whether the sourced data contains text. In certain embodiments, a query 708, such as a user query, is received by the CILS 700, likewise followed by a determination being made in decision block 710 whether the query 708 contains text.

If it is determined in decision block 710 that the sourced data or query 708 contains text, then Natural Language Processing (NLP) 712 operations, described in greater detail herein, are respectively performed on the sourced data or query 708. In certain embodiments, the natural language processes 712 may include parsing and resolution operations familiar to those of skill in the art. The results of the NLP 712 operations are then provided to the knowledge universe 714 for further processing. However, if it was determined in decision block 710 that the sourced data or received query 708 does not contain text, then it is likewise provided to the knowledge universe 714 for further processing. The parsed, or non-parsed, data is then stored in the universal knowledge repository 716 as knowledge elements.

As shown in FIG. 7, the knowledge universe 714 includes a universal knowledge repository 716, which is implemented in various embodiments with rule sets 718 to process the results of NLP 712 operations, or alternatively, sourced data and queries 708 that do not contain text. In these embodiments, the rule sets 718 are used by the CILS 700 in combination with the universal knowledge repository 716 to perform deduction and inference operations described in greater detail herein. In certain embodiments, the rule sets are implemented with machine learning processes 720, familiar to skilled practitioners of the art, to perform the deduction and inference operations. In various embodiments, one or more components of the universal knowledge repository environment 700 combine to provide an ingestion pipeline via which information is ingested into (i.e., processed for stored storage within) the universal knowledge repository 716. In certain embodiments, the ingestion pipeline performs parsing operations, machine learning operations and conceptualization operations. In various embodiments, the parsing operations produces a plurality of parse trees, the machine learning operations resolve which knowledge elements within the parse tree provide a best result representing a meaning of the text, the machine learning operation identifying knowledge elements of the plurality of parse trees (i.e., a parse forest) representing ambiguous portions of the text, and the conceptualization operations identify relationships of concepts identified from within the plurality of parse trees produced via the parsing operation and store knowledge elements within the cognitive graph in a configuration representing the relationship of the concepts. In certain embodiments, the conceptualization operation identifies the relationships of the concepts using information stored within the cognitive graph. In certain embodiments, the machine learning operations resolve the plurality of parse trees to a best tree representing an interpretation of the ambiguous portions of the text. In certain embodiments, the interpretation of the ambiguous portions of text may change based upon feedback.

In various embodiments, the universal knowledge repository 716 is implemented in combination with an enrichment agent 722 to perform enrichment operations, described in greater detail herein. In certain embodiments, the results of the machine learning, enrichment, or deduction and learning operations, or a combination thereof, are then stored in the universal knowledge repository 716 as knowledge elements. In various embodiments, the universal knowledge repository 716 is implemented with an insight agent 724 (such as the insight agent 433) for the generation of cognitive insights (including composite insights), likewise described in greater detail herein. In certain embodiments, the insight agent 724 accesses a plurality of query related knowledge elements, processes a query related insight to identify a meaning of a query from a user and accesses a plurality of answer related knowledge elements. In certain embodiments, the insight agent 724 traverses a plurality of answer related knowledge elements within the cognitive graph, the traversing being based upon the meaning of the query inferred by the insight agent 724. In certain embodiments, the traversing comprises the insight agent 724 accessing nodes of interest (i.e., nodes relating to a particular query based upon concepts identified by the nodes) with greater and greater detail based upon nodes related via edges.

In various embodiments, the knowledge elements within a universal knowledge repository 716 may include statements, assertions, beliefs, perceptions, preferences, sentiments, attitudes or opinions associated with a person or a group. As an example, user 'A' may prefer the pizza served by a first restaurant, while user 'B' may prefer the pizza served by a second restaurant. Furthermore, both user 'A' and 'B' may be firmly of the opinion that the first and second restaurants respectively serve the very best pizza available. In this example, the respective preferences and opinions of users 'A' and 'B' regarding the first and second restaurant may be included in the universal knowledge repository 716 as they are not contradictory. Instead, they are simply knowledge elements respectively associated with the two users and can be used in various embodiments for the generation of various cognitive insights, as described in greater detail herein.

In certain embodiments, knowledge elements, are persistently stored within the universal knowledge repository (i.e., once stored within a universal knowledge repository 716, each knowledge element is not deleted, overwritten or modified). Knowledge elements are persisted in their original form (i.e., with all knowledge elements once stored, the original form of the knowledge element is continuously maintained within the universal graph). As an example, a first knowledge element (e.g., a statement or assertion) sourced from a first source and with an associated first time stamp may be contradicted by a second knowledge element sourced from a second source and associated with a second time stamp. As another example, a first knowledge element may be contradicted by a second knowledge element sourced from the same source, but with different associated time stamps. As yet another example, a first knowledge element may be contradicted by a second knowledge element sourced respectively from a first source and a second source, but their associated time stamps may be the same, or approximate thereto. As yet still another example, a first knowledge element may be found to be incorrect as a result of the addition of a second knowledge element related to the same subject. Those of skill in the art will recognize that many such embodiments and examples are possible and the foregoing is not intended to limit the spirit, scope or intent of the invention.

In various embodiments, knowledge is universally represented within the universal knowledge repository 716 such that the knowledge can be universally accessed regardless of a knowledge domain associated with the knowledge. As used herein, universally represented broadly refers to a faithful representation of the knowledge such that the knowledge is repeatably accessible within the universal knowledge repository, regardless of the actual location where the knowledge is stored. In these embodiments, information is first normalized to a common model of representation to allow deductions and correlations to be made between disparate data sets. This normalized model, which is based upon natural language rather than an arbitrarily defined schema, allows both structured and unstructured data to be understood in the same way by providing a non-arbitrary, universally recognizable schema.

In particular, this approach to cognitive knowledge representation (i.e., where knowledge is universally represented in both accessibility and domain) is domain-nonspecific, or encompassing of all domains universally, because language itself expresses concepts cross-domain. In various embodiments, domains are used to aid in resolution. As an example, "planes of existence" are less likely to be discussed in a travel context than are "airplanes," but both are still possible interpretations of the word "plane." Such an approach allows resolution to be descriptive rather than rule-based. To continue the example, if a machine learning algorithm detects a change, moving from "airplane" to "plane of existence" as the predominant likely interpretation, changes can be made without manual reprogramming.

As another example, a travel company may not have the concept for a "Jazzercise unitard" within their business domain model, but a consumer could potentially ask "What's the best place to buy a jazzercise unitard in San Diego while I'm visiting on vacation?" In this example, both the travel and retail domains are invoked and almost any combination is conceivable. With traditional search approaches, the consumer is instructed not to cross the two domains, which would likely result in inaccurate or non-relevant results. In contrast, the consumer can ask whatever they wish in a cognitive query and receive more accurate or relevant search results through the implementation of the universal knowledge repository 716.

In various embodiments, the CILS 700 processes queries 708 no differently than answer data, aside from the response-prompt. In these embodiments, both queries and answers to queries are stored in the universal knowledge repository 716 in the same way (i.e., via a consistent, non-arbitrary, universally recognizable schema). Queries are stored as query related knowledge elements and answers are stored as answer related knowledge elements. This storage is effectively conceptualization or "understanding" of the data, as both the question and the answer need to be equally understood. As an example, if a user inputs the following query 708, their reference can be handled as either a question or as an answer to a question:

"Are electric guitars cool?"
→ "Obviously."
→ "You're the 5th person to ask that question. I guess so."

In various embodiments, the universal knowledge repository 716 is implemented as a universal cognitive graph, with each concept it contains having its own representation, from classes, to types, to instance data. In these embodiments, there is no schematic distinction between a class and an instance of that class. As an example, "patient" and "patient #12345" are both stored in the graph, and may be accessed through the same traversals. In various embodiments, the universal cognitive graphs contain a plurality of knowledge elements which are stored as nodes within the graph and subsets of nodes (e.g., pairs of nodes) are related via edges.

Figure 8A:
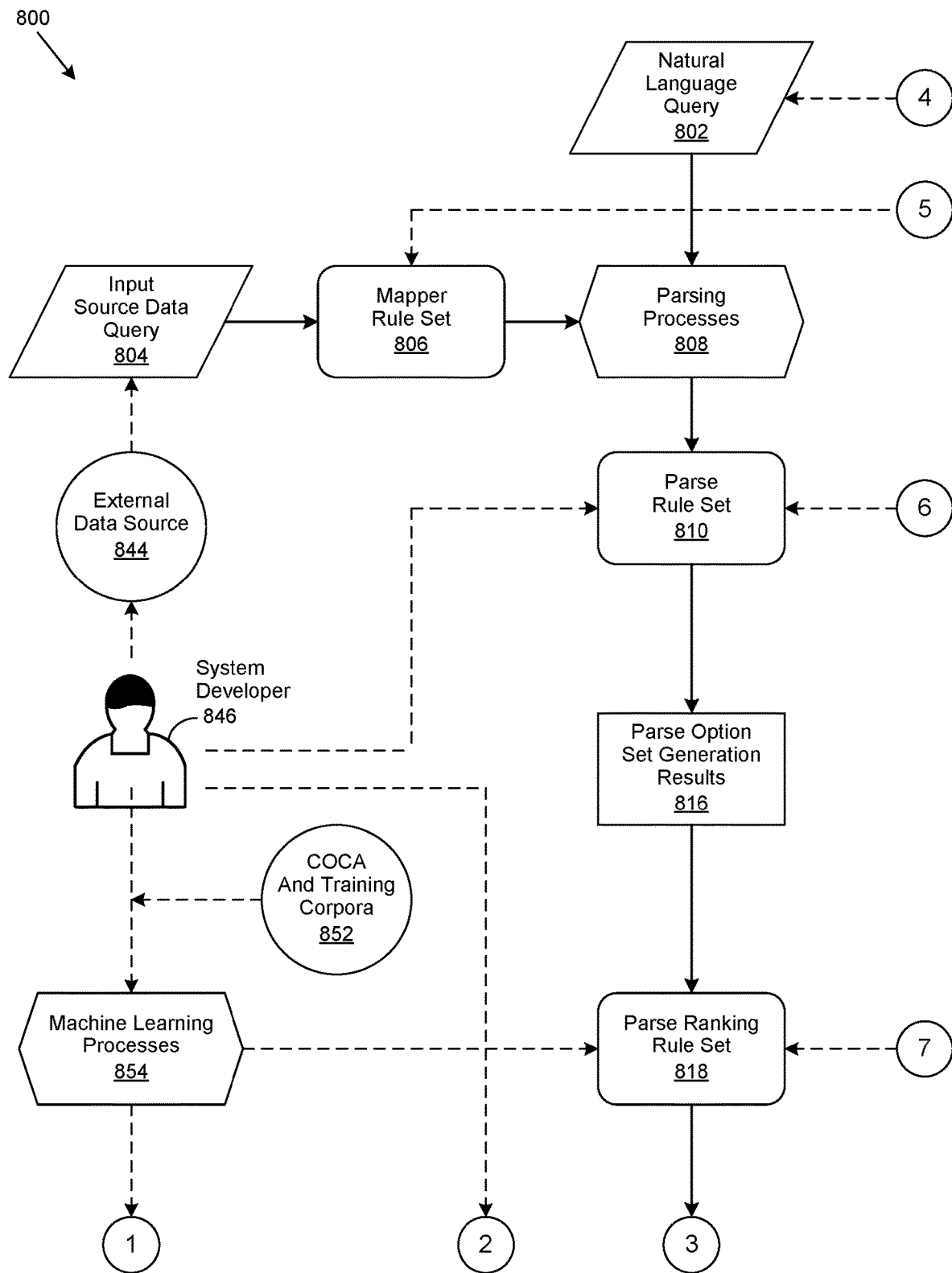
FIGS. 8a through 8c are a simplified block diagram of the performance of operations related to the use of a universal knowledge repository by a CILS for the generation of cognitive insights.
Figure 8B:
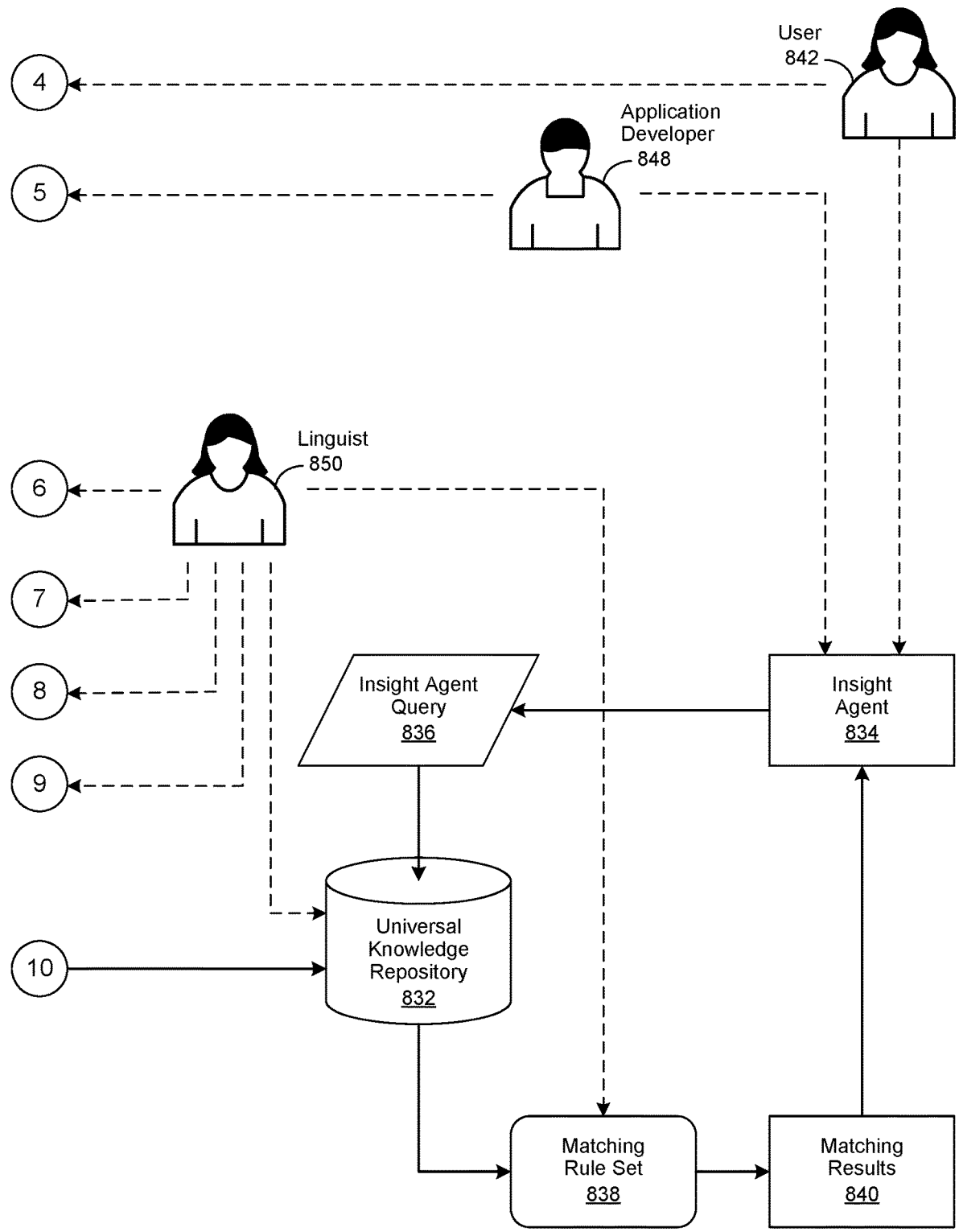
Figure 8C:
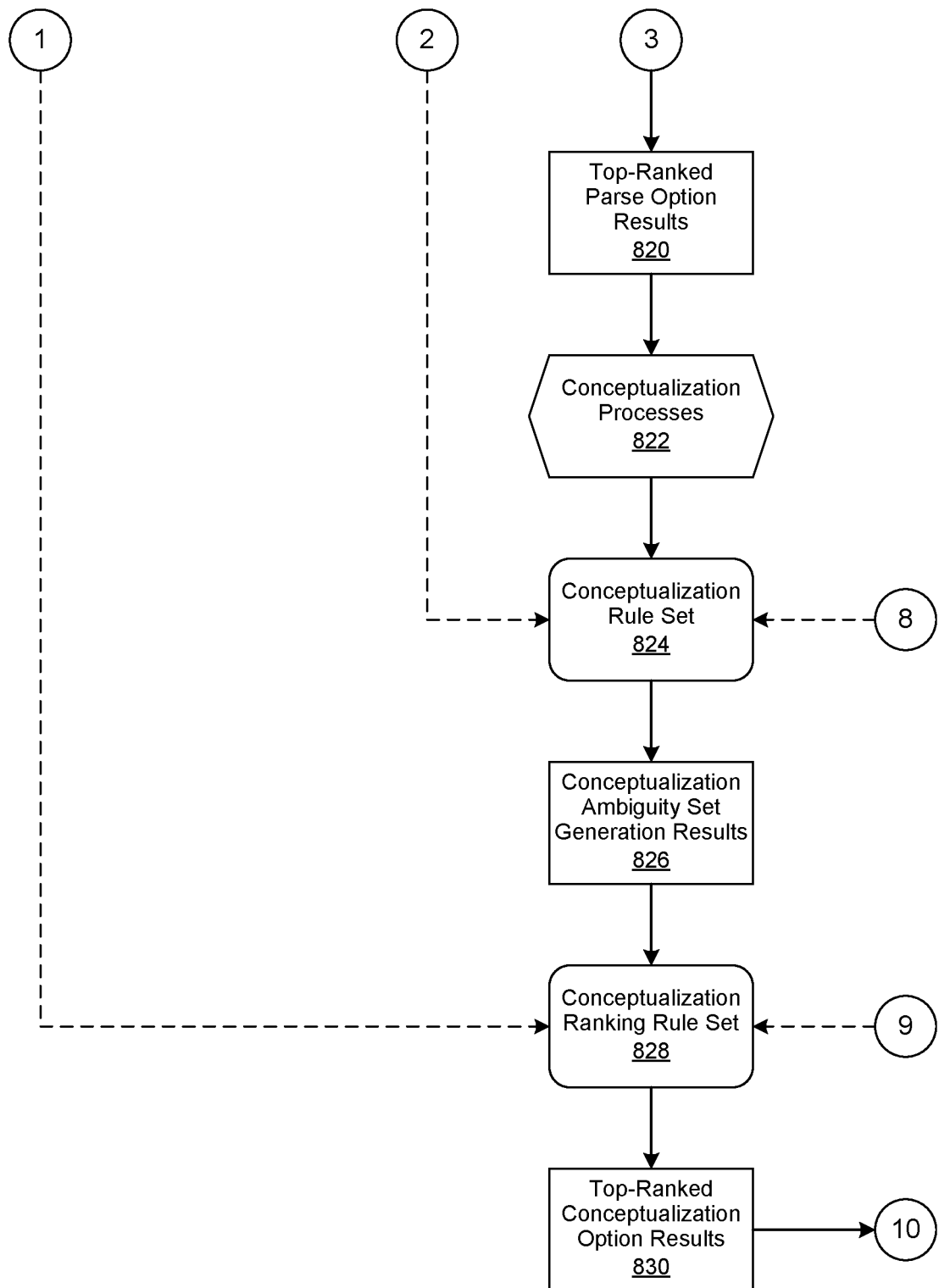

FIGS. 8a through 8c are a simplified process flow diagram of the performance of operations related to the use of a universal knowledge repository implemented in accordance with an embodiment of the invention by a Cognitive Inference and Learning System (CILS) for the generation of cognitive insights. In various embodiments, a query such as a natural language query 802 is received by a CILS 800. In certain embodiments, the natural language query may be originated by a user 842.

In various embodiments, an input source data query 804 is likewise received by a CILS 800. In certain embodiments, the input source data query 804 uses data received from an external data source 844, described in greater detail herein. In various embodiments, the external data source 844 is administered by a system developer 846. In these embodiments, a mapper rule set 806, described in greater detail herein, is used to perform mapping operations (such as Mapping processes) on the input source data query 804. In certain embodiments, the mapper rule set 806 is administered by a user 848, such as an application developer.

Parsing operations 808, described in greater detail herein, are then performed on the natural language query 802, or the input source data query 804, once the mapper rule set 806 has been used to perform the mapping operations. In various embodiments, the parsing operation 808 comprises lossless parsing operations. As used herein, a lossless parsing operation may be defined as a parsing operation in which all parse variations are identified using a minimum basic structure that is known true. In certain embodiments, the lossless parsing operation uses a baseline generalized grammar via which all language can be parsed. In certain embodiments, machine learning is applied to the all possible known true parse variations to identify ambiguities and separate out error possibilities.

In various embodiments, a parse rule set 810 is used to perform the parsing processes 808. In certain embodiments, the parse rule set 810 is administered by a system developer 846. In certain embodiments, the parse rule set 810 is administered by a linguist 850.

The use of the parse rule set 810 in the performance of the parsing processes 808 results in the generation of a set of parse options 816 (i.e., a set of parse trees (i.e., a parse forest)). In certain embodiments, each parse tree represents an alternate parse of the text being parsed. A parse ranking rule set 818 is then used to rank the resulting set of parse options 816, which results in the determination of the top-ranked parse options 820 (i.e. highly-ranked parse trees based upon the parse ranking rule set). In various embodiments, the parse ranking rule set 818 is automatically instantiated through the use of machine learning processes 854 familiar to those of skill in the art, manually instantiated by a linguist 850, or some combination thereof. In one embodiment, the parse ranking rule set 818 is administered by a linguist 850. In another embodiment, the machine learning processes 854 are administered by a system developer 841. In certain embodiments, the Corpus of Contemporary American English (COCA), other training corpora familiar to skilled practitioner of the art, or some combination thereof, is used as a reference to train the machine learning processes 854. In various embodiments, the parse ranking rule set ranks which of the parse trees are likely to provide a preferred (e.g., correct) resolution of the parsing operation. In various embodiments, the parse ranking rule set 818 includes sets of rules for each parsed element based upon what is trustworthy and what is not trustworthy. In various embodiments, if a parsing of data is incorrect, then learning (e.g., machine learning) is applied over time to adjust the parse ranking rule set to provide a more accurate parse. In certain embodiments, the learning is based upon feedback provided over time regarding the parsing of the data. In certain embodiments, machine learning is used to rank parse variations within the parse ranking rule set. In certain embodiments, the machine learning uses feedback to produce a labeled set of parse options. In certain embodiments, context is used to resolve ambiguity and to adjust a resolution of the parse (i.e., to adjust the ranking of a parse within the parse rule set).

Conceptualization processes 822 (which may comprise conceptualization operations), described in greater detail herein, are then performed on the top-ranked parse option results 820. In various embodiments, the conceptualization processes 822 are performed through the use of a conceptualization rule set 824. In certain embodiments, the conceptualization rule set 824 is manually instantiated and administered by a system developer 846, a linguist 850, or some combination thereof.

The use of the conceptualization rule set 824 in the performance of the conceptualization operations 822 results in the generation of a set of conceptualization ambiguity options 826. A conceptualization ranking rule set 828 is then used to rank the resulting set of conceptualization ambiguity options 826, which results in the determination of the top-ranked conceptualization options 830 (i.e., highly ranked based upon application of the conceptualization ranking rule set). In various embodiments, the conceptualization ranking rule set 828 is automatically instantiated through the use of machine learning processes 854, manually instantiated by a linguist 850, or some combination thereof. In one embodiment, the conceptualization ranking rule set 828 is administered by a linguist 850. The top-ranked conceptualization options 830 are then stored in the universal knowledge repository 832. In various embodiments, the universal knowledge repository 816 is implemented as a universal cognitive graph. In certain embodiments, the universal knowledge repository 832 is administered by a linguist.

In various embodiments, an insight agent 834 generates an insight agent query 836, which is then submitted to the universal knowledge repository 832 for processing. In certain embodiments, a matching rule set 838 is used to process the insight agent query 836, which 834 results in the generation of matching results 838. In one embodiment, the matching rule set is administered by a linguist 850. The matching results are then provided back to the insight agent 834. In one embodiment, the insight agent query 836 is generated as a result of direct or indirect input, described in greater detail herein, by a user 842. In another embodiment, the insight agent is administered by an application developer 848.

Figure 9:
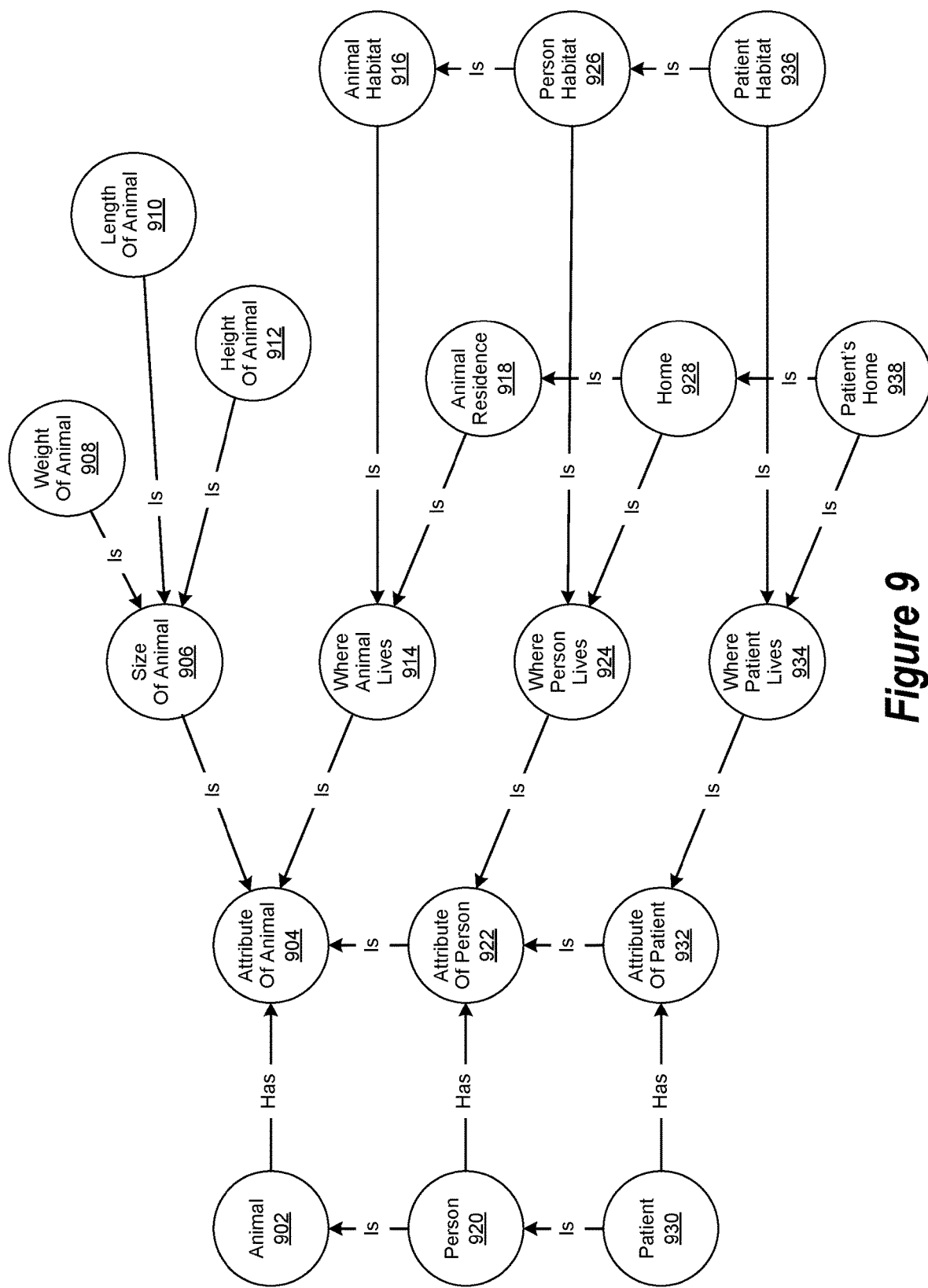
FIG. 9 is a simplified depiction of a universal schema.

FIG. 9 is a simplified depiction of an example universal schema implemented in accordance with an embodiment of the invention. Skilled practitioners of the art will be aware that natural language is an expression of cognition, following syntactic rules of a cultural grammar as well as logical rules of entailment. As used herein, entailment broadly refers to the concept of understanding language, within the context of one piece of information being related to another. For example, if a statement is made that implies 'x', and 'x is known to imply 'y', then by extension, the statement may imply 'y' as well. In this example, there is a chaining of evidence between the statement 'x' and 'y' that may result in a conclusion supported by the chain of evidence. As another example, based upon the study of philosophy, the statement that Socrates is a person, and all people are mortal, then the implication is that Socrates is mortal.

In various embodiments, a universal knowledge repository is implemented with an ontology that is based upon entities, which are anything that "is," and their attributes, which are anything that is "had." As used herein, an ontology may be defined as a representation of entities along with their properties and relations, according to a system of categories. In certain embodiments, the ontology universally represents knowledge where knowledge elements are structurally defined within the cognitive graph. In certain embodiments, two types of entities are implemented to represent all relationships within the universal knowledge repository through a categorical relationship (e.g., is a) and an attributive relationship (e.g., has a). This approach allows sentences to be rephrased in terms of "be" or "have" and either can be converted into the other. Accordingly, sentences can be rephrased to accommodate various permutations of whatever is present within the universal knowledge repository. In certain embodiments, a categorical relationship may be considered as inheritance of the entity and an attributive relationship may be considered as attribution of the entity.

In various embodiments, the universal knowledge repository is implemented as a universal cognitive graph. In certain of these embodiments, the universal cognitive graph may include an entailment graph, which not only provides a representation of set and type theories, but also models knowledge through inheritance. At any given node in the graph, upward relationships identify entailed concepts. It will be appreciated that one advantage of this approach is the ability to harness the simplest possible generalization of pathways within the universal cognitive graph to answer questions rather than hard-coding various question-and-answer pairs.

In various embodiments, every item within the universal knowledge repository ontology is a knowledge entity. More particularly, anything that "is," in any domain, whether real or unreal, is an entity, and any entity that is "had," is also an attribute. This includes both types and instances, such as:
 unicorn
 clinical study
 patient
 attribute of a patient
 patient #67432

In these embodiments, an inheritance relationship implies a tacit "can be" relationship in the other direction. For example, all persons are animals, and an animal "could be" a person if it meets the definition of person. Likewise, a child node in the universal cognitive graph inherits all the attributes of its parents and can further specify its own. A concept, like a type in type theory, represents a set of attributes. If two sets of attributes are not identical, then each represents a unique concept. Conversely, if two sets of attributes are identical, then they are represented by the same concept.

In various embodiments, entities are represented as nodes in a universal cognitive graph, and their corresponding attribute and inheritance relationships with other nodes are represented as graph edges. For example, as shown in FIG. 9, a "patient" node 930 is an entity that inherits from a "person" node 920, which in turn is an entity that inherits from an "animal" node 902. As likewise shown in FIG. 9, the inheritance relationships corresponding to nodes 930, 920, and 902 are respectively represented by "is a" graph edges.

Likewise, the "animal" node 902 has an attribute relationship with the "attribute of animal" node 904, the "person" node has an attribute relationship with the "attribute of person" node 922, and the "patient" node 930 has an attribute relationship with the "attribute of patient" node 932. As likewise shown in FIG. 9, the attribute relationships between nodes 902 and 904, nodes 920 and 922, and nodes 930 and 932, are respectively represented by a "has a" graph edge, and the inheritance relationships between nodes 904, 922, and 932 are respectively represented by "is a" graph edges.

To continue the example, the "size of animal" node 906 has an inheritance relationship with the "attribute of animal" node 904, represented by a "is a" graph edge. Furthermore, the "weight of animal" node 908, the "length of animal" node 910, and the "height of animal" node 912 all have an inheritance relationship with the "size of animal" node 906, each of which are respectively represented by a corresponding "is a" graph edge. Likewise, the "where animal lives" node 914, the "where person lives" node 924, and the "where patient lives" node 934 respectively have an inheritance relationship with the "attribute of animal" node 904, "attribute of person" node 922, and the "attribute of patient" node 932. As shown in FIG. 9, each of these inheritance relationships are respectively represented by a corresponding "is a" graph edge.

Continuing the example, the "animal habitat" node 916 and the "animal residence" node 917 both have an inheritance relationship with the "where animal lives" node 914. Likewise, the "person habitat" node 926 and the "home" node 928 both have an inheritance relationship with the "where person lives" node 924, and the "patient habitat" node 936 and the "patient's home" node 938 both have an inheritance relationship with the "where patient lives" node 934. In addition, the "patient's home" node 938 has an inheritance relationship with the "home" node 928, which in turn has an inheritance relationship with the "animal residence" node 917. Likewise, the "patient habitat" node 936 has an inheritance relationship with the "person habitat" node 926, which in turn has an inheritance relationship with the "animal habitat" node 916. As shown in FIG. 9, these inheritance relationships are respectively represented by a corresponding "is a" graph edge.

From the foregoing, skilled practitioners of the art will recognize that if the "patient" node 930 of the universal cognitive graph depicted in FIG. 9 is queried, then both the "person" node 920 and the "animal" node 902 are entailed due to their respective inheritance relationships. Furthermore, the "person" node 920 does not have attribute relationships with individual attribute nodes, such as the "home" node 928. Instead, the "person" node 920 has an attribute relationship with the "attribute of person" node 922, which in turn has direct and indirect relationships with other attribute nodes (e.g., nodes 924, 826, 928), which represent attributes that are indigenous to a person.

Figure 10:
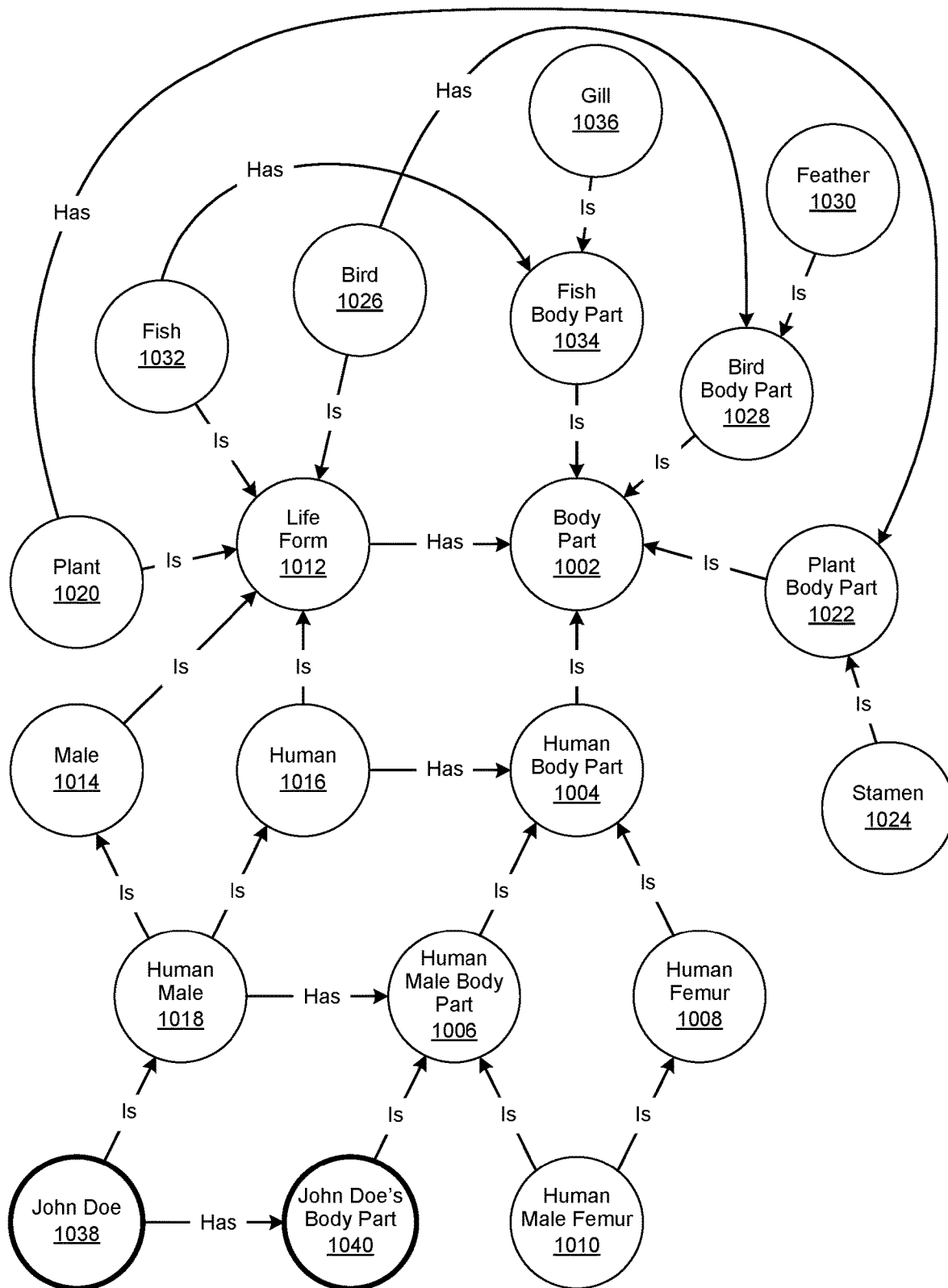
FIG. 10 depicts the use of diamond and ladder entailment patterns to accurately and precisely model knowledge elements in a universal cognitive graph.
Figure 11A:
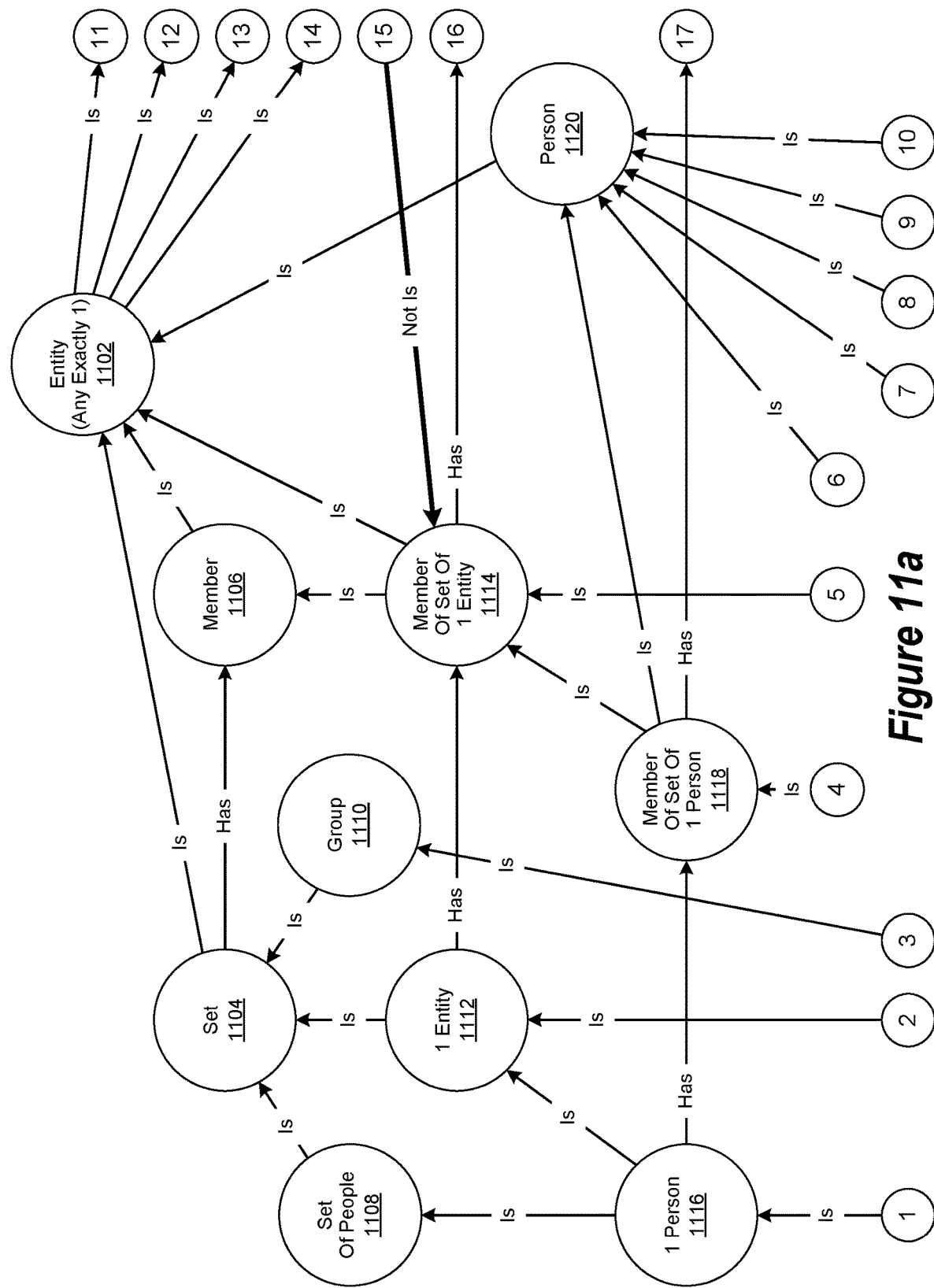
FIGS. 11a through 11d are a simplified graphical representation of quantity modeled as knowledge elements in a universal cognitive graph.
Figure 11B:
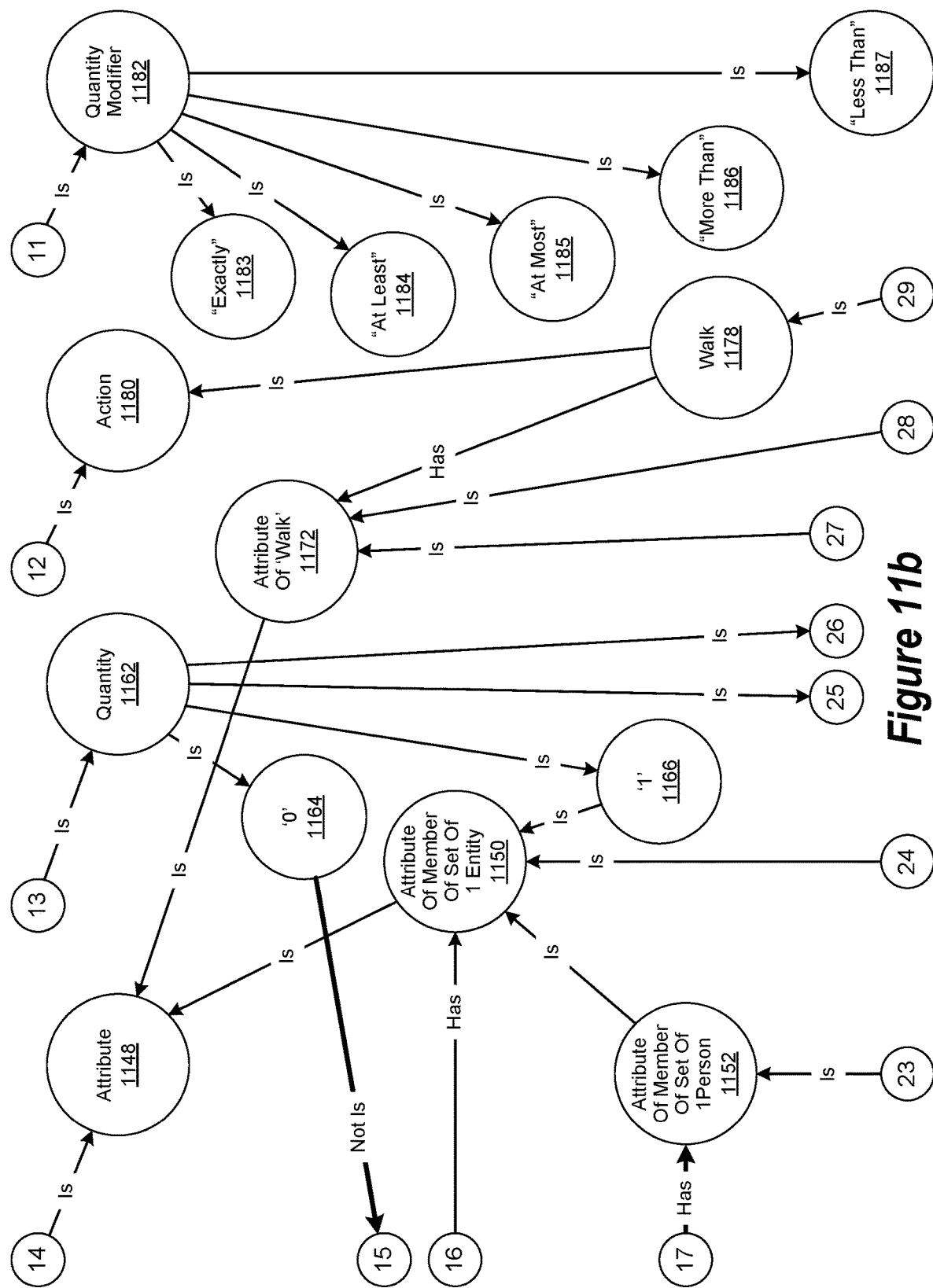
Figure 11C:
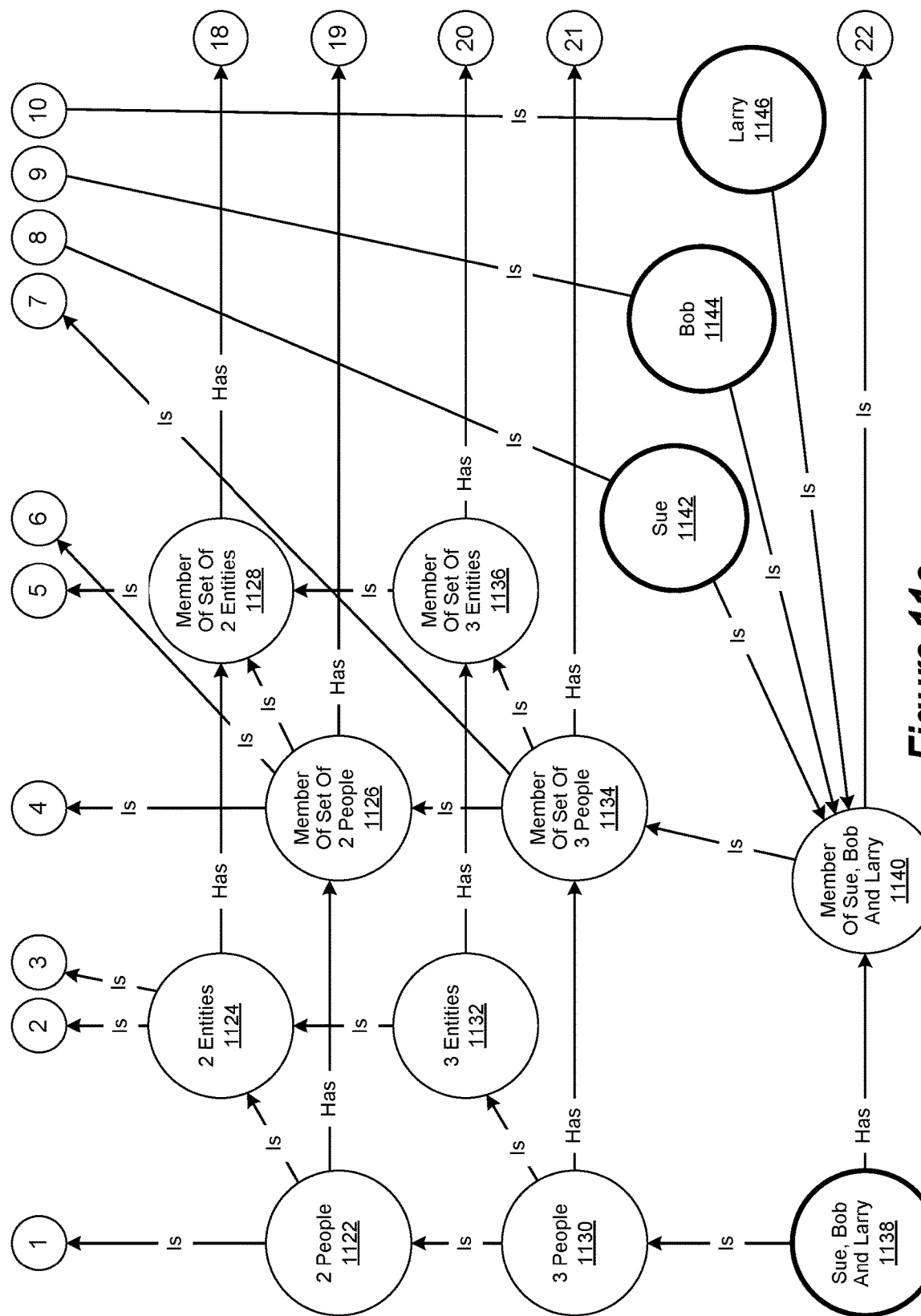
Figure 11D:
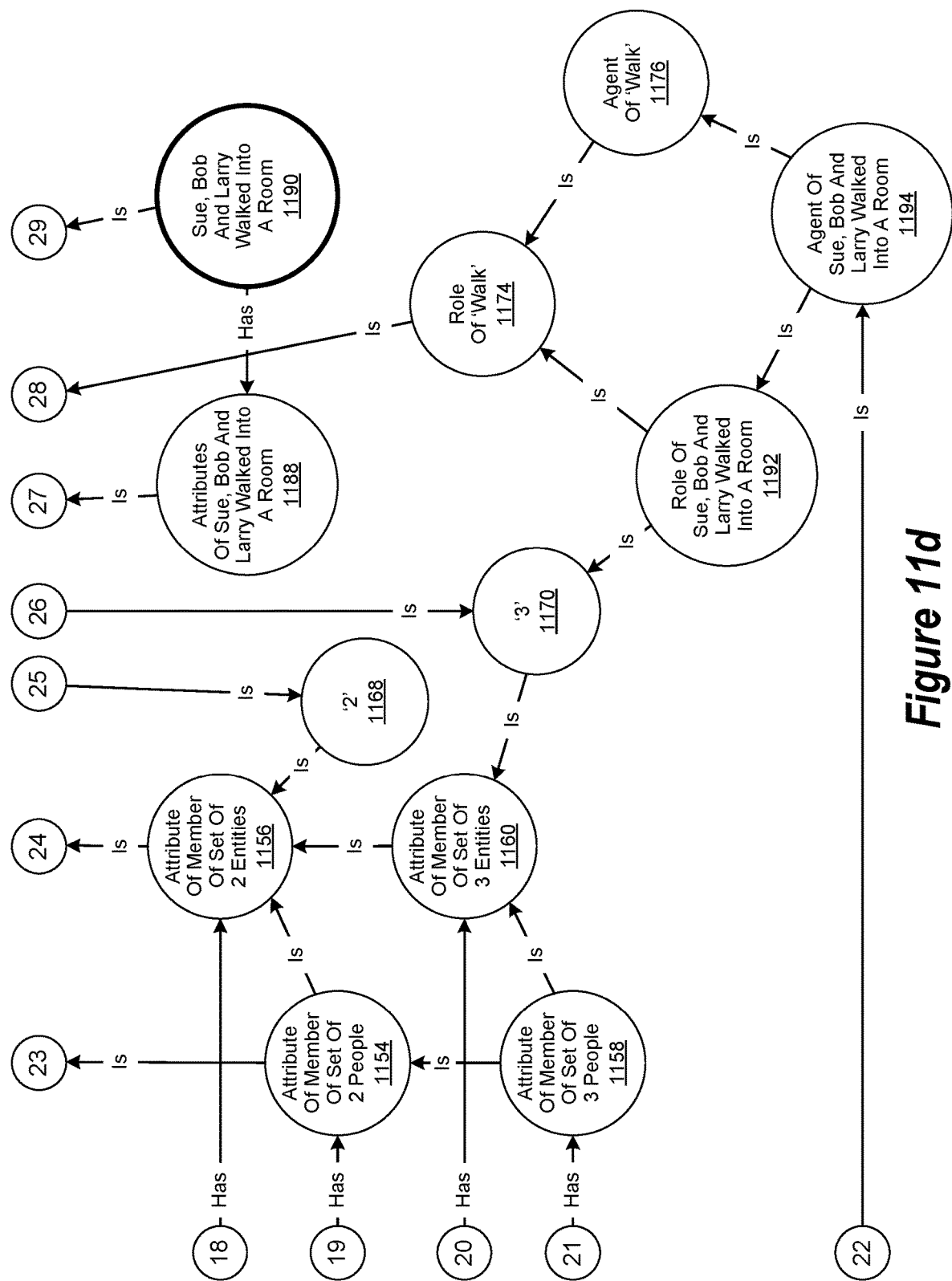
Figure 12A:
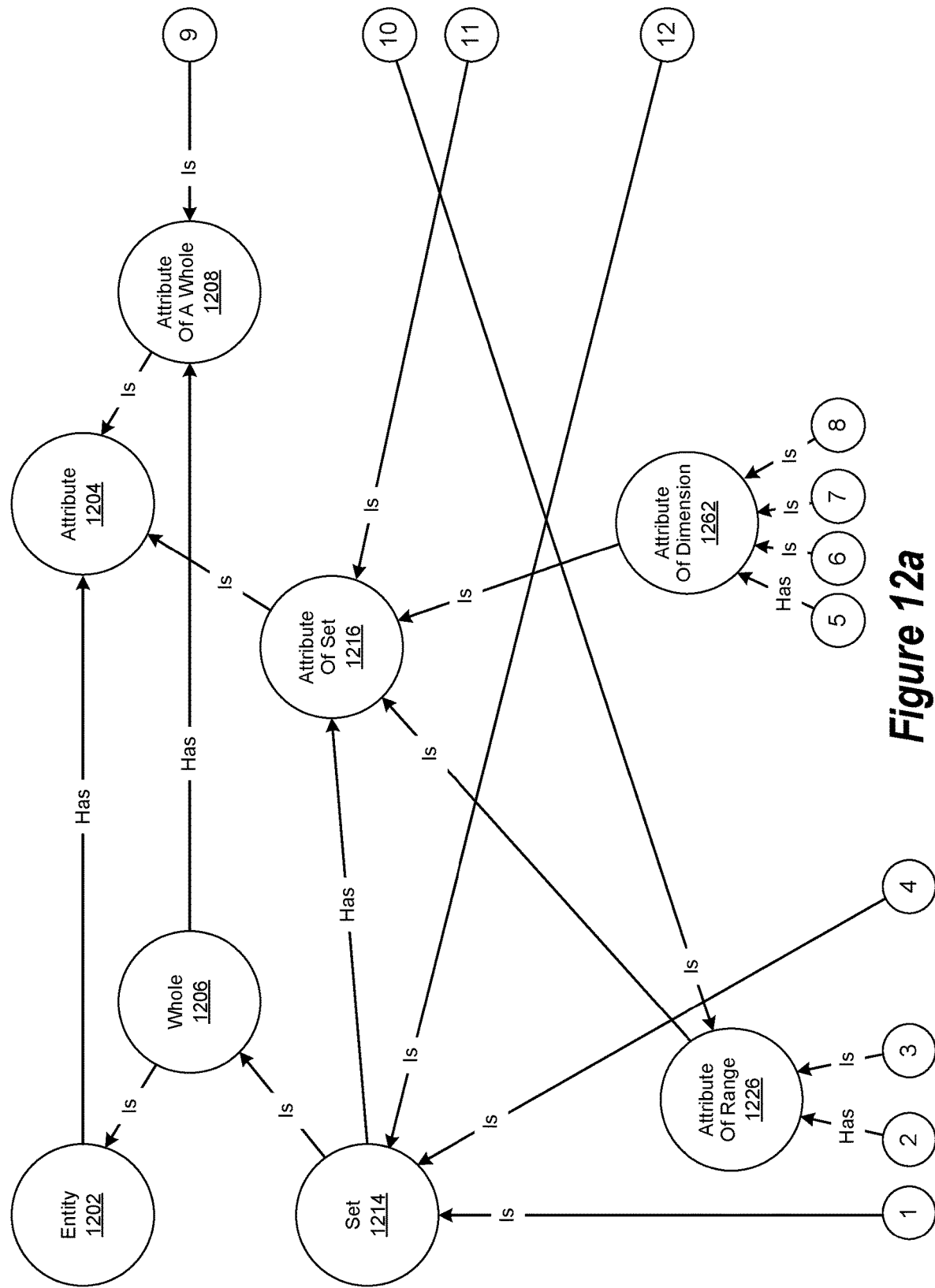
FIGS. 12a through 12d are a simplified graphical representation of location, time and scale modeled as knowledge elements in a universal cognitive graph.
Figure 12B:
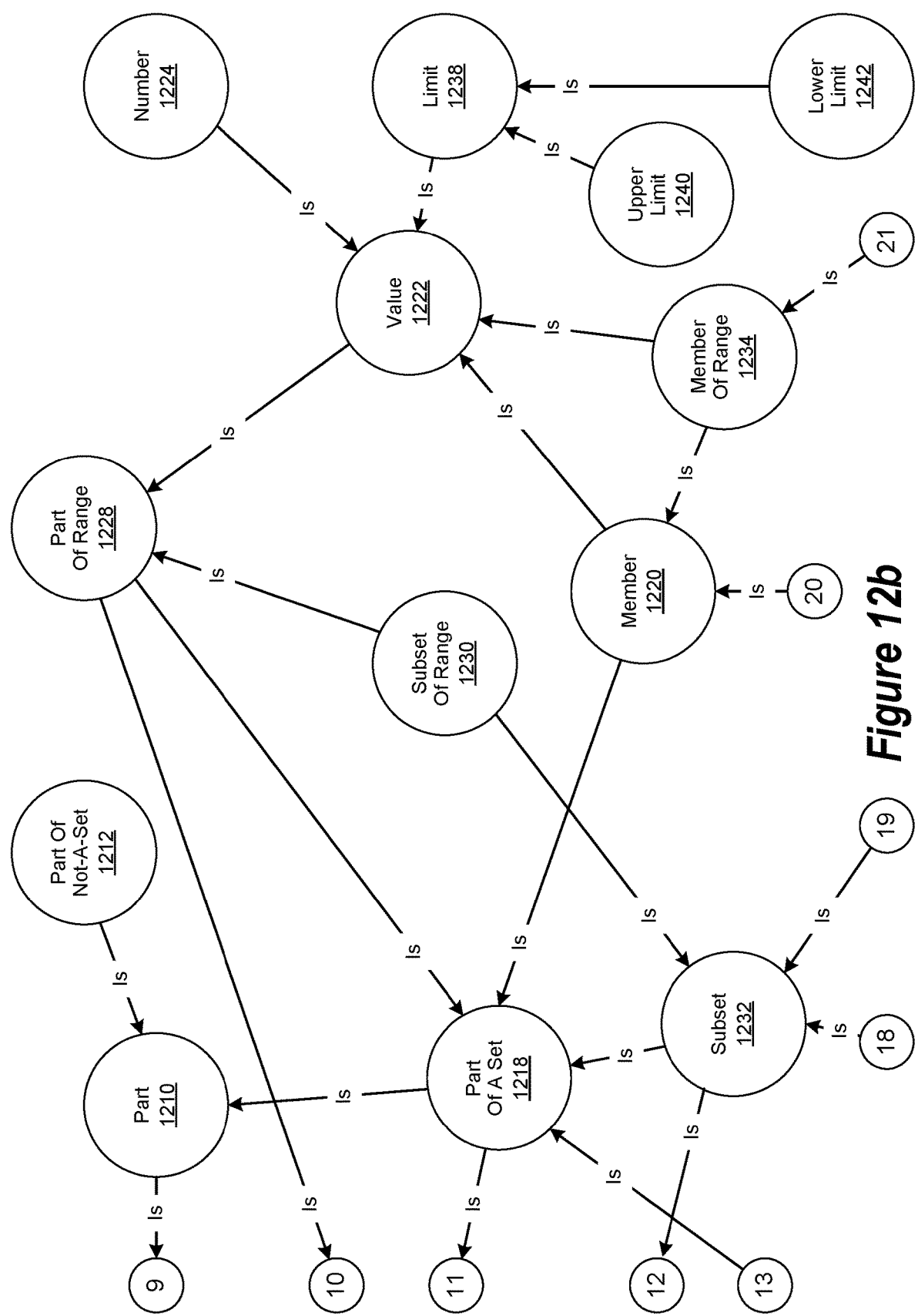
Figure 12C:
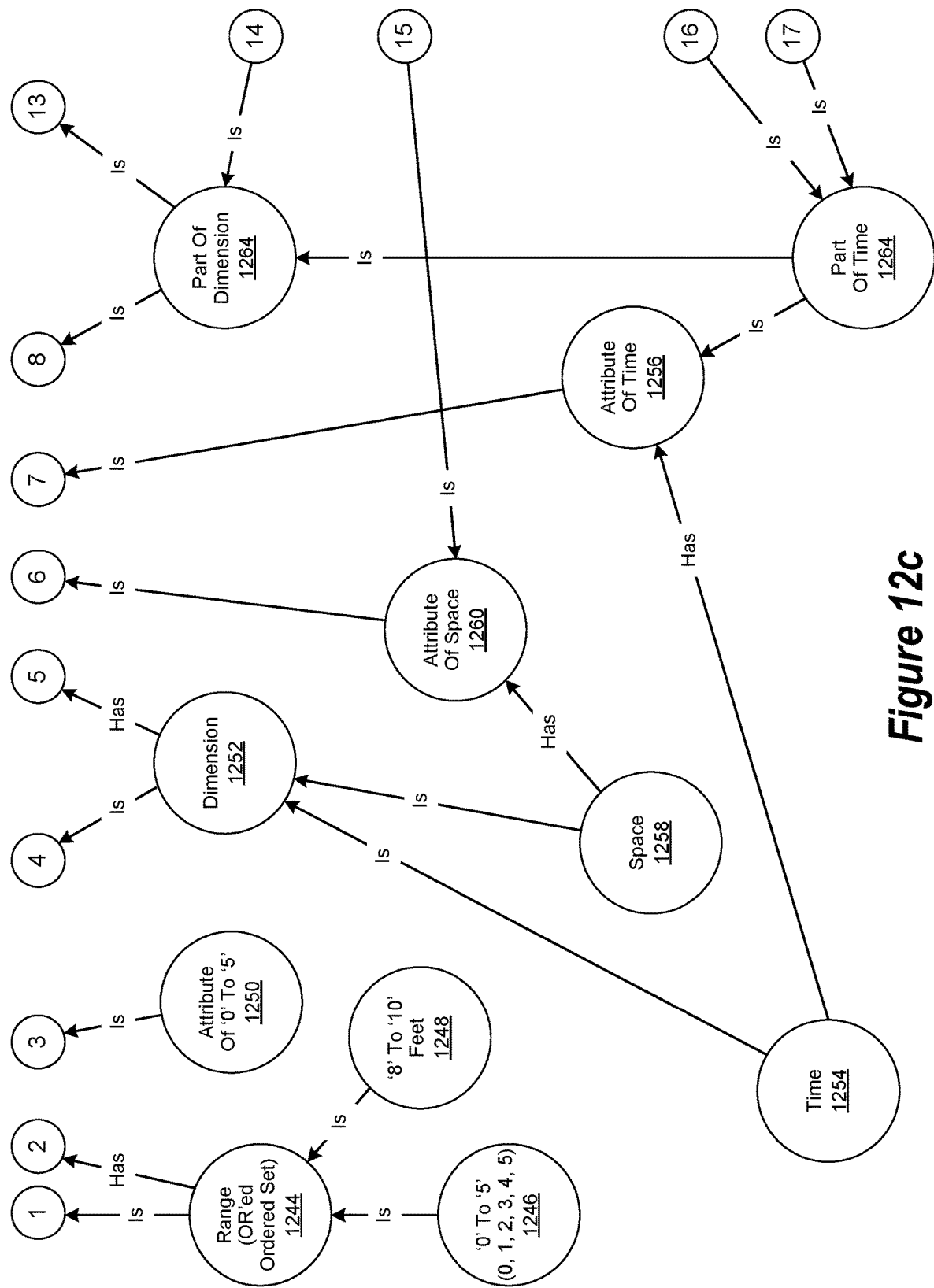
Figure 12D:
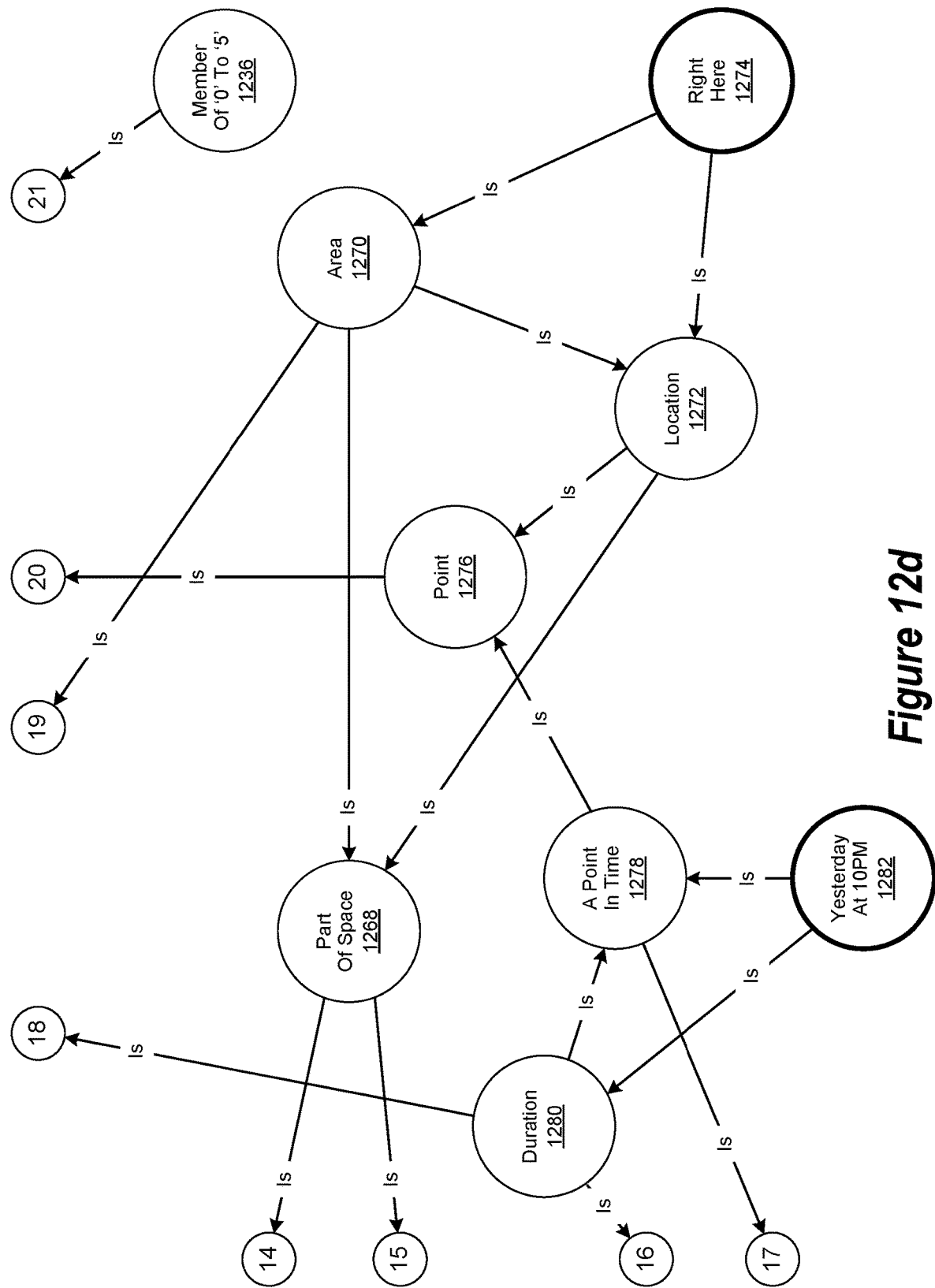

FIG. 10 depicts the use of diamond and ladder entailment patterns implemented in accordance with an embodiment of the invention to accurately and precisely model knowledge elements in a universal cognitive graph. As used herein, a diamond entailment pattern broadly refers to a pattern formed in a universal cognitive graph when two or more parent nodes of a first node inherit from a common second node. For example, as shown in FIG. 10, the "human body part" node 1004 inherits from the "body part" node 1002. In turn, both the "human male body part" node 1006 and the "human femur" node 1008 inherit from the "human body part" node 1004. Likewise, the "human male femur" node 1010 inherits from both the "human male body part" node 1006 and the "human femur" node 1008.

As another example, both the "male" node 1014 and the "human" node 1016 inherit from the "life form" node 1012. Likewise, the "human male" node 1018 inherits from both the "male" node 1014 and the "human" node 1008. As a result, nodes 1004, 1006, 1008, and 1010 form a diamond entailment pattern, as do nodes 1012, 1014, 1016 and 0018.

Accordingly, the inheritance relationships between the base node 1010 and both of its parents 1006 and 1008 define a particular concept, meaning that any node that matches both the "human male body part" node 1006 and the "human femur" node 1008 matches the requirements for the "human male femur" node 1010. Likewise, the inheritance relationships between the base node 1018 and both of its parents 1014 and 1016 define another concept, meaning that any node that matches both the "male" node 1014 and the "human" node 1016 matches the requirements for the "human male" node 1018.

Skilled practitioners of the art will recognize that the implementation of such intermediate nodes (e.g., nodes 1006, 1008, 1014, 1016, etc.) allow an accurate and precise representation of knowledge within a universal cognitive graph. For example, the "human male" node 1018 does not have a direct relationship to the "body part" node 1002 because not all body parts are had by humans, and conversely, not all body parts are had by human males. To continue the example, some body parts are had by plants, like stamens, some are had by birds, like feathers, and some are had by fish, like gills, and so forth.

As shown in FIG. 10, the uniqueness of these relationships can be accurately and precisely modeled through the implementation of a ladder entailment pattern. As used herein, a ladder entailment pattern broadly refers to a pattern formed in a universal cognitive graph where the rungs of the ladder entailment pattern are formed by a first set of nodes having a "has a" relationship with a corresponding second set of nodes and the rails of the ladder entailment pattern are formed by "is a" relationships respectively associated with the first and second set of nodes.

For example, the "body part" node 1002 is directly defined by a "has a" relationship to the "life form" node 1012, which forms a rung of a ladder entailment pattern. Likewise, the "human body part" node 1004 and the "human male body part" node 1006 are respectively defined by corresponding "has a" relationships to the "human" node 1016 and the "human male" node 1018, which form additional rungs of a ladder entailment pattern. To continue the example, a first rail of the ladder entailment pattern is formed by the "is a" relationships between the "human male" node 1018, the "human" node 1016 and the "life form" node 1012. Likewise, a second rail of the ladder entailment pattern is formed by the "is a" relationships between the "human male body part" node 1006, the "human body part" node 1004, and the "body part" node 1002.

As another example, the "plant body part" node 1022, the "bird body part" node 1028, and the "fish body part" node 1034 are directly and respectively defined by a "has a" relationship to the "plant" node 1020, the "bird" node 1026, and the "fish" node 1032. In this example, the respective "has a" relationships form corresponding rungs of separate ladder entailment patterns. To continue the example, a first rail of these separate ladder entailment patterns is formed by the respective "is a" relationships between the "plant" node 1020, the "bird" node 1026, the "fish" node 1032 and the "life form" node 1012. Likewise, a second rail of these separate ladder entailment patterns is formed by the respective "is a" relationships between the "plant body part" node 1022, the "bird body part" node 1028, the "fish body part" node 1034 and the "body part" node 1002.

As yet another example, a human named John Doe may be represented by a "John Doe" node 1038, which is defined by a "is a" relationship with the "human male" node 1018. To continue the example, the "John Doe" node 1038 may have a corresponding "has a" relationship with a "John Doe's body part" node 1040, which is likewise defined by a "is a" relationship with the "human male body part" node 1006. In this example, the first rail of the ladder entailment pattern formed by the "is a" relationships between the "human male" node 1018, the "human" node 1016 and the "life form" node 1012, and is extended by the addition of the "is a" relationship between the "John Doe" node 1038 and the "human male" node 1018. Likewise, the second rail of the ladder entailment pattern is formed by the "is a" relationships between the "human male body part" node 1006, the "human body part" node 1004, and the "body part" node 1002, and is extended by the addition of the "is a" relationship between the "John Doe's body part" node 1040 and the "human male body part" node 1006. An additional rung is likewise formed in this ladder entailment pattern by the "has a" relationship between the "John Doe" node 1038 and the "John Doe's body part" node 1040.

In various embodiments, the creation of a first node (e.g., the "John Doe" node 1038) results in the creation of a second, complementary node (e.g., the "John Doe's body part" node 1040. In these embodiments, associated "is a" and "has a" relationships are likewise created in the universal cognitive graph to maintain a ladder entailment pattern. In one embodiment, the creation of the second, complementary node may result in the creation of a third node that contains associated information. In this embodiment, the second, complementary node may be associated with the third node by the addition of either a "has a" or "is a" relationship. In another embodiment, the creation of the second, complementary node may result in the addition of either a "has a" or "is a" relationship with an existing third node in the universal cognitive graph.

In yet another embodiment, creation of the second, complementary node may result in the generation of a request for additional information associated with the second, complementary node. For example, the creation of the "John Doe" node 1038 may result in the creation of the "John Doe's body part" node 1040. In this example, a request may be generated requesting more information related to John Doe's body parts. The response to the request may in turn result in the creation of a "John Doe's femur" node (not shown). To continue this example, the creation of the "John Doe's femur" node would result in the creation of an additional diamond pattern, as the "John Doe's femur node would inherit from both the "John Doe's body part" node 1040 and the "human male femur" node 1010, both of which inherit from the "human male body part" node 1006.

Using this approach, all life forms can be represented as having body parts, and conversely, all body parts can be represented as being of, or from, a life form. As a result, when a body part is identified by a Cognitive Inference and Learning System (CILS), a life form is entailed. Likewise, when a life form is identified by the CILS, the body part of that life form is entailed. For example, the "stamen" node 1024, the "feather" node 1030, and the "gill" node 1036 are respectively defined by the "plant body part" node 1022, the "bird body part" node 1028, the "fish body part" node 1034 and the "body part" node 1002. Accordingly, a concept such as a human femur is separated from concepts such as gills, feathers and stamens, none of which are had by humans as part of their bodies. Those of skill in the art will realize that many such examples and embodiments are possible and foregoing is not intended to limit the spirit, scope or intent of the invention.

FIGS. 11a through 11d are a simplified graphical representation of quantity modeled as knowledge elements in a universal cognitive graph implemented in accordance with an embodiment of the invention. In various embodiments, entities are represented by individual nodes in an entailment graph, such as the universal cognitive graph shown in FIGS. 11a through 11d. In these embodiments, each class of entities represents any single instance of that entity. Because any instance of an entity is exactly one thing, the quantity referenced by the class is "exactly one."

For example, as described in greater detail herein, a "dog" entity represents all valid attributes of any single instance of a dog through the implementation of "has a" relationships. Accordingly, the "dog" class does not refer to all dogs, nor does it refer to at least one dog. To continue the example, the set of all dogs might be dangerous in a confrontational situation, while the single dog "Skipper" could be harmless while playing catch. Accordingly, attributes of a set are necessarily distinct concepts from attributes of any single instance of that set.

As such, expressions for "greater than one entity" are represented in various embodiments as a set. For example, a "group" may be defined as any instance of exactly one set which contains 2 or more elements. As an illustration of this example:

"Three people walked into the room."
→ "2 people walked into a room"
→ "4 people walked into a room" cannot be ascertained
"Only three people walked into a room."
→ "2 people walked into a room."
! → "12 people walked into a room."
"One person walked into a room."

As another example, something that is true of a group of things together (e.g., the engineering department is large) is not necessarily true of the members themselves (e.g., each engineer is petite), as demonstrated in the preceding example. In various embodiments, this approach allows accurate conceptualization of complicated quantifiers and markers such as "only", "any", "all", and "not." As used herein, "marker" refers to linguistic markers that identify quantity. Other examples of such markers include "most," "some, "few," "none," and so forth. In certain embodiments, numeric quantifiers (e.g., '5', '6', '7', etc.) are processed as markers.

For example, the sentence "One person walked into a room." refers to an instance of one person, and does not preclude the possibility that two people walked into a room. This same sentence, however, does preclude the possibility that two people walked into the room. Furthermore, it also gives connotation to the notion that there could have been more people, or perhaps more people were expected.

As yet another example, the sentence "Only one person walked into a room." is not referring to a particular person, but rather to any set that contains exactly one person. As yet still another example, the sentence "One person acting alone could potentially get in undetected; admitting three people unnoticed, however, is beyond belief." uses a "two is better than one" construction, which provides a way to access the class rather than an instance. It will be appreciated that the complexity of modeling quantity as knowledge elements in a universal cognitive graph is further compounded in the case of zero quantities, as they are conceptually very similar to negation, which reverses normal entailment patterns. For example, the sentence, "Not even one person is a member of the set of things that walked into a room." references the set of less than one person, zero people, no people, and nothing.

Accordingly, these approaches to modeling quantity as knowledge elements in a universal cognitive graph can be used when processing the sentence, "Sue, Bob and Larry walked into a room." As shown in FIGS. 11a through 11d, the "set of people" node 1108 is defined by the "set" node 1104, which in turn is defined by the "entity" node 1102, which refers to any entity that is exactly the numeric value of one. Likewise, the "3 people" node 1130 is defined by the "3entities" node 1132 and the "2 people" node 1122, which is defined by the "2 entities" node 1124 and the "1 person" node 1116, which in turn is defined by the "1 entity" node 1112 and the "set of people" node 1108. The "3entities" node 1132 is likewise defined by the "2 entities" node 1124, which is defined by the "1 entity" node 1112 and the "group" node 1110, both of which are in turn defined by the "set" node 1104.

As likewise shown in FIGS. 11a through 11d, the "3entities" node 1132, the "2 entities" node 1124, the "1 entity" node 1112, and the "set" node 1104 respectively have a "has a" relationship with the "member of set of 3entities" node 1136, the "member of set of 2 entities" node 1128, the "member of set of 1 entity" node 1114, and the "member" node 1106. Likewise, the "3people" node 1130, the "2 people" node 1122, and the "1 person" node 1116 respectively have a "has a" relationship with the "member of set of 3people" node 1136, the "member of set of 2 people" node 1128, and the "member of set of 1 person" node 1114. In turn, the "member of set of 3people" node 1134 is defined by the "member of set of 2 people" node 1126 and the "member of set of 3entities" node 1136, both of which are defined by the "member of set of 2 entities" node 1128.

The "member of set of 2 people" node 1126 is likewise defined by the "member of set of 1 person" node 1118 and the "member of set of 2 entities" node 1128. Likewise, the "member of set of 1 person" node 1118 is defined by the "member of set of 1 entity" node 114, which is defined by the "entity" node 1102 and the "member" node 1106, which is likewise defined by the "entity" node 1102. The "member of set of 3 entities" node 1136 is likewise defined by the "member of set of 2 entities" node 1128, which in turn is defined by the "member of set of 1 entity" node 1114. Likewise, the "member of set of 3people" node 1136, the "member of set of 2 people" node 1126, and the "member of set of 1 person" node 1118 are defined by the "person" node 1120, which in turn is defined by the "entity" node 1102.

Likewise, as shown in FIGS. 11a through 11d, the "member of set of 3 people" node 1134, the "member of set of 2 people" node 1126, and the "member of set of 1 person" node 1118 respectively have a "has is" relationship with the "attribute of member of set of 3people" node 1158, the "attribute of member of set of 2 people" node 1154, and the "attribute of member of set of 1 person" node 1152. The "member of set of 3entities" node 1136, the "member of set of 2 entities" node 1128, and the "member of set of 1 entity" node 1114 likewise respectively have a "has is" relationship with the "attribute of member of set of 3entities" node 1160, the "attribute of member of set of 2 entities" node 1156, and the "attribute of member of set of 1 entity" node 1150.

Likewise, the "attribute of member of set of 3people" node 1158 and the "attribute of member of set of 3entities" node 1160 is defined by the "attribute of member of set of 2 people" node 1154, both of which are in turn defined by the "attribute of member of set of 2 entities" node 1156. The "attribute of member of set of 2 people" node 1154 is likewise defined by the "attribute of member of set of 1 person" node 1152, which in turn is defined by the "attribute of member of set of 1 entity" node 1150, as is the "attribute of member of set of 2 entities" node 1156. Likewise, the "attribute of member of set of 1 entity" node 1150 is defined by the "attribute" node 1148, which in turn is defined by the "entity" node 1102.

Numeric quantities are likewise represented in the universal cognitive graph by the "3" node 1170, the "2" node 1168, the "1" node 1166, and the "0" node 1164, all of which are defined the "quantity" node 1162, which in turn is defined by the "entity" node 1102. Additionally, the "3" node 1170 is defined by the "member of set of 3 entities" node 1136, the "2" node 1168 is defined by the "attribute of member of set of 2 people" node 1154, the "1" node 1166 is defined by the "attribute of member of set of 1 entity" node 1150, and the "0" node 1164 is defined by a "not is a" relationship with the "member of set of 1 entity" node 1114. As used herein, a "not is a" relationship broadly refers to a variant of an "is a" relationship that is implemented in various embodiments to signify negation. For example, defining the "0" node 1164 with a "not is a" relationship" with the "member of set of 1 entity" node 1114 signifies that the numeric value of '0' is not a member of a set of '1'.

Linguistic quantifier modifiers are likewise represented in the universal cognitive graph by "exactly" node 1183, the "at least" node 1184, the "at most" node 1185, the "more than" node 1186, and the "less than" node 1187, all of which are defined by the "quantifier modifier" node 1182, which in turn is defined by the "entity" node 1102. Likewise, an action (e.g., walking, speaking, gesturing, etc.) is represented in the universal cognitive graph shown in FIG. 11 by the "action" node 1180, which is defined by the "entity" node 1102. The act of walking (e.g., a person is walking) is likewise represented by the "walk" node 1178, which is defined by the "action" node 1180. The "walk" node 1178 likewise has a relationship with the "attribute of walk" node 1172, which forms a rung of a ladder entailment pattern, described in greater detail herein. In turn, the "attribute of walk" node 1172 node is defined by the "attribute" node 1148. Likewise, an agent of the act of walking is represented by the "agent of walk" node 1176, which is defined by an "is a" relationship with the "role of walk" node 1174, which in turn is defined by the "attribute of walk" node 1172.

Referring once again to FIG. 11, the "Sue, Bob and Larry walked into a room" node 1190 represents the concept of a set of three people that includes Sue, Bob and Larry walking into a room. As such, the "Sue, Bob and Larry walked into a room" node 1190 is defined by the "walk" node 1178 node, and likewise has a "has a" relationship with the "attributes of Sue, Bob and Larry walked into a room" node 1188, which forms the rung of a ladder entailment pattern. As shown in FIG. 11, the "attributes of Sue, Bob and Larry walked into a room" node 1188 is defined by the "attribute of walk" node 1172. As likewise shown in FIG. 11, the "has a" relationship between the "walk" node 1178 and the "attribute of walk" node 1172 forms another rung of a ladder entailment pattern. Likewise, the "is a" relationship between "Sue, Bob and Larry walked into a room" node 1190 and the "walk" attribute 1178, and the "is a" relationship between the "attributes of Sue, Bob and Larry walked into a room" node 1188 and the "attribute of walk" node 1172 respectively form the rails of a ladder entailment pattern.

Likewise, the "Sue, Bob and Larry" node 1138 represents the concept of a set of three people that includes Sue, Bob and Larry, which is directly defined through an "is a" relationships by the "3people" node 1130, and indirectly through an indirect inheritance relationships with the "set of people" node 1108. In this embodiment, the creation of the "Sue, Bob and Larry" node 1138 results in the creation of a "member of Sue, Bob and Larry" node 1140 and a corresponding "has a" relationship." Likewise, the "member of Sue, Bob and Larry" node 1140 is defined by the "member of set of 3 people" node 1134.

As shown in FIGS. 11a through 11d, the creation of the "has a" relationship between the "Sue, Bob and Larry" node 1138 and the "member of Sue, Bob and Larry" node 1140 results in the formation of another rung of a ladder entailment pattern. Likewise, the "is a" relationship between the "Sue, Bob and Larry" node 1138 and the "3 people" node 1130, and the "is a" relationship between the "member of Sue, Bob and Larry" node 1140 and "member of set of 3people" node 1134, respectively form rails to extend the ladder entailment pattern previously formed by the "has a" relationship between the "3people" node 1130 and the "member of set of 3people" node 1134. As likewise shown in FIGS. 11a through 11d, the "member of Sue, Bob and Larry" node 1140 is also defined by the "Sue" node 1142, the "Bob" node 1144, and the "Larry" node 1146, each of which are likewise defined by the "person" node" 1120.

The "member of Sue, Bob and Larry" node 1140 is likewise defined by the "agent of Sue, Bob and Larry walked into a room" node 1194. In turn, the "member of Sue, Bob and Larry" node 1140 is defined by the "agent of walk" node 1176 and the "role of Sue, Bob and Larry walked into a room" node 1192, which is defined by the by '3' node 1170. Likewise, the "role of Sue, Bob and Larry walked into a room" node 1192 and the "agent of walk" node 1176 are both defined by the "role of walk" node 1174. As shown in FIGS. 11a through 11d, the respective "is a" inheritance relationships between the "role of walk" node 1174, the "role of Sue, Bob and Larry walked into a room" node 1192, the "agent of walk" node 1176, and the "agent of Sue, Bob and Larry walked into a room" node 1194 result in the formation of a diamond entailment pattern, described in greater detail herein.

Accordingly, skilled practitioners of the art will recognize that the foregoing embodiments allow the sentence, "Sue, Bob and Larry walked into a room" to be modeled as knowledge elements in a universal cognitive graph such that the set of people that includes Sue, Bob and Larry are quantified as a set of three people. Furthermore, modeling such quantification as knowledge elements in a universal cognitive graph supports instances where members of the set of people that includes Sue, Bob and Larry may enter a room individually, as a complete group, or a subset thereof. Those of skill in the art will likewise recognize that many such embodiments and examples are possible and the foregoing is not intended to limit the spirit, scope or intent of the invention.

FIGS. 12a through 12d are a simplified graphical representation of location, time and scale modeled as knowledge elements in a universal cognitive graph implemented in accordance with an embodiment of the invention. In various embodiments, location is represented as, or referenced to, a set of points in space. In these embodiments, the set of points may include a single point in space, multiple points in space (e.g., an area or volume), or no points in space. Accordingly, any physical thing can be, or identify, a location. By extension, any single point in space in these embodiments may be subdivided into any number of smaller points, which in turn may be referenced individually and recursively.

For example, the following sentences demonstrate recursive subdivision as specific references in a copular sentence:

"Where in the drawer are they?"

→"to the left of the candy bars."

"Her shoes are in the drawer."

→"The location of her shoes is in the drawer."

"Your keys are on the table between the flowers and my purse."

"Her house is on Manor Street, after East Side but before Tom's Market."

Skilled practitioners of the art will be aware that location is the most commonly referenced case of recursive subdivision in most languages, including English. However, it conceptually occurs in all point references across dimensions including location, time and scale, such as the following example, which includes attributes and adjectives:

---

"What's the restaurant like?"
-> "It's very pretty."
"How pretty?"
-> "Beautiful."
"How beautiful?"
-> "Gorgeous."
"How gorgeous?"
-> "Extremely."

---

Those of skill in the art will likewise be aware that time, like location and scale, can also be relative, due both to its capacity for infinite division and a set of relative terms, such as tomorrow, yesterday, now, later, and so forth. Accordingly, time, location, and scale are all describable in various embodiments within a universal cognitive graph through the use of terms of location on a scale or along a dimension. For example:

"At what point did you realize you wouldn't be getting a raise?

→"Yesterday at 2 pm."

The modeling of knowledge related to time, location and space as knowledge elements in a universal cognitive graph may require the use of either explicit time references, implicit time references, or some combination thereof. In various embodiments, this requirement is accommodated by time-stamping source data received by a Cognitive Learning System (CILS) prior to it being processed for storage as knowledge elements in a universal cognitive graph. In these embodiments, the method by which the source data is time-stamped is a matter of design choice. In certain embodiments, the time-stamp is provided as part of the initial structure of a statement. For example, time-stamping a statement received at 3:00 pm, Apr. 15, 2015 provides a time reference that can be used to identify what "tomorrow" means.

In various embodiments, recursive subdivision approaches known to those of skill in the art are implemented to model time, location, and scale as knowledge elements within a universal cognitive graph. As an example, a location may be modeled as being within the United States of America, in the state of Texas, in the city of Austin, in a building at a particular address, in a room at that address, underneath a table located in that room, on an item on the floor under the table, and so forth. As another example, a period of time may be referenced as being within the year 2015, in the month of April, on the 15$^{th}$ day, in the afternoon of the 15$^{th}$, at 15:07 pm, at eleven seconds after 15:07, and so forth. To continue the preceding examples, location scale may be referenced as "somewhere within the room," and time scale maybe referenced as "sometime after 15:07 pm."

In certain embodiments, recursive subdivision is implemented in the modeling of location, time and scale as knowledge elements in a universal cognitive graph to accurately maintain transitivity. As an example, a house may have a door, and the door may have a handle. In this example, the statement, "The house has a handle." would be accurate. To continue the example, the house may also have a teapot, which likewise has a handle. However, since the teapot is not physically part of the house, the statement "The house has a handle." would be inaccurate as it relates to the teapot. As described in greater detail herein, diamond entailment patterns and ladder entailment patterns are implemented in various embodiments through the implementation of "is a" and "has a" relationships between nodes in a universal cognitive graph to accurately maintain transitivity when modeling knowledge elements.

In these embodiments, as shown in FIGS. 12*a* through 12*d*, the creation of an "entity" node 1202 in a universal cognitive graph results in the creation of a corresponding "attribute" node 1204 and an associated "has a" relationship between the two. Likewise, the creation of the "whole" node 1206 results in the creation of a corresponding "attribute of a whole" node 1208. The "whole" node 1206 and the "attribute of a whole" node 1208 are respectively defined by the "entity" node 1202 and the "attribute" node 1204, as described in greater detail herein, through corresponding "is a" relationships. These "is a" relationships, in combination with the respective "has a" relationships between the "entity" node 1202, the "attribute" node 1204, the "whole" node 1206 and the "attribute of a whole" node 1208 result in the formation of the rungs and rails of a ladder entailment pattern, likewise described in greater detail herein.

Likewise, the creation of a "set" node 1214 results in the creation of an "attribute of set" node 1216 and a corresponding "has a" relationship between the two. The "set 1204 and the "attribute of set node 1216 are respectively defined by the "whole" node 1206 and the "attribute" node 1204 through corresponding "is a" relationships. In turn, the creation of a "range (OR'ed order set)" node 1244 results in the creation of an "attribute of range" node 1226 and a corresponding "has a" relationship. Likewise, the "range" node 1244 and the "attribute of range" node 1226 are respectively defined by the "set" node 1214 and the "attribute of set" node 1216 by corresponding "is a" relationships.

These "is a" relationships, in combination with the respective "has a" relationships between the "set" node 1214, the "attribute of a set" node 1216, the "range" node 1244, and the "attribute of range" node 1226 likewise result in the formation of the rungs and rails of another ladder entailment pattern. As a result, a numeric range of '0' to '5' can be represented in the universal cognitive graph by the "0 to 5" node 12415, and the measurement range of '8' to '10' feet can be represented by the "8 to 10 feet" node 1248, both of which are respectively defined by the "range" node 1244. Likewise, a numeric attribute of '0' to '5' can be represented by the "attribute of 0 to 5" node 1250, which is likewise defined by the "attribute of range" node 1226.

Likewise, the creation of a "dimension" node 1252 results in the creation of an "attribute of dimension" node 1262 and a corresponding "has a" relationship between the two. In turn, the "dimension" node 1252 and the "attribute of dimension" node 1262 are respectively defined by the "set" node 1214 and the "attribute of set" node 1216. As likewise shown in FIGS. 12*a* through 12*d*, the creation of these corresponding "has a" and "is a" relationships respectively form rung and rail extensions to the ladder entailment pattern previously formed by the "set" node 1214, the "attribute of a set" node 1216, the "range" node 1244 and the "attribute of range" node 1226.

The creation of a "space" node 1258 likewise results in the creation of a "attribute of space" node 1260 and a corresponding "has a" relationship between the two. The "space" node 1258 and the "attribute of space" node 1260 are respectively defined by the "dimension" node 1252 and the "attribute of dimension" node 1262 through "is a" relationships. These "is a" relationships, in combination with the respective "has a" relationships between the "dimension" node 1252, the "attribute of dimension" node 1262, the "space" node 1258 and the "attribute of space" node 1260 result in the formation of the rungs and rails of yet another ladder entailment pattern.

Likewise, the creation of a "time" node 1254 results in the creation of a "attribute of time" node 1250 and a corresponding "has a" relationship between the two. The "time" node 1254 and the "attribute of time" node 1260 are likewise respectively defined by the "dimension" node 1252 and the "attribute of dimension" node 1262 through "is a" relationships. These "is a" relationships, in combination with the respective "has a" relationships between the "dimension" node 1252, the "attribute of dimension" node 1262, the "space" node 1258 and the "attribute of space" node 1260 likewise result in the formation of the rungs and rails of still yet another ladder entailment pattern.

A part of time is likewise represented by the "part of time" node 1264, which is defined by the "attribute of time" node 1256 and the "part of dimension" node 1264, both of which are defined by the "attribute of dimension" node 1262. In turn, the "attribute of dimension" node 1262 is defined by the "attribute of set" node 1216. As shown in FIGS. 12*a* through 12*d*, the respective "is a" inheritance relationships between the "part of time" node 1264, the "attribute of time" node 1256, the "part of dimension" node 1264, and the "attribute of dimension" node 1262 result in the formation of a diamond entailment pattern, described in greater detail herein.

Likewise, the "part of dimension" node 1264 is defined by the "part of a set" node 1218, which in turn is defined by the "attribute of set" node 1216. The "part of a set" node 1218 is likewise defined by the "part" node 1210, which in turn is defined by "attribute of a whole" node 1208. By extension, the "part of not-a-set" node 1212 is likewise defined by the "part" node 1212. The concept of duration is likewise represented by the "duration" node 1280, which is defined by the "part of time" node 1264 and the "subset" node 1232, which in turn is defined by both the "set" node 1214 and the "part of a set" node 1218. The "duration" node 1280 is further defined by the "point in time" node 1278, which in turn is defined by the "part of time" node 1264 and the "point" node 1276.

In turn, the "point" node 1276 is defined by the "member" node 1220, which is defined by both the "part of a set" node 1218 and the "value" node 1222. Likewise, a subset of a range is represented by the "subset of range" node 1230, which is defined by both the "subset" node 1232 and the "part of a range" node 1228. A number is likewise represented by the "number" node 1224, which is defined by the "value" node, which in turn is defined by the "part of range" node 1228. Likewise, an upper limit and a lower limit are respectively represented by the "upper limit" node 1240 and the "lower limit" node 1242, both of which are defined by the "limit" node 1228, which in turn is defined by the "value" node 1222.

A range, such as the numeric range of '0' to '5' is likewise represented by the "member of 0 to 5" node 1236, which is defined by the "member of range" node 1224, which in turn is represented by both the "member" node 1220 and the "value" node 1222. Likewise, a particular area is represented by the "area" node 1270, which is defined by the "subset" node 1232 and the "location" node 12723, which in turn is defined by the "part of space" node 1268. The "area" node 1270 is further defined by the "part of space" node 1268, which in turn is defined by the "part of dimension" node 1254 and the "attribute of space" node 1260.

Accordingly, skilled practitioners of the art will recognize that the foregoing embodiments allow a reference to a particular point in time, such as "yesterday at 10 pm," to be modeled as knowledge elements in the universal cognitive graph by the creation of corresponding node, such as the "yesterday at 10 pm" node 1282. In various embodiments, the creation of the "yesterday at 10 pm" node 1282 results in the corresponding creation of "is a" relationships to the "duration" node 1280 and the "a point in time" node 1278. Likewise, a reference to a particular location, such as "right here," can be modeled as knowledge elements in a universal cognitive graph through the creation of a corresponding node, such as the "right here" node 1274. In certain embodiments, the creation of the "right here" node 1274 results in the corresponding creation of "is a" relationships to the "location" node 1272 and the "area" node 1270. In these embodiments, these "is a" relationships allow the implementation of various entailment approaches described in greater detail herein, which in turn allow location, time and scale to be accurately and precisely modeled as knowledge elements in a universal cognitive graph. Those of skill in the art will likewise recognize that many such embodiments are possible and the foregoing is not intended to limit the spirit, scope or intent of the invention.

Figure 13A:
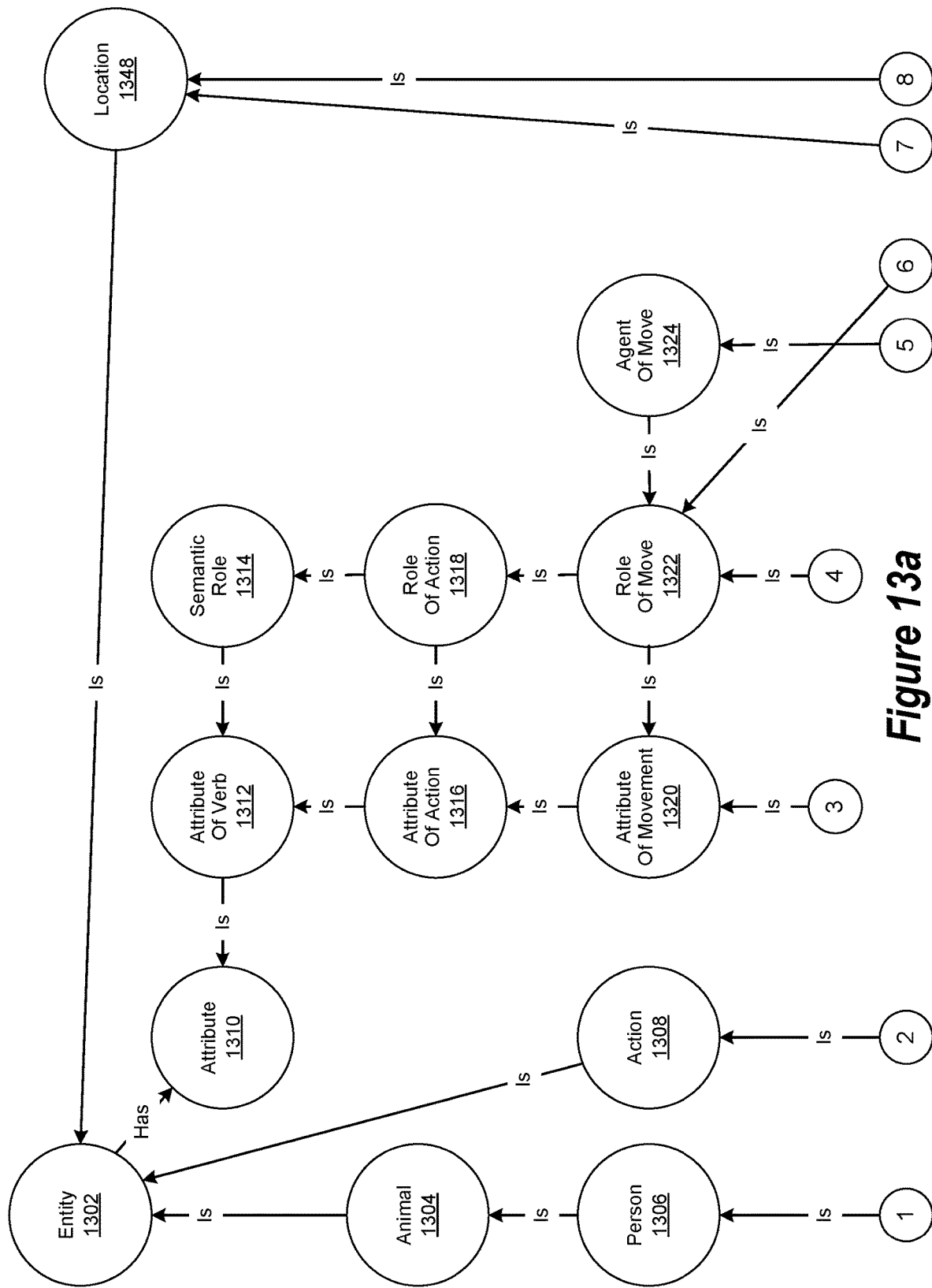
FIGS. 13a and 13b are a simplified graphical representation of verbs modeled as knowledge elements in a universal cognitive graph.
Figure 13B:
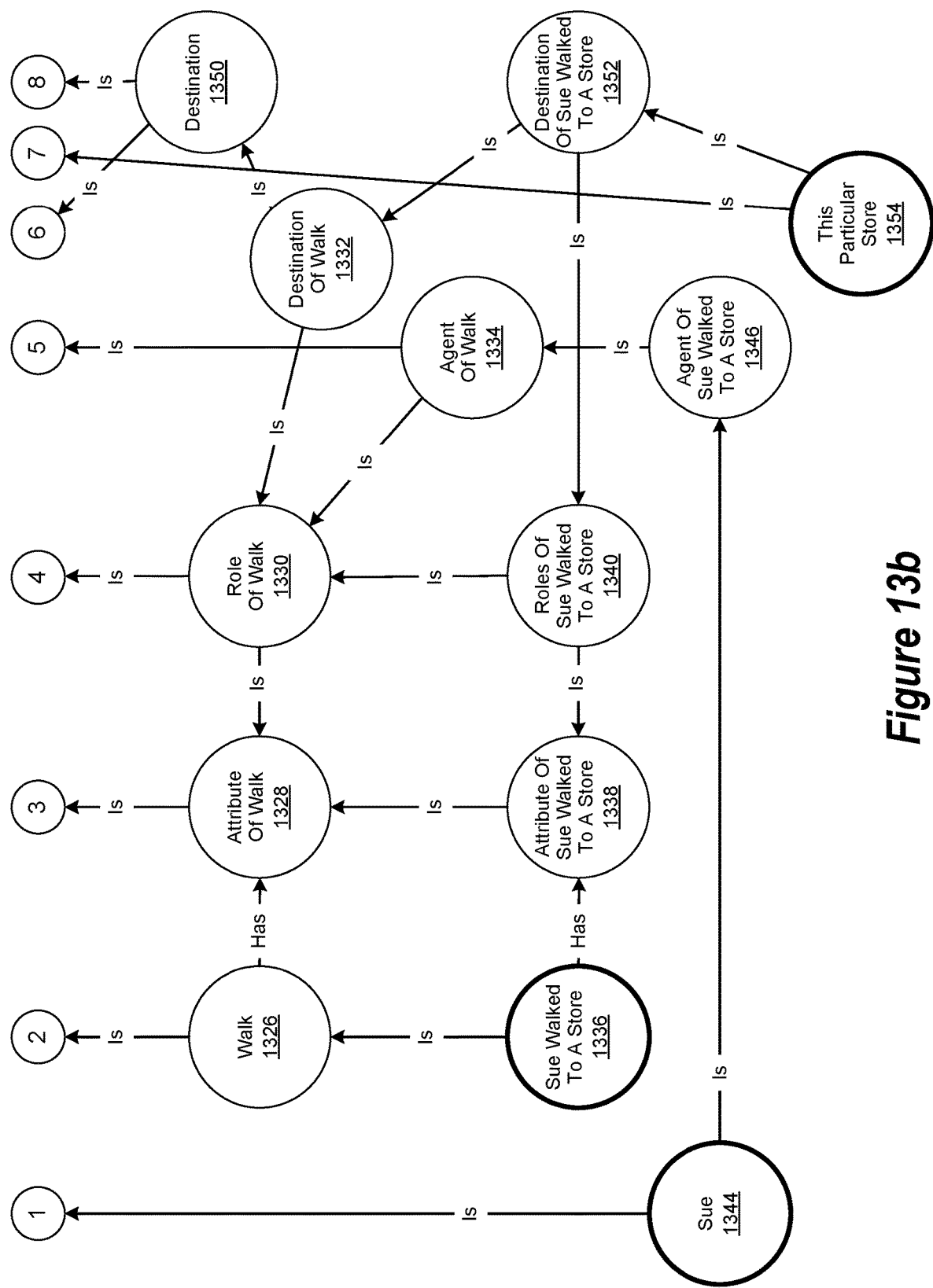

FIGS. 13*a* and 13*b* are a simplified graphical representation of verbs modeled as knowledge elements in a universal cognitive graph implemented in accordance with an embodiment of the invention. Skilled practitioners of the art will be aware that certain semantic and cognitive linguistic theories postulate that verbs are the central power in a sentence or a mental representation of an event, and as such, assign semantic roles to the structures proximate to them. For example, any word filling the subject position in the verb "run," for example, plays a role of "agent", rather than something like "time" or "experiencer." More particularly, no conceptualization or reference frame of running can be made without an entity, such as a person, animal, or apparatus, playing that part.

Those of skill in the art will likewise be aware that certain of these theories have yet to be applied to the complex problems posed by machine learning and practical Natural Language Processing (NLP) applications. In part, this lack of utilization may be due to the realization that the extensive annotation commonly associated with these theories is unable to stand alone in a usable fashion. Likewise, these theories are typically missing a backdrop of interconnectedness that allows relationships to be made and traversed in stored data. In various embodiments, this lack of interconnectedness is addressed by combining conceptual frames and theta roles with type theory.

As used herein, a conceptual frame broadly refers to a fundamental representation of knowledge in human cognition. In certain embodiments, a conceptual frame may include attribute-value sets, structural invariants, constraints, or some combination thereof. In various embodiments, a conceptual frame may represent attributes, values, structural invariants, and constraints within the frame itself. In certain of these embodiments, a conceptual frame may be built recursively. As likewise used herein, a theta role broadly refers to a formalized device for representing syntactic argument structure (i.e., the number and type of noun phrases) required syntactically by a particular verb. As such, theta roles are a syntactic notion of the number, type and placement of obligatory arguments.

Type theory, as used herein, broadly refers to a class of formal systems, some of which can serve as alternatives to set theory as a foundation for mathematics. In type theory, every "term" has a "type" and operations are restricted to terms of a certain type. As an example, although "flee" and "run" are closely related, they have different attributes. According to type theory, these attributes makes them unique concepts. To continue the example, the theta roles that each verb assigns are a subset of their attributes, which means that the agent of fleeing is a unique concept from the agent of running, though the same person or animal may play one or both parts.

Skilled practitioners of the art will recognize that since verbs are an open class, there are an unlimited number of theta roles under these presuppositions. Each of the roles are related to the others, as the agent of flee could be said to inherit from the agent of run. This allows for the mapping of the structural elements around a verb (e.g., a subject, an object, a prepositional phrase complement, etc.) to be transformed into words higher up an inheritance chain implemented in a universal cognitive graph. For example, the subject of "flee" is also the subject of "run" if the sentence is converted. As another example, the sentence, "You're running from something." can likewise be syntactically and semantically converted into "You're fleeing something."

As yet another example, if the concept of "sold goods" is related to both the object of buying and the object of selling, then any time one frame is invoked, so is the other. As yet still another example, in the sentence "I have a pie." the role of the verb "have" might be "owner" and "attribute." In this example, the attribute is a possession, but in another example, the attribute might be a quality, such as "The lady has great beauty."

Likewise, the verb "be" is closely related to "have." It also has an owner and an attribute. Furthermore, all attributes are both "had," such as in the noun sense, "I have beauty," and "been," such as in the adjective sense, "I am beautiful." Moreover, any time any attribute is referenced, such as "He paints so slowly!" the sentence may be rephrased in terms of that verb, such as "His painting is so slow." and "His painting has such slowness." because all attributes are roles of "be." In various embodiments, the combination of frame theory, or role theory, with set types permits the collection of multiple phrasings to be tied to a single meaning. As a result, when a query is received by a Cognitive Inference and Learning System (CILS), answers can be collected in various embodiments across any possible phrasing for the concept.

For example, as shown in FIGS. 13a and 13b, the creation of an "entity" node 1302 in a universal cognitive graph results in the creation of a corresponding "attribute" node 1310 and an associated "has a" relationship between the two. As a result, a person named "Sue" can be represented by the creation of a "Sue" node 1344, which is defined by the "person" node 1306. Likewise, the "person" node is defined by the "animal" node 1304, which in turn is defined by the "entity" node 1302. The "attribute" node 1310 likewise defines the "attribute of verb" node 1312, which in turn defines the "attribute of action" node 1316, which likewise defines the "attribute of movement" node 1320.

As likewise shown in FIGS. 13a and 13b, an action, such as "walk" is represented by the creation of a "walk" node 1326, which results in the creation of a corresponding "attribute of walk" node 1328 and a "has a" relationship between the two. The "walk" node 1326 and the "attribute of walk" node 1328 are respectively defined by the "action" node 1308 and the "attribute of movement" node 1320, as described in greater detail herein, through corresponding "is a" relationships. Likewise, the "semantic role" node 1314, the "role of action" node 1318, the "role of move" node 1322 and the "role of walk" node 1330 are respectively defined by the "attribute of verb" node 1312, the "attribute of action" node 1316, the "attribute of movement" node 1320 and the "attribute of walk" node 1328. The "role of walk" node 1330 is likewise defined by the "role of move" node 1322, which in turn is defined by the "role of action" node 1318, which is likewise defined by the "semantic role" node 1314.

Likewise, the "agent of walk" node 1334 is defined by the "role of walk" node 1330 and the "agent of move" node 1324, which in turn is defined by the "role of move" node 1322. The "destination of walk" node 1322 is likewise defined by the "role of walk" node 1330 and the "destination" node 1350, which in turn is defined by "role of move" node 1322. Likewise, the "destination" node 1350 is defined by the "location" node 1348, which in turn is defined by the "entity" node 1302.

Accordingly, the statement "Sue walked to a store" can be represented by the creation of a "Sue walked to a store" node 1336, which results in the creation of the corresponding "attribute of Sue walked to a store" node 1338 and an associated "has a" relationship between the two. As shown in FIG. 13b, the "Sue walked to a store" node 1336 and the "attribute of Sue walked to a store" node 1338 are respectively defined by the "walk" node 1326 and the "attribute of walk" node 1328 through corresponding "is a" relationships. These "is a" relationships, in combination with the respective "has a" relationships between the "walk" node 1326, the "attribute of walk" node 1328, the "Sue walked to a store" node 1336, and the "attribute of Sue walked to a store" node 1338 result in the formation of the rungs and rails of a ladder entailment pattern, described in greater detail herein.

Likewise, the "roles of Sue walked to a store" node 1340 is defined by the "attribute of Sue walked to a store" node 1338 and the "role of walk" node 1330. In turn, the "destination of Sue walked to a store" node 1352 is defined by the "roles of Sue walked to a store" node 1340 and the "destination of walk" node 1332. Likewise, the particular store that Sue walked to can be represented by "this particular store" node 1354, which is defined by both the "location" node 1348 and the "destination of Sue walked to a store" node 1352. The "Sue" node 1344 is likewise defined by "agent of Sue walked to a store" node 1346m which in turn is defined by the "agent of walk" node 1334.

Accordingly, skilled practitioners of the art will recognize that the foregoing embodiments allow the verb "walked" in the sentence, "Sue walked to a store" to be accurately modeled as knowledge elements in a universal cognitive graph. Furthermore, the modeling of the verb "walked" results in an accurate portrayal of Sue's destination, which is "a store." Those of skill in the art will likewise recognize that many such embodiments and examples are possible and the foregoing is not intended to limit the spirit, scope or intent of the invention.

Figure 14A:
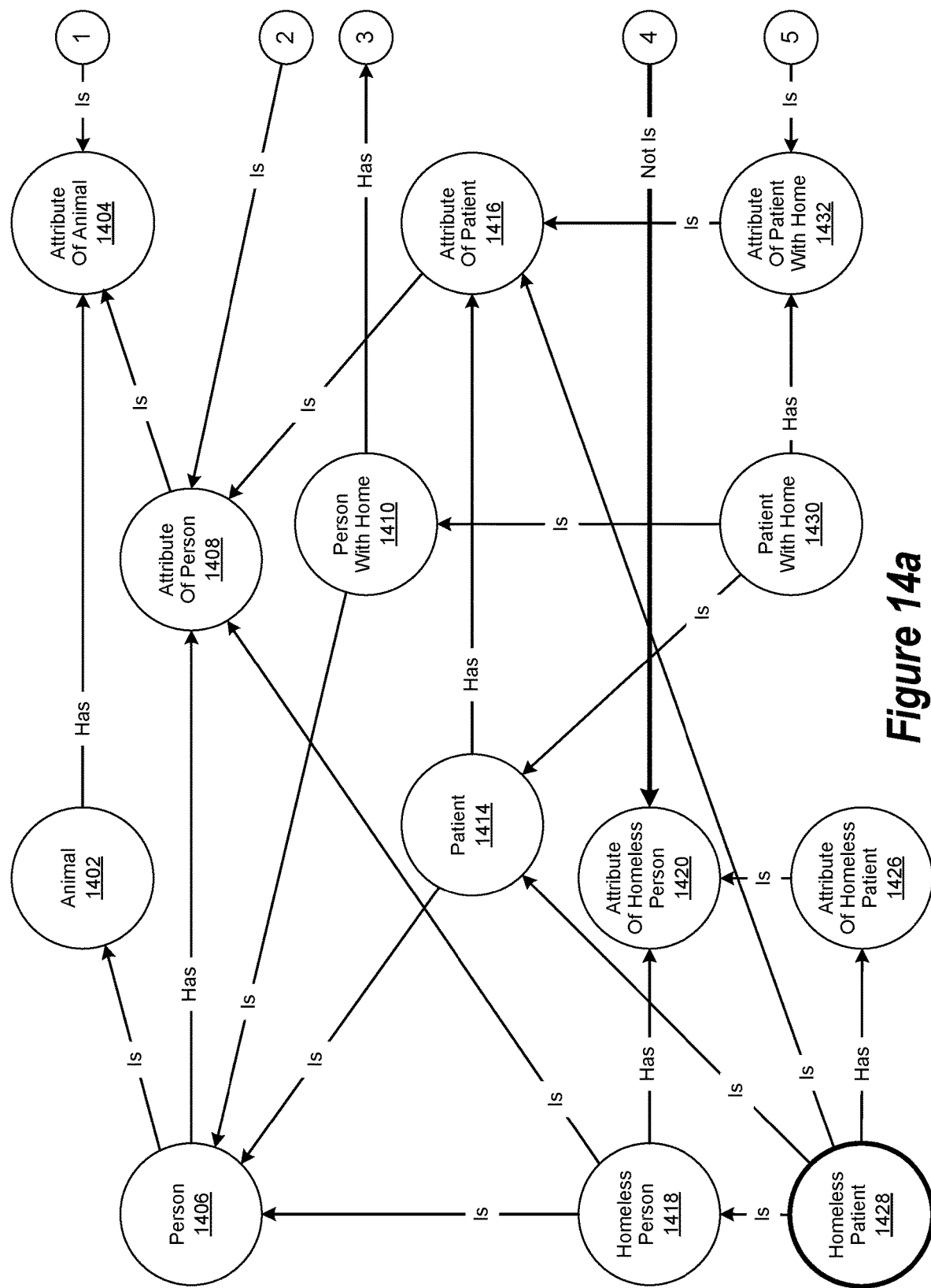
FIGS. 14a and 14b are a simplified graphical representation of the modeling of negation of in a universal cognitive graph.
Figure 14B:
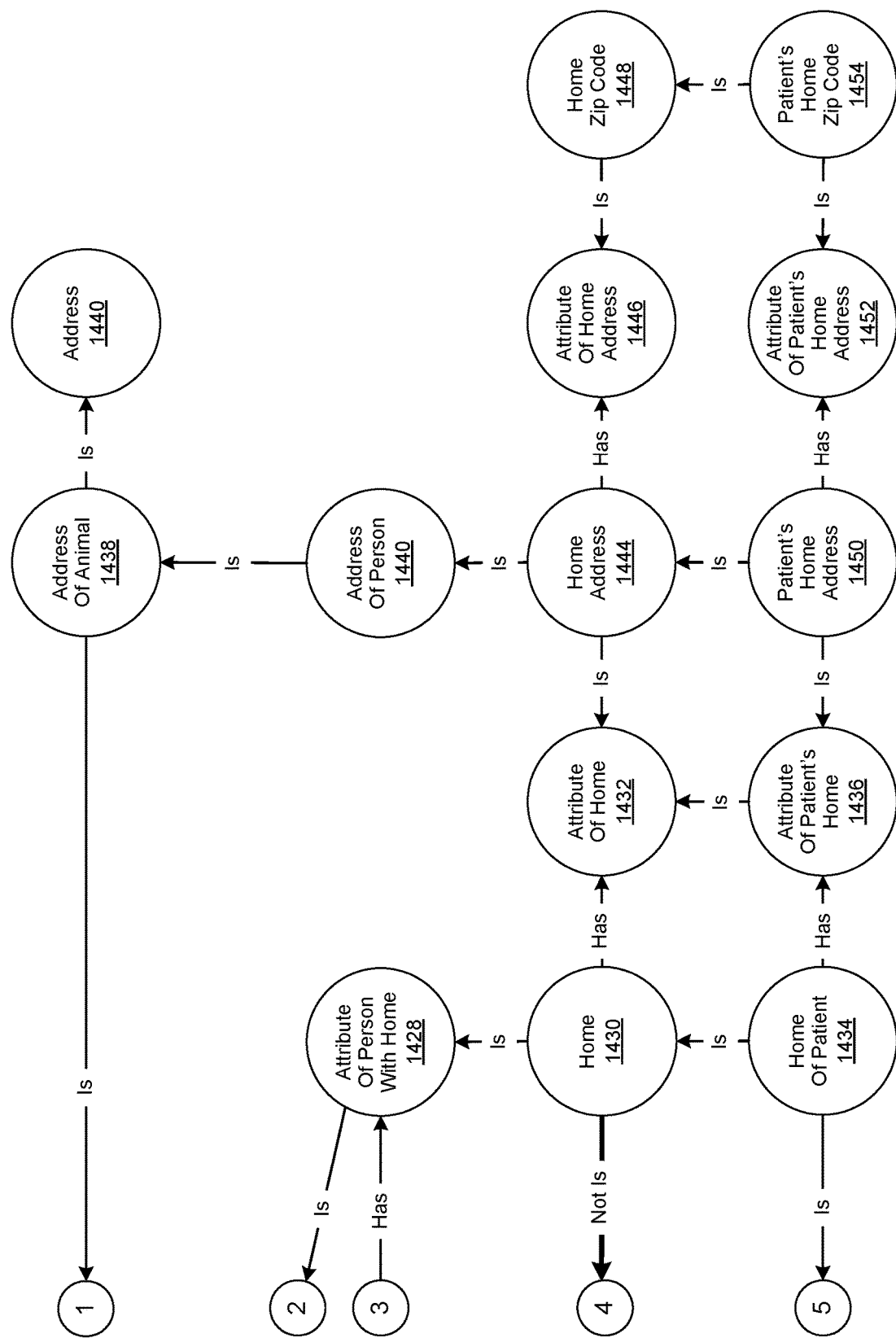
Figure 15A:
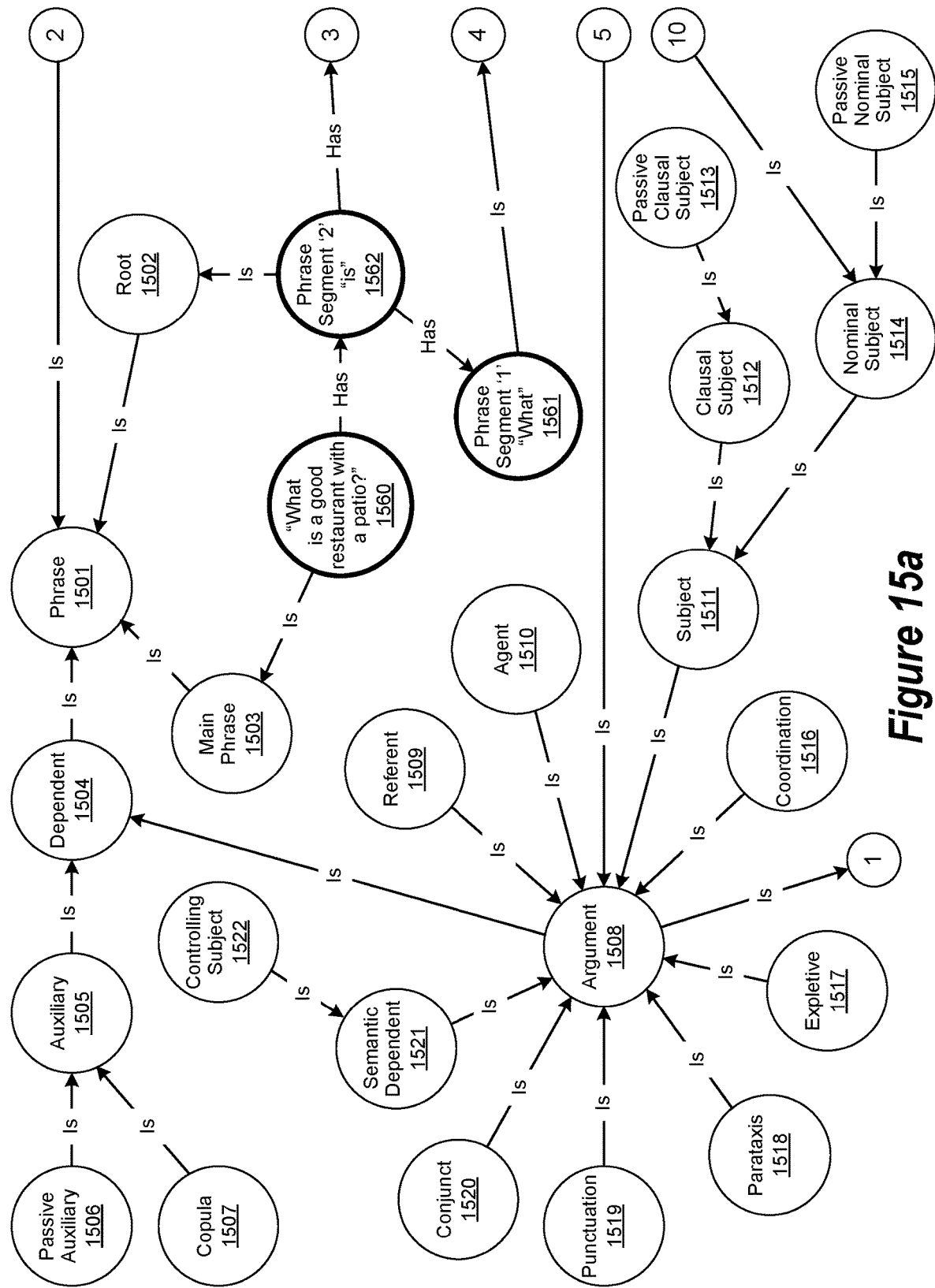
FIGS. 15a through 15e are a simplified graphical representation of a corpus of text modeled as knowledge elements in a universal cognitive graph to represent an associated natural language concept.
Figure 15B:
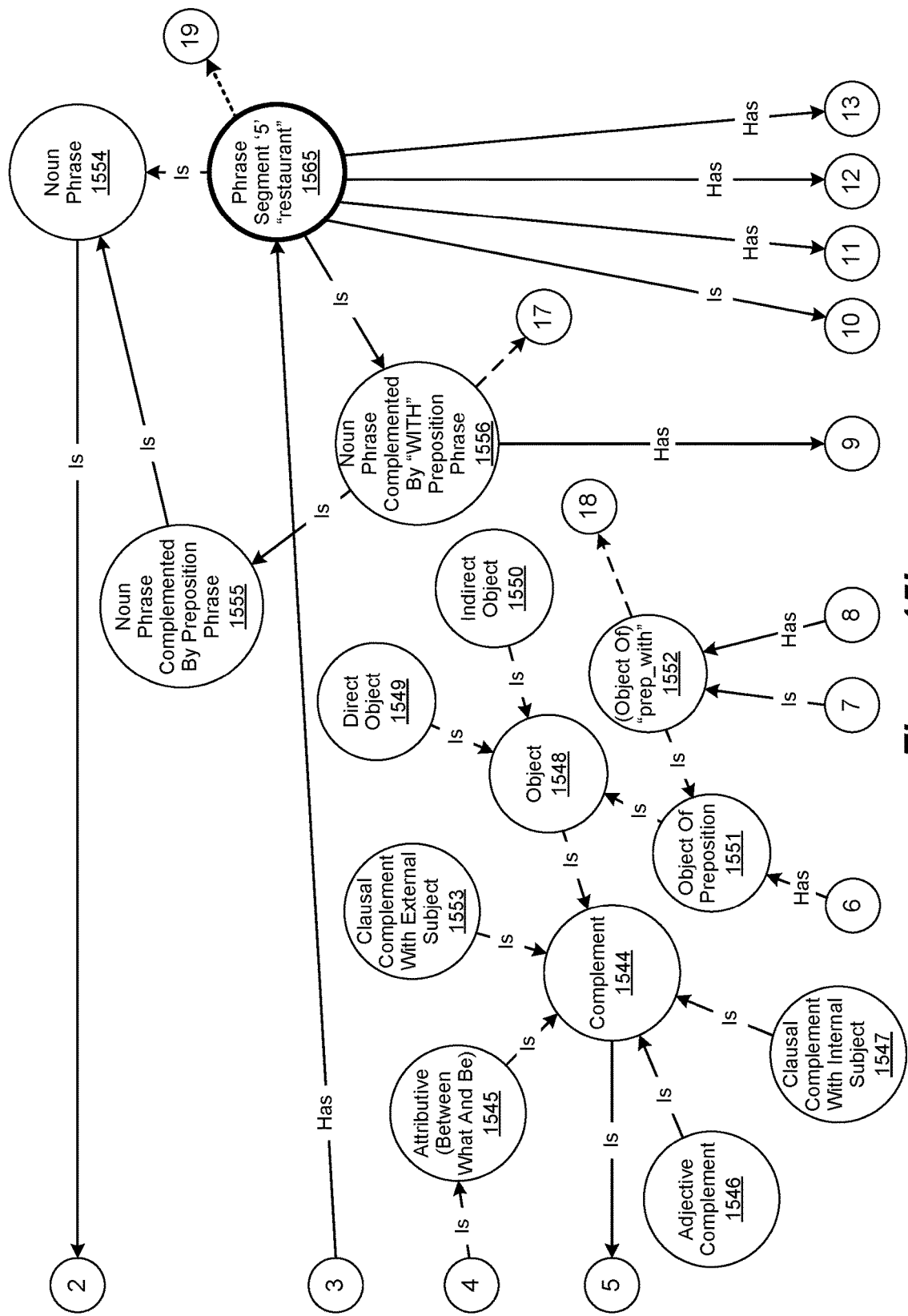
Figure 15C:
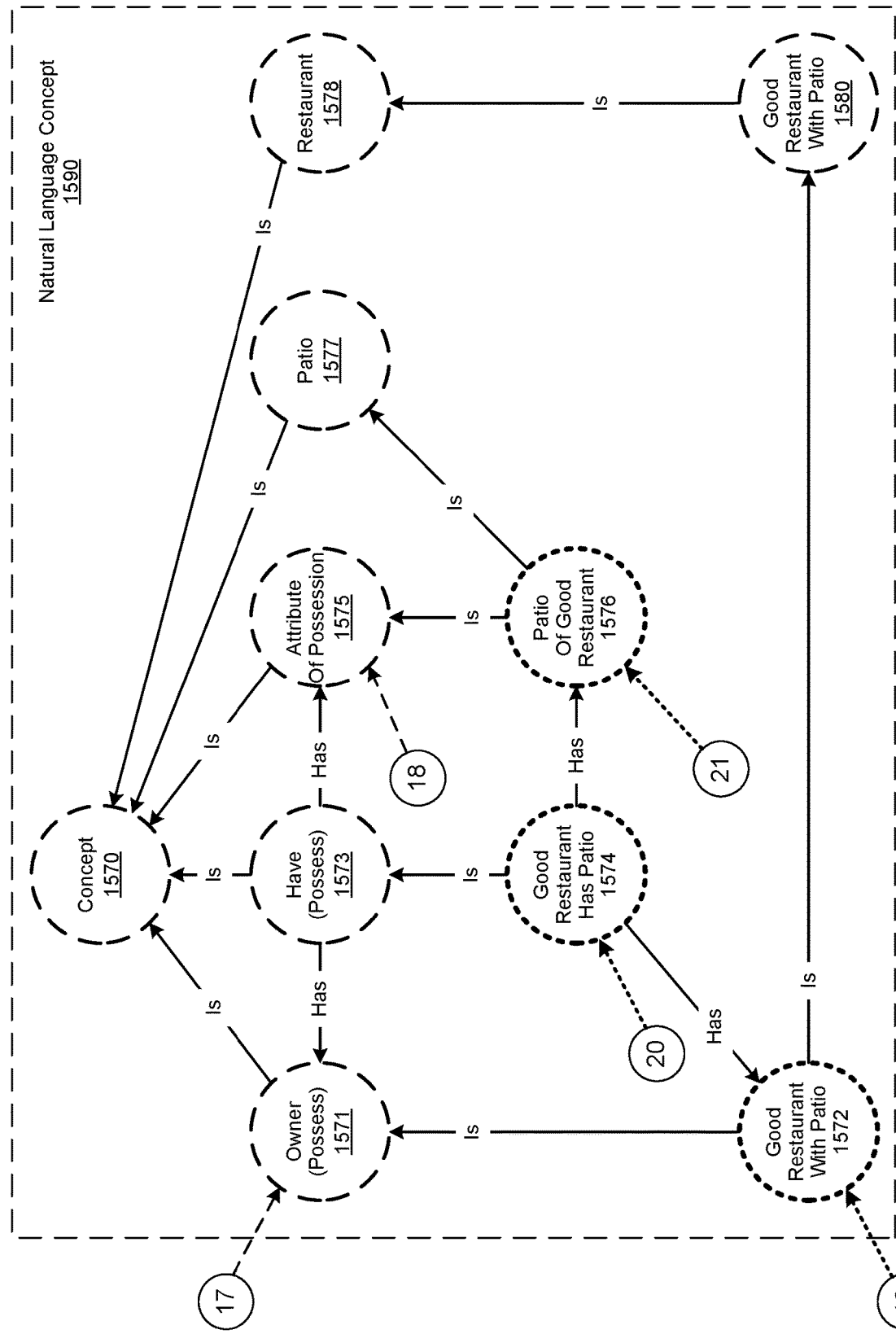
Figure 15D:
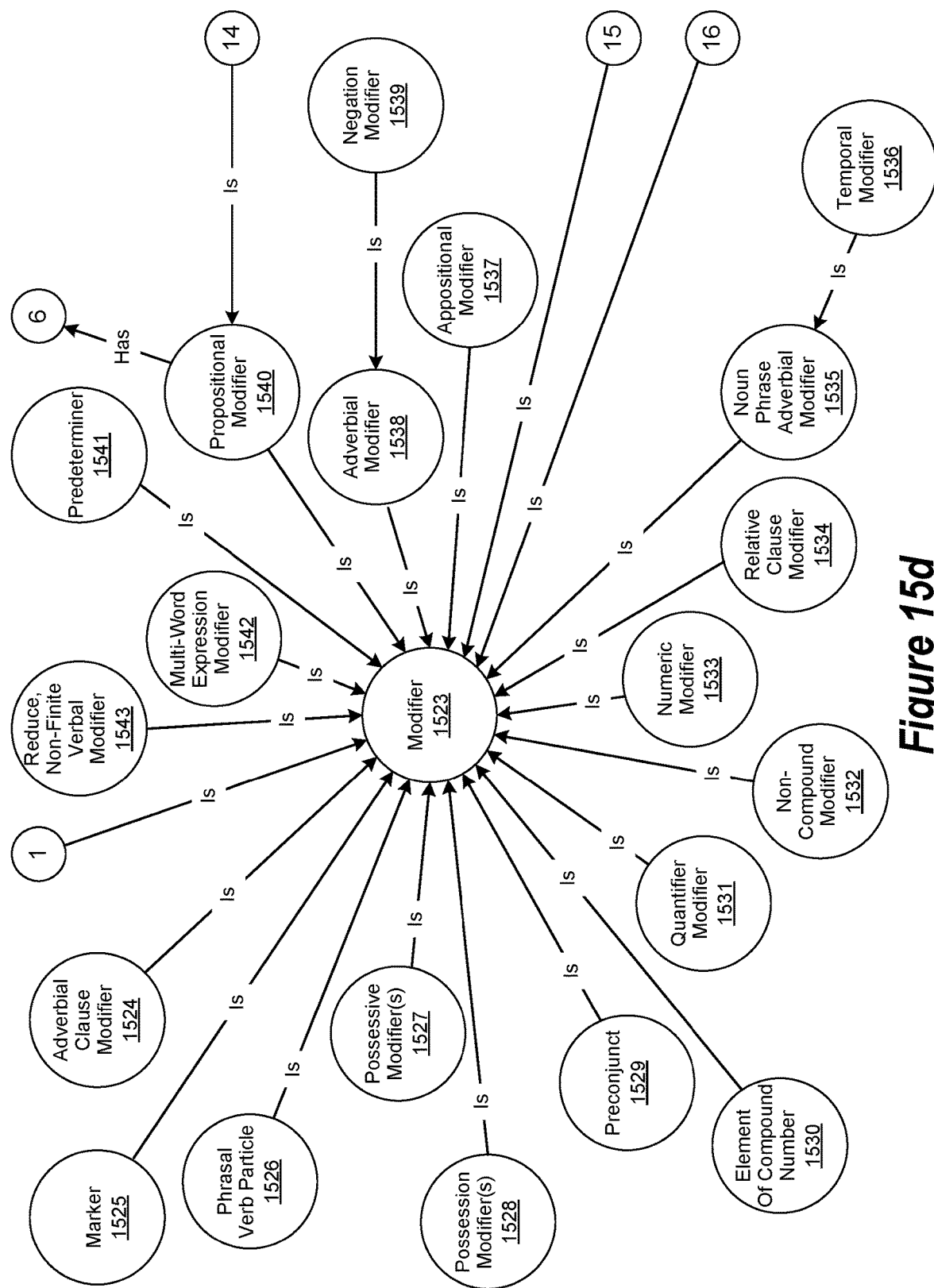
Figure 15E:
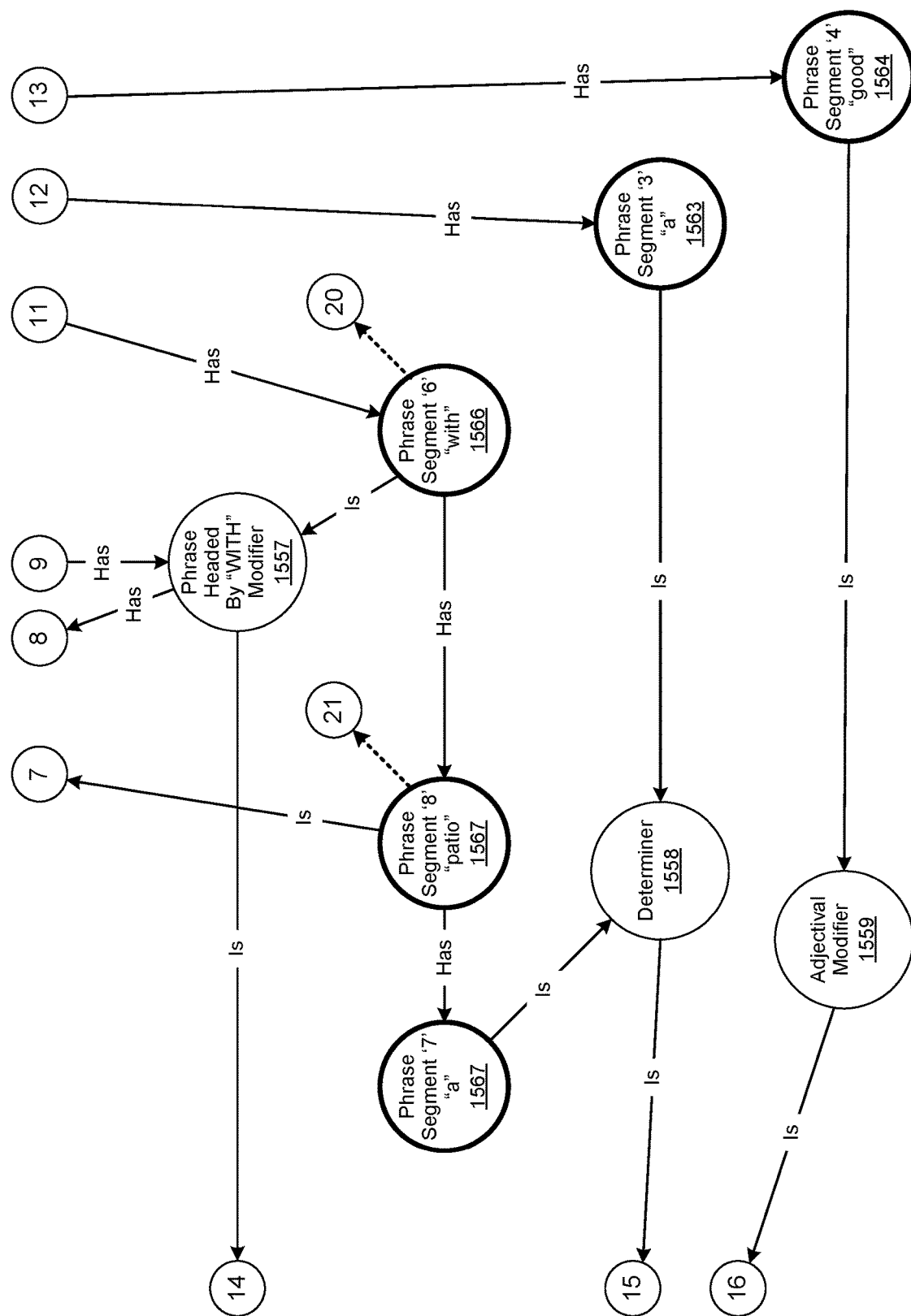

FIGS. 14a and 14b are a simplified graphical representation of the modeling of negation in a universal cognitive graph implemented in accordance with an embodiment of the invention. In various embodiments, a "not is a" relationship, which is a variant of an "is a" relationship, is implemented in a universal cognitive graph to accurately model negation. Skilled practitioners of the art will be aware of the challenges negation poses in Natural Language Processing (NLP). One such challenge is that negation may be either phrasal (e.g., "I am not in the building.") or definitive (e.g., "I am absent from the building."). Since either syntactic structure may indicate negation of the concept of the concept of "presence," there is a need to accurately model both in a universal cognitive graph.

Another challenge is the word "not" is typically omitted as a "stop" word in traditional search techniques as it appears too frequently. Furthermore, even when the word "not" is included, it is generally on the basis of single-word searches. As a result, the concepts it modifies are typically not taken into account. For example, performing a typical Internet search for "cities not in Texas" returns any web page that references cities in Texas and contains the word "not," which essentially provides search results that are the opposite of the user's intent. Yet another challenge is that negation reverses entailment. For example, while the phrase "dogs eat bacon" entails "dogs eat meat," the negated form "dogs do not eat bacon" does not entail "dogs do not eat meat." Accordingly, such examples of reversed entailment need to be accurately modeled in the universal cognitive graph such that that data retrieval processes can traverse a known pattern of relationships.

In various embodiments negation may be modeled in a universal cognitive graph by having a node encompass a negated concept, or alternatively, as a negated relationship between positive nodes. Those of skill in the art will recognize the latter approach provides certain advantages, both philosophical and practical. For example, there is no practical need for the human mind to store a concept for "not a dog." More particularly, when the phrase is mentally conceptualized, all entities that are not dogs, an infinite class, are not brought to mind.

Alternatively, the negation of the positive class of "dog" is sufficient to understand the concept. Furthermore, the only defining feature of the negative class of "not a dog" would be something that wasn't a dog. As a result, the internal processes implemented for searching for children nodes of a "not a dog" node would constantly be checking whether a concept were a dog or not to determine whether it should have inheritance into the node. In contrast, representing negation as a "not is a" relationship or edge in a universal cognitive graph results in the elimination of a host of nodes that would rarely be used. Furthermore, the structure of natural languages would be more closely followed.

In this embodiment, a person is represented by the "person" node 1406, which has a corresponding "has a" relationship with the "attribute of person" node 1408. Likewise, the "person" node 1406 is defined by the "animal" node 1402, which has a corresponding "has a" relationship with the "attribute of animal" node 1404, which in turn is used to define the "attribute of person" node 1408. These corresponding "has a" and "is a" relationships between the "person" node 1406, the "attribute of person" node 1408, the "animal" node 1402, and the "attribute of animal" node 1404 respectively form the rungs and rails of a ladder entailment pattern, described in greater detail herein.

As shown in FIGS. 14a and 14b, a patient is represented by the "patient" node 1414, which has a corresponding "has a" relationship with the "attribute of patient" node 1416. The "patient" node 1414 and the "attribute of patient" node 1416 are respectively defined by the "person" node 1406 and the "attribute of person" node 1408 through "is a" relationships. These corresponding "has a" and "is a" relationships respectively form rung and rail extensions to the ladder entailment pattern previously formed by the "animal" node 1402, "attribute of animal" node 1404, the "person" node 1406, and the "attribute of person" node 1408. Likewise, a homeless person is represented by the "homeless person" node 1418, which has a corresponding "has a" relationship with the "attribute of homeless person" node 1420. The "homeless person" node 1418 is defined by both the "person" node 1406 ad the "attribute of person" node 1408.

As likewise shown in FIGS. 14a and 14b, the concept of a homeless patient is represented by the creation of the "homeless patient" node 1428, which results in the creation of the "attribute of homeless patient" node 1426 and a corresponding "has a" relationship between the two. Likewise, the "homeless patient" node 1428 is defined by the "homeless person" node 1418, the "patient" node 1414, and the "attribute of patient" node 1416 through "is a" relationships. The "attribute of homeless patient" node 1426 is likewise defined by the "attribute of homeless person" node 1420 through a corresponding "is a relationship." As described in greater detail herein, these corresponding "has a" and "is a" relationships between the "homeless person" node 1418, the "attribute of homeless person" node 1420, the "homeless patient" node 1428, and the "attribute of homeless patient" node 1426 form a ladder entailment pattern.

Likewise, the concept of a patient with a home is represented by the "patient with home" node 1430, which has a corresponding "has a" relationship with the "attribute of patient with home" node 1432. The "patient with home" node 1430 and the "attribute of patient with home" node 1432 are respectively defined by the "patient" node 1414 and the "attribute of patient" node 1416 through corresponding "is a" relationships. As shown in FIG. 14a, the "patient with home" node 1430 is likewise defined by the "person with home" node 1410 with an "is a" relationship. As described in greater detail herein, these corresponding "has a" and "is a" relationships between the "patient" node 1414, the "attribute of patient" node 1416, the "patient with home" node 1430, and the "attribute of patient with home" node 1432 form a ladder entailment pattern.

The concept of an address associated with an animal can likewise be represented by the "address of animal" node 1438, which is defined by both the "address" node 1440 and the "attribute of animal" node 1404 through corresponding "is a" relationships. In turn, the "address" node 1438 is used to define the "address of person" node 1440, which is likewise used to define the "home address" node 1444, which has a corresponding "has a" relationship with the "attribute of home address" node 1446. In turn, the "home address" node 1444 is used to define the "patient's home address" node 1450, which is likewise defined by the "attribute of patient with home" node 1432. Likewise, the "home of patient" node 1434 has a corresponding "has a" relationship with the "attribute of patient's home address node" 1452, which is likewise used to define the "patient's home zip code" node 1454. The "patient's home zip code" node 1454 is further defined by the "home zip code" node 1448, which in turn is defined by the "attribute of home address" node 1446.

As likewise shown in FIGS. 14a and 14b, the "person with home" node 1410 has a corresponding "has a" relationship with the "attribute of person with home" node 1428, which is defined by the "attribute of person" node 1408. The "attribute of person with home" node 1428 is likewise used to define the "home" node 1430, which has a corresponding "has a" relationship with the "attribute of home" node 1432, which is likewise used to define the "home address" node 1444. Likewise, the "home of patient" node 1434 has a corresponding "has a" relationship with the "attribute of patient's home" node 1436, which is both defined by the "attribute of home" node 1432, and used to define the "patient's home address" node 1450.

The "home of patient node" 1434 is likewise defined by the "attribute of patient with home" node" 1432 and the "home node" 1430. As described in greater detail herein, the various "has a" and "is a" relationships between the "home node" 1430, the "attribute of patient" node 1416, the "home of patient node" 1434, and the "attribute of patient's home" node 1436 form a ladder entailment pattern. From the foregoing, skilled practitioners of the art will recognize that further defining the "home" node 1430 with a "not is a" relationship with the "attribute of homeless person" node 1420 simply and accurately implements the use of negation to support the concept that a homeless patient does not have a home. Those of skill in the art will likewise recognize that many such embodiments are possible and the foregoing is not intended to limit the spirit, scope or intent of the invention.

FIGS. 15a through 15e are a simplified graphical representation of a corpus of text modeled as knowledge elements in a universal cognitive graph implemented in accordance with an embodiment of the invention to represent an associated natural language concept. In various embodiments, text data is conceptualized through the performance of various Natural Language Processing (NLP) parsing, instance mapping, and resolution processes described in greater detail herein. In these embodiments, the performance of these processes results in the generation of various knowledge elements, which are then stored as nodes in a universal cognitive graph. The performance of these processes likewise results in the generation of graph edges representing various "is a" and "has a" relationships, which support inheritance and attribution properties, likewise described in greater detail herein. As a result, text received by a Cognitive Inference and Learning System (CILS), whether a statement or a query, is accurately and precisely modeled within the universal cognitive graph.

In various embodiments, a natural language concept is defined in a universal cognitive graph by describing the necessary and sufficient conditions for membership or inheritance of that type. For example:

a victim is any entity that is harmed
boating is traveling on a boat

Each of these definitions defines a parent and a restriction on that parent. In this example, the word "victim" is any entity filling the experiencer role of the verb "harm." In another example, the word "victim" is filling the experiencer role of the verb "harm:"

"The chemical harmed the wallpaper."
→"The wallpaper is a victim of the chemical you used."
As yet another example:
"The four of them traveled to Hawaii on a cruise ship."
→"The four of them boated to Hawaii."

In this example, the phrase "to boat" modifies its parent, "travel," such that whenever the mode of "travel" is a "boat," the sentence may be rephrased with the verb "boat."

In various embodiments, deductions are made by examining the necessary and sufficient criteria for inheritance of the type. If the criteria are met by a particular concept, a new "is a" relationship is created. For example:

"Maggie worked serving food to rich clients at a country club."

In this example, an NLP parser implemented in various embodiments would identify that "Maggie" refers to a woman. As a result, a new node representing that instance of "Maggie" would be created during conceptualization and an "is a" relationship would be created between it and a node representing the class "woman," which is defined through inheritance from a node representing the class "human." To continue the example, a subclass of the class "human" might be "employee." In various embodiments, a conceptualizer is implemented, which would identify the concept of "worked serving food," and search for nodes that use that statement, or any part thereof, as part of a definition. To further continue the example, "waitress," a type of employee, might be defined as an agent of the concept of "worked serving food." Accordingly, since the "Maggie" node meets the necessary and sufficient criteria for a "waitress" node, an "is a" relationship can be extrapolated between them and created.

In various embodiments, any instance or class can fold downward on an entailment tree implemented in a universal cognitive graph. Furthermore, every type can be subtyped infinitely. For example, if a node inherits from a type, and matches the criteria for a subtype, it folds downward, removing the "is a" relationship from the original class, and adding an "is a" relationship to the subtype. In these embodiments, the more that is discovered about a concept, the further down an entailment tree the concept can be classed, thereby increasing its specificity.

In certain embodiments, upward folding only occurs at storage time, not at the time a query is processed. As an example, the following statement would be stored as an instance of "hasten:"

"Maggie hastened to serve the senator his lunch."
"Did Maggie serve the senator quickly?"
–> yes Since hasten is defined as to act quickly, the manner of the "hasten" frame element inherits from the manner of "act," and adds the additional attribute of "quick." When the second sentence, "Did Maggie serve the senator quickly?" is received by a CILS, it is stored as an instance of "serve," which in turn is an instance of "act." Downward folding along the definition of "hasten" leads the sentence to be stored as "Did Maggie hasten to serve the senator?" which in turn leads directly to the first sentence, which is stored as, "Maggie hastened to serve the senator his lunch."

In various embodiments, unstructured text data sourced into a CILS is first normalized and then mapped to the conceptual model of the universal cognitive graph. In these embodiments, the unstructured text data is ingested into the CILS in one of the following ways:

base knowledge
unstructured text parsing
from a mapper for an existing sourcing agent
from a mapper for an existing enrichment agent
rule-based internal resolution In various embodiments, enrichment processes, described in greater detail herein, are performed on a corpus of text with utilizable structure received by a CILS. In these embodiments, these blocks of text within the corpus are stored in their native forms in a graph, first their context, then the document they reside in, then the position within the document, and finally the structural components of the text itself, such as headers, paragraphs, sentences, phrases, words, phonemes. Those of skill in the art will be aware that no readable text is ever truly unstructured, as comprehension requires at least some of these substructures to exist. As a result, various ingestion engines implemented in certain embodiments merely store these substructures in a machine-readable manner in the universal cognitive graph.

Once the existing architecture is captured, additional structure is extrapolated as a suggested parse, which is stored in the universal cognitive graph alongside the text itself. Skilled practitioners of the art will recognize that everything up to this point can be said to be infallible, or true to its source, yet the parse is fallible, and introduces the potential for error. Accordingly, the text is componentized and improved by machine learning approaches familiar to those of skill in the art.

The goal of parsing operations performed in these embodiments is to map the text strings to a set of known words and phrase structures. From there, each word or phrase is resolved or disambiguated. In particular, a disambiguated word or phrase points to only one concept or meaning. If the parse or resolution is incorrect, then the resulting "understanding" (i.e., the proper placement in the universal cognitive graph) will also be incorrect, just as human communication has the potential for misinterpretation. The result of these parsing and resolution processes is conceptualization, which is as used herein, refers to the mapping and storage of each structure, from context down to the phoneme level, to its own node in the universal cognitive graph, and by extension, linked to the existing nodes with appropriate entailment and attribution relationships.

In various embodiments, the CILS is implemented with an NLP engine that is configured to select various NLP parsers, as needed, based upon their respective features and capabilities, to optimize performance and accuracy of modeling knowledge elements in the universal cognitive graph. In these embodiments, the CILS annotates the parsed text to identify the parser used to parse the text in the universal cognitive graph, including both the part of speech tags and the parse tree (e.g., typed dependencies, trees, or other forms representing the parse structure).

As an example, an NLP parser may receive the following query for processing:

"What is a good restaurant with a patio?"

As a result, each typed dependency in the parser may represent a phrase, resulting in the following output:

attr(is-2, what-1),
root(ROOT-0, is-2),
det(restaurant-5, a-3),
amod(restaurant-5, good-4),
nsubj(is-2, restaurant-5),
det(patio-8, a-7),
prep with(restaurant-5, patio-8)

In this example, the set of typed dependencies, including det, nsubj, cop, and root, needs to be accurately modeled in the ontology of the universal cognitive graph. Against this typed-dependency backdrop, the textual data is then sent to the parser, tagged with parts of speech and typed dependencies, and exported into the graph according to its tags. Accordingly, the phase is pre-computed, and then saved in the universal cognitive graph before a related query or piece of textual data is processed.

Once text is ingested and assimilated into the universal cognitive graph, resolution processes are performed in various embodiments to map the concept to individual nodes. In these embodiments, the resolution processes may involve traversal from text, through representation, to concept. In certain embodiments, the text stage is bypassed during the resolution process. In various embodiments, the resolution processes may be ongoing as the CILS may resolve incompletely or incorrectly and have to go back and revisit the original text when prompted.

Skilled practitioners of the art will be aware that there are a variety of techniques that when combined, can generate increasingly useful resolutions. As an example, a first stage of resolution can be tested independently from the parse and assimilation stages by iteration over each word, or token, in the case of multiwords and morphemes, in the sentence, document, or context, to find the set of nodes which have the text string as their name, while omitting stop words. As an example, the word "park," would likely yield two nodes: "park," where one relaxes, and "park," which is related to storing a vehicle.

In certain embodiments, a simple score can be affixed to each sense by finding the degree of separation between any given sense of a word, and all the senses of each other word in the context. Likewise, the scoring and ranking algorithms implemented within these embodiments may be manipulated to achieve optimum results, and machine learning approaches familiar to those of skill in the art may be used long-term. Those of skill in the art will likewise recognize that it is advantageous to store the decision tree should there be a need to backtrack at any point and re-resolve to correct an error. For example, if a user communicates something to the effect of "That isn't what I meant." In these embodiments, these approaches may be used at any stage as it relates to an ontology implemented in the universal graph, with the understanding that as the ontology broadens, the scoring will become more accurate.

In various embodiments, each word received and processed by a CILS has both syntactic and semantic restrictions upon its distribution in speech. For example, the preposition "in," when resolving to a sense meaning "duration," requires the complemented noun phrase following it have the concept of a length of time or duration. For example, the phrase "two hours" in "She accomplished the task in two hours." In these embodiments, affixes, word type, position, case, and other markers may either restrict an ambiguity set or ultimately resolve a word to its concept. Skilled practitioners of the art will recognize that this stage of processing will require an accurate parse to represent each word's particular distribution.

Referring now to FIGS. 15a through 15e, a phrase is represented by the "phrase" node 1501, which is used to define the "dependent" node 1504, the "main phrase" node 1503, the "root" node 1502, and the "noun phrase" node 1504 through "is a" relationships, as described in greater detail herein. The "dependent" node 1504 is likewise used to define the "auxiliary" node 1505, which in turn is used to define both the "passive auxiliary" node 1506 and the "copula" node 1507. Likewise, the "dependent" node 1504 is used to define the "argument" node 1508, which in turn is used to define the "referent" node 1509, the "agent" node 1510, and the "subject" node 1511, which in turn is used to define the "clausal subject" node 1512, and the "nominal subject" node 1514.

In turn, the "clausal subject" node 1512 and the "nominal subject" node 1514 are respectively used to define the "passive clausal subject" node 1513 and the "passive nominal subject" node 1515. Likewise, the "argument" node 1508 is used to define the "coordination" node 1516, the "expletive" node 1517, the "parataxis" node 1518, the "punctuation" node 1519, the "conjunct" node 1520, and the "semantic dependent" node 1521, which in turn is used to define the "controlling subject" node 1522.

The "argument" node 1508 is likewise used to define the "modifier" node 1523, which in turn is used to define the "adverbial clause modifier" node 1524, the "marker" node 1525, the "phrasal verb particle" node 1526 and the "possessive modifier(s)" node 1527. Likewise, the "modifier" node 1523 is used to define the "possession modifier(s)" node 1528, the "preconjunct" node 1529, the "element of compound number" node 1530, the 'quantifier modifier" node 1531, and the "non-compound modifier" node 1532. The "modifier" node 1523 is likewise used to define the "numeric modifier" node 1533, the "relative clause modifier" node 1634, and the "noun phrase adverbial modifier" node 1535, which in turn is used to define the "temporal modifier" node 1536.

Likewise, the "modifier" node 1523 is used to modify the "appositional" node 1537 and the "adverbial modifier" node 1538, which in turn is used to define the "negation modifier" node 1539. The "modifier" node 1523 is likewise used to define the "predeterminer" node 1541, the "multi-word expression modifier" node 1542, the "reduce, non-finite verbal modifier" node 1543, and the "propositional modifier" node 1540, which has a corresponding "has a" relationship with the "object of proposition" node 1551. Likewise, the "modifier" node 1523 is used to define the "determiner" node 1558 and the "adjectival modifier" 1559.

As shown in FIGS. 15a through 15e, the "argument" node 1508 is likewise used to define the "complement" node 1544, which in turn is used to define the "clausal complement with internal subject" node 1547, and the "adjective complement" node 1546. Likewise, the "argument" node 1508 is used to define the "attributive (between what and be)" node 1545, the "clausal complement with external subject" node 1553, and the "object" node 1548. In turn, the "object" node 1548 is used to define the "direct object" node 1549, the "indirect object" node 1550, and the "object of preposition" node 1551, which is likewise used to define the "(object of) prep with" node 1552.

The "noun phrase" node 1554 is likewise used to define the "noun phrase complemented by preposition phrase" node 1555, which in turn is used to define the "noun phrase complemented by 'WITH' preposition phrase" node 1556, which has a corresponding "has a" relationship with the "phrase headed by 'WITH' modifier" node 1557. In turn, the "phrase headed by 'WITH' modifier" node 1557 is defined by the "propositional modifier" node 1540, and likewise has a corresponding "has a" relationship with the "(object of) prep_with" node 1552.

From the foregoing, those of skill in the art will recognize that a phrase, such as "What is a good restaurant with a patio?" can be represented by the creation of a corresponding node in the universal cognitive graph, such as the "What is a good restaurant with a patio?" node 1560, which in turn is defined by the "main phrase" node 1503. In this embodiment, NLP parsing processes, described in greater detail herein, are performed to generate parsed phrase segments from the phrase "What is a good restaurant with a patio?" The resulting phrase segments are then represented by creating corresponding nodes within the universal cognitive graph shown in FIGS. 15a through 15e. For example, the parsed phrase segments "What," "is," "a," "good," and "restaurant," are respectively represented by the "phrase segment '1' 'what'" node 1551, the "phrase segment '2' 'is'" node 1562, the "phrase segment '3' 'a'" node 1563, the "phrase segment '4' 'good'" node 1564, and the "phrase segment '5' 'restaurant'" node 1565. Likewise, the "with," "a," and "patio" parsed phrase segments are respectively represented by the "phrase segment '6' 'with'" node 1566, the "phrase segment '7' 'a'" node 1567, and the "phrase segment '8"patio'" node 1567.

As likewise shown in FIGS. 15a through 15e, the various relationships between these nodes are represented by "is a" and "has a" relationships, as described in greater detail herein. For example, the "What is a good restaurant with a patio?" node 1560 has a corresponding "has a" relationship with the "phrase segment '2' 'is'" node 1562, which is defined by the "root" node 1502. The "phrase segment '2' 'is'" node 1562 likewise has corresponding "has a" relationships with the "phrase segment '5' 'restaurant' node 1565 and the "phrase segment '1' 'what'" node 1551, which is defined by the "attribute (between what and be)" node 1545. The "phrase segment '5' 'restaurant'" node 1565 is likewise defined by the "noun phrase" node 1554, the "noun phrase complemented by 'WITH' preposition phrase" node 1556 and the "nominal subject" node 1514. Likewise, the "phrase segment '5' 'restaurant'" node 1565 has corresponding "has a" relationships with the "phrase segment '3' 'a'" node 1563, the "phrase segment '4' 'good'" node 1564.

In turn, the "phrase segment '3' 'a'" node 1563 is defined by the "determiner" node 1558, and the "phrase segment '4' 'good'" node 1564 is defined by the "adjectival modifier" node 1559. The "phrase segment '6' 'with'" node 1566 is likewise defined by the "phrase headed by 'WITH' modifier" node 1557, and has a corresponding "has a" relationship with the "phrase segment '8' 'patio'" node 1567. In turn, the "phrase segment '8' 'patio'" node 1567 is likewise defined by the "(object of) prep with" node 1552, and has a corresponding "has a" relationship with the "phrase segment '7' 'a'" node 1567, which in turn is defined by the "determiner" node 1558.

In various embodiments, parsed phrase segments resulting from NLP parsing operations can be resolved to accurately represent a natural language concept associated with a phrase received by a CILS for processing. In these embodiments, predetermined natural language concept relationships between individual parsed phrase segments and corresponding natural language concepts are generated. As an example, a noun phrase that is complemented by a "with" preposition phrase, like "tree with leaves," is a representation of the concept "thing which has." The object of that prepositional phrase, "tree with leaves," is a representation of the natural language concept "thing which is had." Accordingly, the phrase segment "restaurant with patio" can be mapped to "restaurant that has a patio," and "patio" can be mapped to "the patio that is had by the restaurant."

In certain embodiments, the distinction between natural language representation and natural language concept spaces effectively modularizes syntax and semantics without actually separating them. Syntax is described by the nodes in the natural language representation of knowledge elements in the universal cognitive graph, while semantics is described by a natural language concept space. In various embodiments, the natural language concept space is implemented within a universal cognitive graph. In these embodiments, any number of languages or formats of representation, such as photographs, documents, French lexical units, and so forth, will point to the same natural language concepts regardless of their source.

In this embodiment, a natural language concept 1590 for the phrase "What is a good restaurant with a patio?" can be resolved by first creating a "concept" node 1570. In turn, the "concept" node 1570 is used to define the "owner (possess)" node 1571, the "have (possess)" node 1573, the "attribute of possession" node 1575, the "patio" node 1577, and the "restaurant" node 1578. The "have (possess) node 1573 likewise has corresponding "has a" relationships with the "owner (possess)" node 1571 and the "attribute of possession" node 1575, and is likewise used to define the "good restaurant has patio" node 1574. Likewise, the "good restaurant has patio" node 1574 has corresponding "has a" relationships with the "good restaurant with patio" node 1572, which is defined by the "owner (possess) node 1571, and "patio of good restaurant" node 1776, which defined by both the "attribute of possession" node 1575 and the "patio" node 1574. The "good restaurant with patio" node 1580 is likewise defined by the "good restaurant with patio" node 1572 and the "restaurant" node 1578.

As shown in FIGS. 15*a* through 15*e*, the "owner (possess)" node 1571 is resolved by establishing a predetermined natural language concept relationship with the "noun phrase complemented by 'WITH' preposition phrase" node 1556. The "attribute of possession" concept node 1575 is likewise resolved by establishing a predetermined natural language concept relationship with the "(object of) prep_with" node 1552. The resolution of the "good restaurant with patio" node 1572 is likewise ensured by establishing a predetermined natural language concept relationship with the "phrase segment '5' 'restaurant'" node 1565. Likewise, the resolution of the "good restaurant has patio" node 1574, and the "patio of good restaurant" node 1576 are ensured by respectively establishing predetermined natural language concept relationships with the "phrase segment '6' 'with'" node 1566, and the "phrase segment '8' 'patio'" node 1567. Skilled practitioners of the art will recognize that many such embodiments are possible and the foregoing is not intended to limit the spirt, scope or intent of the invention.

Figure 16:
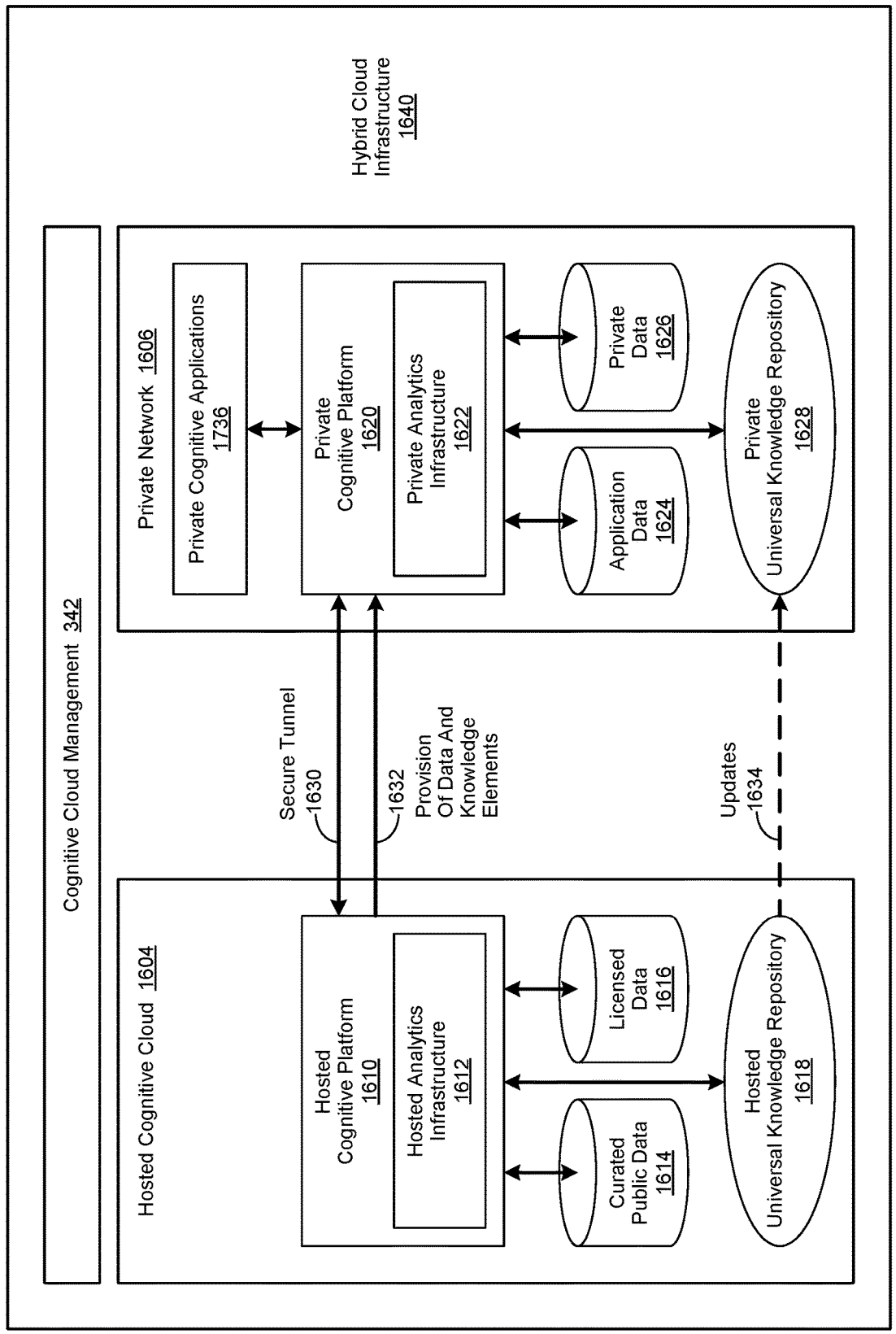
FIG. 16 is a simplified block diagram of a plurality of cognitive platforms implemented in a hybrid cloud environment.

FIG. 16 is a simplified block diagram of a plurality of cognitive platforms implemented in accordance with an embodiment of the invention within a hybrid cloud infrastructure. In this embodiment, the hybrid cloud infrastructure 1640 includes a cognitive cloud management 342 component, a hosted 1604 cognitive cloud environment, and a private 1606 network environment. As shown in FIG. 16, the hosted 1604 cognitive cloud environment includes a hosted 1610 cognitive platform, such as the cognitive platform 310 shown in FIGS. 3, 4*a*, and 4*b*. In various embodiments, the hosted 1604 cognitive cloud environment may also include a hosted 1617 universal knowledge repository and one or more repositories of curated public data 1614 and licensed data 1616. Likewise, the hosted 1610 cognitive platform may also include a hosted 1612 analytics infrastructure, such as the cloud analytics infrastructure 344 shown in FIGS. 3 and 4*c*.

As likewise shown in FIG. 16, the private 1606 network environment includes a private 1620 cognitive platform, such as the cognitive platform 310 shown in FIGS. 3, 4*a*, and 4*b*. In various embodiments, the private 1606 network cognitive cloud environment may also include a private 1628 universal knowledge repository and one or more repositories of application data 1624 and private data 1626. Likewise, the private 1620 cognitive platform may also include a private 1622 analytics infrastructure, such as the cloud analytics infrastructure 344 shown in FIGS. 3 and 4*c*. In certain embodiments, the private 1606 network environment may have one or more private 1636 cognitive applications implemented to interact with the private 1620 cognitive platform.

As used herein, a universal knowledge repository broadly refers to a collection of knowledge elements that can be used in various embodiments to generate one or more cognitive insights described in greater detail herein. In various embodiments, these knowledge elements may include facts (e.g., milk is a dairy product), information (e.g., an answer to a question), descriptions (e.g., the color of an automobile), skills (e.g., the ability to install plumbing fixtures), and other classes of knowledge familiar to those of skill in the art. In these embodiments, the knowledge elements may be explicit or implicit. As an example, the fact that water freezes at zero degrees centigrade would be an explicit knowledge element, while the fact that an automobile mechanic knows how to repair an automobile would be an implicit knowledge element.

In certain embodiments, the knowledge elements within a universal knowledge repository may also include statements, assertions, beliefs, perceptions, preferences, sentiments, attitudes or opinions associated with a person or a group. As an example, user 'A' may prefer the pizza served by a first restaurant, while user 'B' may prefer the pizza served by a second restaurant. Furthermore, both user 'A' and 'B' are firmly of the opinion that the first and second restaurants respectively serve the very best pizza available. In this example, the respective preferences and opinions of users 'A' and 'B' regarding the first and second restaurant may be included in the universal knowledge repository 880 as they are not contradictory. Instead, they are simply knowledge elements respectively associated with the two users and can be used in various embodiments for the generation of various cognitive insights, as described in greater detail herein.

In various embodiments, individual knowledge elements respectively associated with the hosted 1617 and private 1628 universal knowledge repositories may be distributed. In one embodiment, the distributed knowledge elements may be stored in a plurality of data stores familiar to skilled practitioners of the art. In this embodiment, the distributed knowledge elements may be logically unified for various implementations of the hosted 1617 and private 1628 universal knowledge repositories. In certain embodiments, the hosted 1617 and private 1628 universal knowledge repositories may be respectively implemented in the form of a hosted or private universal cognitive graph. In these embodiments, nodes within the hosted or private universal graph contain one or more knowledge elements.

In various embodiments, a secure tunnel 1630, such as a virtual private network (VPN) tunnel, is implemented to allow the hosted 1610 cognitive platform and the private 1620 cognitive platform to communicate with one another. In these various embodiments, the ability to communicate with one another allows the hosted 1610 and private 1620 cognitive platforms to work collaboratively when generating cognitive insights described in greater detail herein. In various embodiments, the hosted 1610 cognitive platform accesses knowledge elements stored in the hosted 1617 universal knowledge repository and data stored in the repositories of curated public data 1614 and licensed data 1616 to generate various cognitive insights. In certain embodiments, the resulting cognitive insights are then provided to the private 1620 cognitive platform, which in turn provides them to the one or more private cognitive applications 1636.

In various embodiments, the private 1620 cognitive platform accesses knowledge elements stored in the private 1628 universal knowledge repository and data stored in the repositories of application data 1624 and private data 1626 to generate various cognitive insights. In turn, the resulting cognitive insights are then provided to the one or more private cognitive applications 1636. In certain embodiments, the private 1620 cognitive platform accesses knowledge elements stored in the hosted 1617 and private 1628 universal knowledge repositories and data stored in the repositories of curated public data 1614, licensed data 1616, application data 1624 and private data 1626 to generate various cognitive insights. In these embodiments, the resulting cognitive insights are in turn provided to the one or more private cognitive applications 1636.

In various embodiments, the secure tunnel 1630 is implemented for the hosted 1610 cognitive platform to provide 1632 predetermined data and knowledge elements to the private 1620 cognitive platform. In one embodiment, the provision 1632 of predetermined knowledge elements allows the hosted 1617 universal knowledge repository to be replicated as the private 1628 universal knowledge repository. In another embodiment, the provision 1632 of predetermined knowledge elements allows the hosted 1617 universal knowledge repository to provide updates 1634 to the private 1628 universal knowledge repository. In certain embodiments, the updates 1634 to the private 1628 universal knowledge repository do not overwrite other data. Instead, the updates 1634 are simply added to the private 1628 universal knowledge repository.

In one embodiment, knowledge elements that are added to the private 1628 universal knowledge repository are not provided to the hosted 1617 universal knowledge repository. As an example, an airline may not wish to share private information related to its customer's flights, the price paid for tickets, their awards program status, and so forth. In another embodiment, predetermined knowledge elements that are added to the private 1628 universal knowledge repository may be provided to the hosted 1617 universal knowledge repository. As an example, the operator of the private 1620 cognitive platform may decide to license predetermined knowledge elements stored in the private 1628 universal knowledge repository to the operator of the hosted 1610 cognitive platform. To continue the example, certain knowledge elements stored in the private 1628 universal knowledge repository may be anonymized prior to being provided for inclusion in the hosted 1617 universal knowledge repository. In one embodiment, only private knowledge elements are stored in the private 1628 universal knowledge repository. In this embodiment, the private 1620 cognitive platform may use knowledge elements stored in both the hosted 1617 and private 1628 universal knowledge repositories to generate cognitive insights. Skilled practitioners of the art will recognize that many such embodiments are possible and the foregoing is not intended to limit the spirit, scope or intent of the invention.

Figure 17A:
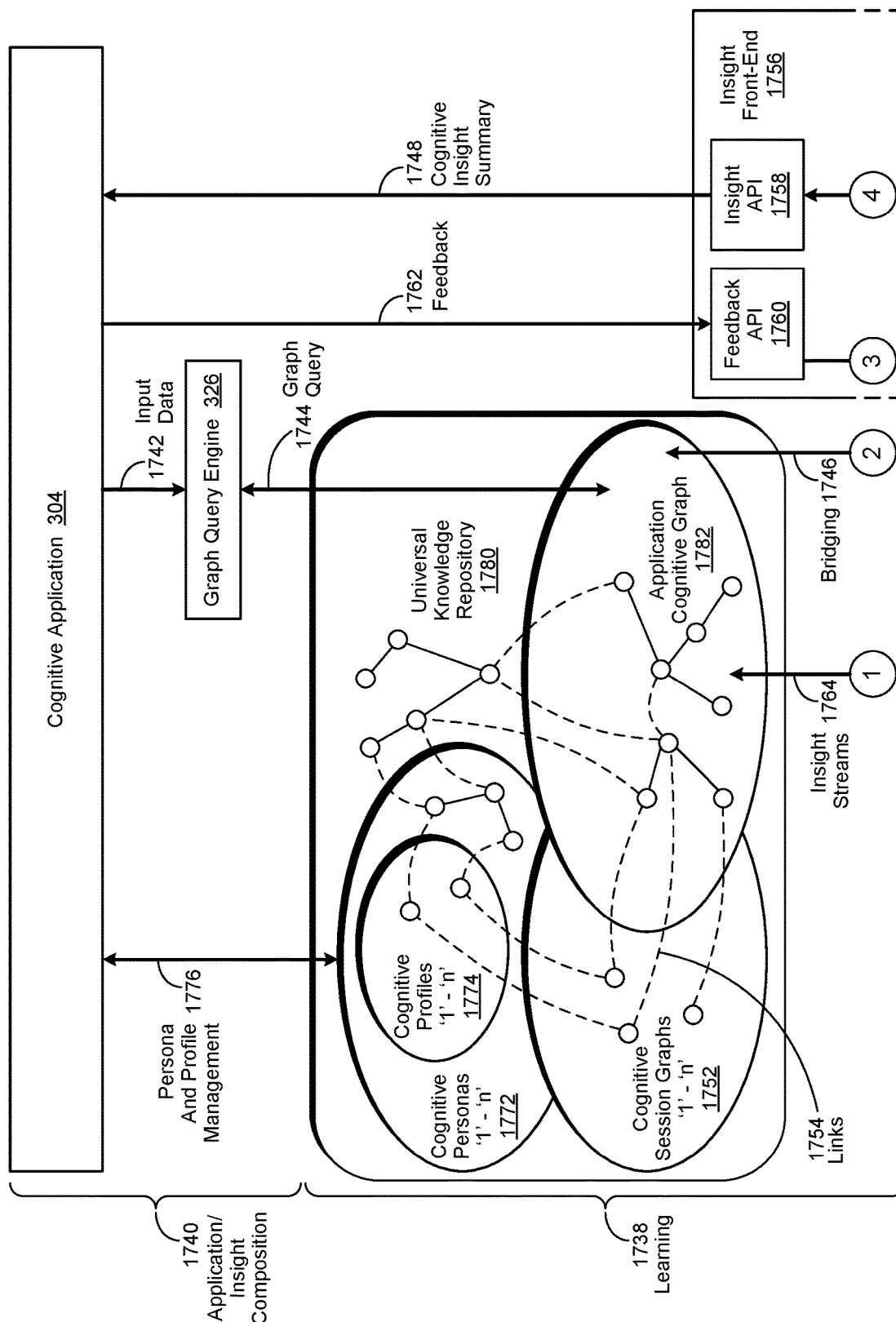
FIGS. 17a and 17b are a simplified process flow diagram of the generation of composite cognitive insights by a CILS.
Figure 17B:
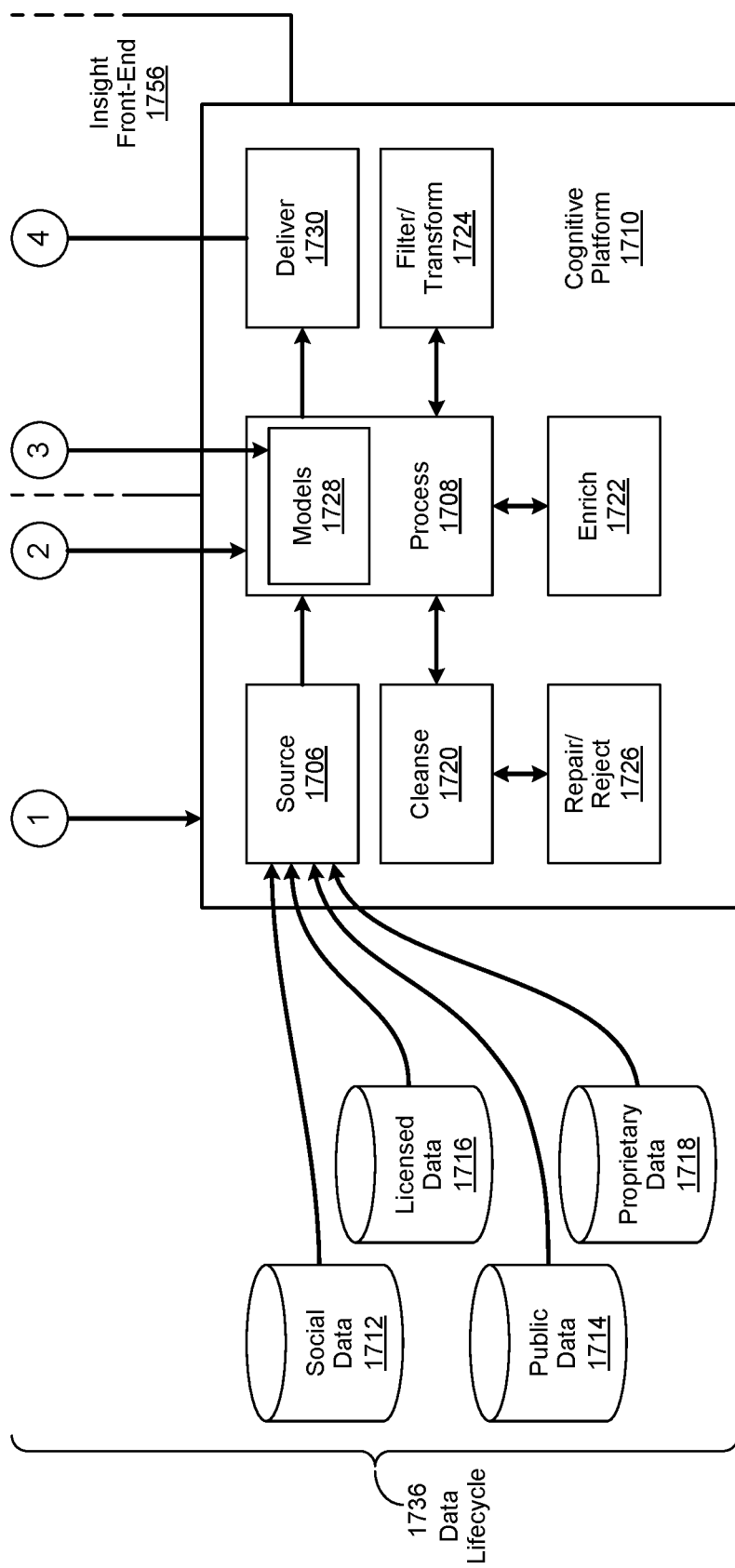

FIGS. 17a and 17b are a simplified process flow diagram showing the use of a universal knowledge repository by a Cognitive Inference and Learning System (CILS) implemented in accordance with an embodiment of the invention to generate composite cognitive insights. As used herein, a composite cognitive insight broadly refers to a set of cognitive insights generated as a result of orchestrating a set of independent cognitive agents, referred to herein as insight agents. In various embodiments, the insight agents use a cognitive graph, such as an application cognitive graph 1782, as their data source to respectively generate individual cognitive insights. As used herein, an application cognitive graph 1782 broadly refers to a cognitive graph that is associated with a cognitive application 304. In certain embodiments, different cognitive applications 304 may interact with different application cognitive graphs 1782 to generate individual cognitive insights for a user. In various embodiments, the resulting individual cognitive insights are then composed to generate a set of composite cognitive insights, which in turn is provided to a user in the form of a cognitive insight summary 1748.

In various embodiments, the orchestration of the selected insight agents is performed by the cognitive insight/learning engine 330 shown in FIGS. 3 and 4a. In certain embodiments, a subset of insight agents is selected to provide composite cognitive insights to satisfy a graph query 1744, a contextual situation, or some combination thereof. For example, it may be determined, as likewise described in greater detail herein, that a particular subset of insight agents may be suited to provide a composite cognitive insight related to a particular user of a particular device, at a particular location, at a particular time, for a particular purpose.

In certain embodiments, the insight agents are selected for orchestration as a result of receiving direct or indirect input data 1742 from a user. In various embodiments, the direct user input may be a natural language inquiry. In certain embodiments, the indirect user input data 1742 may include the location of a user's device or the purpose for which it is being used. As an example, the Geographical Positioning System (GPS) coordinates of the location of a user's mobile device may be received as indirect user input data 1742. As another example, a user may be using the integrated camera of their mobile device to take a photograph of a location, such as a restaurant, or an item, such as a food product. In certain embodiments, the direct or indirect user input data 1742 may include personal information that can be used to identify the user. Skilled practitioners of the art will recognize that many such embodiments are possible and the foregoing is not intended to limit the spirit, scope or intent of the invention.

In various embodiments, composite cognitive insight generation and feedback operations may be performed in various phases. In this embodiment, these phases include a data lifecycle 1736 phase, a learning 1738 phase, and an application/insight composition 1740 phase. In the data lifecycle 1736 phase, a predetermined instantiation of a cognitive platform 1710 sources social data 1712, public data 1714, licensed data 1716, and proprietary data 1718 from various sources as described in greater detail herein. In various embodiments, an example of a cognitive platform 1710 instantiation is the cognitive platform 310 shown in FIGS. 3, 4a, and 4b. In this embodiment, the instantiation of a cognitive platform 1710 includes a source 1706 component, a process 1708 component, a deliver 1730 component, a cleanse 1720 component, an enrich 1722 component, a filter/transform 1724 component, and a repair/reject 1726 component. Likewise, as shown in FIG. 17b, the process 1708 component includes a repository of models 1728, described in greater detail herein.

In various embodiments, the process 1708 component is implemented to perform various composite insight generation and other processing operations described in greater detail herein. In these embodiments, the process 1708 component is implemented to interact with the source 1706 component, which in turn is implemented to perform various data sourcing operations described in greater detail herein. In various embodiments, the sourcing operations are performed by one or more sourcing agents, as likewise described in greater detail herein. The resulting sourced data is then provided to the process 1708 component. In turn, the process 1708 component is implemented to interact with the cleanse 1720 component, which is implemented to perform various data cleansing operations familiar to those of skill in the art. As an example, the cleanse 1720 component may perform data normalization or pruning operations, likewise known to skilled practitioners of the art. In certain embodiments, the cleanse 1720 component may be implemented to interact with the repair/reject 1726 component, which in turn is implemented to perform various data repair or data rejection operations known to those of skill in the art.

Once data cleansing, repair and rejection operations are completed, the process 1708 component is implemented to interact with the enrich 1722 component, which is implemented in various embodiments to perform various data enrichment operations described in greater detail herein. Once data enrichment operations have been completed, the process 1708 component is likewise implemented to interact with the filter/transform 1724 component, which in turn is implemented to perform data filtering and transformation operations described in greater detail herein.

In various embodiments, the process 1708 component is implemented to generate various models, described in greater detail herein, which are stored in the repository of models 1728. The process 1708 component is likewise implemented in various embodiments to use the sourced data to generate one or more cognitive graphs, such as an application cognitive graph 1782, as likewise described in greater detail herein. In various embodiments, the process 1708 component is implemented to gain an understanding of the data sourced from the sources of social data 1712, public data 1714, device data 1716, and proprietary data 1718, which assist in the automated generation of the application cognitive graph 1782.

The process 1708 component is likewise implemented in various embodiments to perform bridging 1746 operations, described in greater detail herein, to access the application cognitive graph 1782. In certain embodiments, the bridging 1746 operations are performed by bridging agents, likewise described in greater detail herein. In various embodiments, the application cognitive graph 1782 is accessed by the process 1708 component during the learn 1736 phase of the composite cognitive insight generation operations.

In various embodiments, a cognitive application 304 is implemented to receive input data associated with an individual user or a group of users. In these embodiments, the input data 1742 may be direct, such as a user query or mouse click, or indirect, such as the current time or Geographical Positioning System (GPS) data received from a mobile device associated with a user. In various embodiments, the indirect input data 1742 may include contextual data, described in greater detail herein. Once it is received, the input data 1742 is then submitted by the cognitive application 304 to a graph query engine 326 during the application/insight composition 1740 phase.

The submitted 1742 input data is then processed by the graph query engine 326 to generate a graph query 1744, as described in greater detail herein. The resulting graph query 1744 is then used to query the application cognitive graph 1782, which results in the generation of one or more composite cognitive insights, likewise described in greater detail herein. In certain embodiments, the graph query 1744 uses knowledge elements stored in the universal knowledge repository 1780 when querying the application cognitive graph 1782 to generate the one or more composite cognitive insights.

In various embodiments, the graph query 1744 results in the selection of a cognitive persona from a repository of cognitive personas '1' through 'n' 1772 according to a set of contextual information associated with a user. As used herein, a cognitive persona broadly refers to an archetype user model that represents a common set of attributes associated with a hypothesized group of users. In various embodiments, the common set of attributes may be described through the use of demographic, geographic, psychographic, behavioristic, and other information. As an example, the demographic information may include age brackets (e.g., 25 to 34 years old), gender, marital status (e.g., single, married, divorced, etc.), family size, income brackets, occupational classifications, educational achievement, and so forth. Likewise, the geographic information may include the cognitive persona's typical living and working locations (e.g., rural, semi-rural, suburban, urban, etc.) as well as characteristics associated with individual locations (e.g., parochial, cosmopolitan, population density, etc.).

The psychographic information may likewise include information related to social class (e.g., upper, middle, lower, etc.), lifestyle (e.g., active, healthy, sedentary, reclusive, etc.), interests (e.g., music, art, sports, etc.), and activities (e.g., hobbies, travel, going to movies or the theatre, etc.). Other psychographic information may be related to opinions, attitudes (e.g., conservative, liberal, etc.), preferences, motivations (e.g., living sustainably, exploring new locations, etc.), and personality characteristics (e.g., extroverted, introverted, etc.) Likewise, the behavioristic information may include information related to knowledge and attitude towards various manufacturers or organizations and the products or services they may provide.

In various embodiments, one or more cognitive personas may be associated with a user. In certain embodiments, a cognitive persona is selected and then used by a CILS to generate one or more composite cognitive insights as described in greater detail herein. In these embodiments, the composite cognitive insights that are generated for a user as a result of using a first cognitive persona may be different than the composite cognitive insights that are generated as a result of using a second cognitive persona.

In various embodiments, provision of the composite cognitive insights results in the CILS receiving feedback 1762 data from various individual users and other sources, such as cognitive application 304. In one embodiment, the feedback 1762 data is used to revise or modify the cognitive persona. In another embodiment, the feedback 1762 data is used to create a new cognitive persona. In yet another embodiment, the feedback 1762 data is used to create one or more associated cognitive personas, which inherit a common set of attributes from a source cognitive persona. In one embodiment, the feedback 1762 data is used to create a new cognitive persona that combines attributes from two or more source cognitive personas. In another embodiment, the feedback 1762 data is used to create a cognitive profile, described in greater detail herein, based upon the cognitive persona. Those of skill in the art will realize that many such embodiments are possible and the foregoing is not intended to limit the spirit, scope or intent of the invention.

In certain embodiments, the universal knowledge repository 1780 includes the repository of personas '1' through 'n' 1772. In various embodiments, individual nodes within cognitive personas stored in the repository of personas '1' through 'n' 1772 are linked 1754 to corresponding nodes in the universal knowledge repository 1780. In certain embodiments, nodes within the universal knowledge repository 1780 are likewise linked 1754 to nodes within the cognitive application graph 1782.

As used herein, contextual information broadly refers to information associated with a location, a point in time, a user role, an activity, a circumstance, an interest, a desire, a perception, an objective, or a combination thereof. In certain embodiments, the contextual information is likewise used in combination with the selected cognitive persona to generate one or more composite cognitive insights for a user. In various embodiments, the composite cognitive insights that are generated for a user as a result of using a first set of contextual information may be different than the composite cognitive insights that are generated as a result of using a second set of contextual information.

As an example, a user may have two associated cognitive personas, "purchasing agent" and "retail shopper," which are respectively selected according to two sets of contextual information. In this example, the "purchasing agent" cognitive persona may be selected according to a first set of contextual information associated with the user performing business purchasing activities in their office during business hours, with the objective of finding the best price for a particular commercial inventory item. Conversely, the "retail shopper" cognitive persona may be selected according to a second set of contextual information associated with the user performing cognitive personal shopping activities in their home over a weekend, with the objective of finding a decorative item that most closely matches their current furnishings. Those of skill in the art will realize that the composite cognitive insights generated as a result of combining the first cognitive persona with the first set of contextual information will likely be different than the composite cognitive insights generated as a result of combining the second cognitive persona with the second set of contextual information.

In various embodiments, the graph query 1744 results in the selection of a cognitive profile from a repository of cognitive profiles '1' through 'n' 1774 according to identification information associated with a user. As used herein, a cognitive profile refers to an instance of a cognitive persona that references personal data associated with a user. In various embodiments, the personal data may include the user's name, address, Social Security Number (SSN), age, gender, marital status, occupation, employer, income, education, skills, knowledge, interests, preferences, likes and dislikes, goals and plans, and so forth. In certain embodiments, the personal data may include data associated with the user's interaction with a CILS and related composite cognitive insights that are generated and provided to the user.

In various embodiments, the personal data may be distributed. In certain of these embodiments, subsets of the distributed personal data may be logically aggregated to generate one or more cognitive profiles, each of which is associated with the user. In various embodiments, the user's interaction with a CILS may be provided to the CILS as feedback 1762 data. Skilled practitioners of the art will recognize that many such embodiments are possible and the foregoing is not intended to limit the spirit, scope or intent of the invention.

In various embodiments, a cognitive persona or cognitive profile is defined by a first set of nodes in a weighted cognitive graph. In these embodiments, the cognitive persona or cognitive profile is further defined by a set of attributes that are respectively associated with a set of corresponding nodes in the weighted cognitive graph. In various embodiments, an attribute weight is used to represent a relevance value between two attributes. For example, a higher numeric value (e.g., '5.0') associated with an attribute weight may indicate a higher degree of relevance between two attributes, while a lower numeric value (e.g., '0.5') may indicate a lower degree of relevance.

In various embodiments, the numeric value associated with attribute weights may change as a result of the performance of composite cognitive insight and feedback 1762 operations described in greater detail herein. In one embodiment, the changed numeric values associated with the attribute weights may be used to modify an existing cognitive persona or cognitive profile. In another embodiment, the changed numeric values associated with the attribute weights may be used to generate a new cognitive persona or cognitive profile. In these embodiments, a cognitive profile is selected and then used by a CILS to generate one or more composite cognitive insights for the user as described in greater detail herein. In certain of these embodiments, the results of the one or more cognitive learning operations may likewise provide a basis for adaptive changes to the CILS, and by extension, the composite cognitive insights it generates.

In various embodiments, provision of the composite cognitive insights results in the CILS receiving feedback 1762 information related to an individual user. In one embodiment, the feedback 1762 information is used to revise or modify a cognitive persona. In another embodiment, the feedback 1762 information is used to revise or modify the cognitive profile associated with a user. In yet another embodiment, the feedback 1762 information is used to create a new cognitive profile, which in turn is stored in the repository of cognitive profiles '1' through 'n' 1774. In still yet another embodiment, the feedback 1762 information is used to create one or more associated cognitive profiles, which inherit a common set of attributes from a source cognitive profile. In another embodiment, the feedback 1762 information is used to create a new cognitive profile that combines attributes from two or more source cognitive profiles. In various embodiments, these persona and profile management operations 1776 are performed through interactions between the cognitive application 304, the repository of cognitive personas '1' through 'n' 1772, the repository of cognitive profiles '1' through 'n' 1774, the universal knowledge repository 1780, or some combination thereof. Those of skill in the art will realize that many such embodiments are possible and the foregoing is not intended to limit the spirit, scope or intent of the invention.

In various embodiments, a cognitive profile associated with a user may be either static or dynamic. As used herein, a static cognitive profile refers to a cognitive profile that contains identification information associated with a user that changes on an infrequent basis. As an example, a user's name, Social Security Number (SSN), or passport number may not change, although their age, address or employer may change over time. To continue the example, the user may likewise have a variety of financial account identifiers and various travel awards program identifiers which change infrequently.

As likewise used herein, a dynamic cognitive profile refers to a cognitive profile that contains information associated with a user that changes on a dynamic basis. For example, a user's interests and activities may evolve over time, which may be evidenced by associated interactions with the CILS. In various embodiments, these interactions result in the provision of associated composite cognitive insights to the user. In these embodiments, the user's interactions with the CILS, and the resulting composite cognitive insights that are generated, are used to update the dynamic cognitive profile on an ongoing basis to provide an up-to-date representation of the user in the context of the cognitive profile used to generate the composite cognitive insights.

In various embodiments, a cognitive profile, whether static or dynamic, is selected from the repository of cognitive profiles '1' through 'n' 1774 according to a set of contextual information associated with a user. In certain embodiments, the contextual information is likewise used in combination with the selected cognitive profile to generate one or more composite cognitive insights for the user. In one embodiment, the composite cognitive insights that are generated as a result of using a first set of contextual information in combination with the selected cognitive profile may be different than the composite cognitive insights that are generated as a result of using a second set of contextual information with the same cognitive profile. In various embodiments, one or more cognitive profiles may be associated with a user. In certain embodiments, the composite cognitive insights that are generated for a user as a result of using a set of contextual information with a first cognitive profile may be different than the composite cognitive insights that are generated as a result of using the same set of contextual information with a second cognitive profile.

As an example, a user may have two associated cognitive profiles, "runner" and "foodie," which are respectively selected according to two sets of contextual information. In this example, the "runner" cognitive profile may be selected according to a first set of contextual information associated with the user being out of town on business travel and wanting to find a convenient place to run close to where they are staying. To continue this example, two composite cognitive insights may be generated and provided to the user in the form of a cognitive insight summary 1248. The first may be suggesting a running trail the user has used before and liked, but needs directions to find again. The second may be suggesting a new running trail that is equally convenient, but wasn't available the last time the user was in town.

Conversely, the "foodie" cognitive profile may be selected according to a second set of contextual information associated with the user being at home and expressing an interest in trying either a new restaurant or an innovative cuisine. To further continue this example, the user's "foodie" cognitive profile may be processed by the CILS to determine which restaurants and cuisines the user has tried in the last eighteen months. As a result, two composite cognitive insights may be generated and provided to the user in the form of a cognitive insight summary 1748. The first may be a suggestion for a new restaurant that is serving a cuisine the user has enjoyed in the past. The second may be a suggestion for a restaurant familiar to the user that is promoting a seasonal menu featuring Asian fusion dishes, which the user has not tried before. Those of skill in the art will realize that the composite cognitive insights generated as a result of combining the first cognitive profile with the first set of contextual information will likely be different than the composite cognitive insights generated as a result of combining the second cognitive profile with the second set of contextual information.

In various embodiments, a user's cognitive profile, whether static or dynamic, may reference data that is proprietary to the user, an organization, or a combination thereof. As used herein, proprietary data broadly refers to data that is owned, controlled, or a combination thereof, by an individual user or an organization, which is deemed important enough that it gives competitive advantage to that individual or organization. In certain embodiments, the organization may be a governmental, non-profit, academic or social entity, a manufacturer, a wholesaler, a retailer, a service provider, an operator of a cognitive inference and learning system (CILS), and others.

In various embodiments, an organization may or may not grant a user the right to obtain a copy of certain proprietary information referenced by their cognitive profile. In certain embodiments, a first organization may or may not grant a user the right to obtain a copy of certain proprietary information referenced by their cognitive profile and provide it to a second organization. As an example, the user may not be granted the right to provide travel detail information (e.g., travel dates and destinations, etc.) associated with an awards program provided by a first travel services provider (e.g., an airline, a hotel chain, a cruise ship line, etc.) to a second travel services provider. In various embodiments, the user may or may not grant a first organization the right to provide a copy of certain proprietary information referenced by their cognitive profile to a second organization. Those of skill in the art will recognize that many such embodiments are possible and the foregoing is not intended to limit the spirit, scope or intent of the invention.

In various embodiments, a set of contextually-related interactions between a cognitive application 304 and the application cognitive graph 1782 are represented as a corresponding set of nodes in a cognitive session graph, which is then stored in a repository of cognitive session graphs '1' through 'n' 1752. As used herein, a cognitive session graph broadly refers to a cognitive graph whose nodes are associated with a cognitive session. As likewise used herein, a cognitive session broadly refers to a user, group of users, theme, topic, issue, question, intent, goal, objective, task, assignment, process, situation, requirement, condition, responsibility, location, period of time, or any combination thereof.

As an example, the application cognitive graph 1782 may be unaware of a particular user's preferences, which are likely stored in a corresponding user profile. To further the example, a user may typically choose a particular brand or manufacturer when shopping for a given type of product, such as cookware. A record of each query regarding that brand of cookware, or its selection, is iteratively stored in a cognitive session graph that is associated with the user and stored in a repository of cognitive session graphs '1' through 'n' 1752. As a result, the preference of that brand of cookware is ranked higher, and is presented in response to contextually-related queries, even when the preferred brand of cookware is not explicitly referenced by the user. To continue the example, the user may make a number of queries over a period of days or weeks, yet the queries are all associated with the same cognitive session graph that is associated with the user and stored in a repository of cognitive session graphs '1' through 'n' 1752, regardless of when each query is made.

As another example, a user may submit a query to a cognitive application 304 during business hours to find an upscale restaurant located close their place of business. As a result, a first cognitive session graph stored in a repository of cognitive session graphs '1' through 'n' 1752 is associated with the user's query, which results in the provision of composite cognitive insights related to restaurants suitable for business meetings. To continue the example, the same user queries the same cognitive application 304 during the weekend to locate a casual restaurant located close to their home. As a result, a second cognitive session graph stored in a repository of cognitive session graphs '1' through 'n' 1752 is associated with the user's query, which results in the provision of composite cognitive insights related to restaurants suitable for family meals. In these examples, the first and second cognitive session graphs are both associated with the same user, but for two different purposes, which results in the provision of two different sets of composite cognitive insights.

As yet another example, a group of customer support representatives is tasked with resolving technical issues customers may have with a product. In this example, the product and the group of customer support representatives are collectively associated with a cognitive session graph stored in a repository of cognitive session graphs '1' through 'n' 1752. To continue the example, individual customer support representatives may submit queries related to the product to a cognitive application 304, such as a knowledge base application. In response, a cognitive session graph stored in a repository of cognitive session graphs '1' through 'n' 1752 is used, along with the universal knowledge repository 1780 and application cognitive graph 1782, to generate individual or composite cognitive insights to resolve a technical issue for a customer. In this example, the cognitive application 304 may be queried by the individual customer support representatives at different times during some time interval, yet the same cognitive session graph stored in a repository of cognitive session graphs '1' through 'n' 1752 is used to generate composite cognitive insights related to the product.

In various embodiments, each cognitive session graph associated with a user and stored in a repository of cognitive session graphs '1' through 'n' 1752 includes one or more direct or indirect user queries represented as nodes, and the time at which they were asked, which are in turn linked 1754 to nodes that appear in the application cognitive graph 1782. In certain embodiments, each individual cognitive session graph that is associated with the user and stored in a repository of cognitive session graphs '1' through 'n' 1752 introduces edges that are not already present in the application cognitive graph 1782. More specifically, each of the cognitive session graphs that is associated with the user and stored in a repository of cognitive session graphs '1' through 'n' 1752 establishes various relationships that the application cognitive graph 1782 does not already have.

In various embodiments, individual cognitive profiles in the repository of cognitive profiles '1' through 'n' 1774 are respectively stored as cognitive session graphs in the repository of cognitive session graphs 1752. In these embodiments, nodes within each of the individual cognitive profiles are linked 1754 to nodes within corresponding cognitive session graphs stored in the repository of cognitive session graphs '1' through 'n' 1754. In certain embodiments, individual nodes within each of the cognitive profiles are likewise linked 1754 to corresponding nodes within various cognitive personas stored in the repository of cognitive personas '1' through 'n' 1772.

In various embodiments, individual graph queries 1744 associated with a session graph stored in a repository of cognitive session graphs '1' through 'n' 1752 are likewise provided to insight agents to perform various kinds of analyses. In certain embodiments, each insight agent performs a different kind of analysis. In various embodiments, different insight agents may perform the same, or similar, analyses. In certain embodiments, different agents performing the same or similar analyses may be competing between themselves.

For example, a user may be a realtor that has a young, upper middle-class, urban-oriented clientele that typically enjoys eating at trendy restaurants that are in walking distance of where they live. As a result, the realtor may be interested in knowing about new or popular restaurants that are in walking distance of their property listings that have a young, middle-class clientele. In this example, the user's queries may result the assignment of insight agents to perform analysis of various social media interactions to identify such restaurants that have received favorable reviews. To continue the example, the resulting composite insights may be provided as a ranked list of candidate restaurants that may be suitable venues for the realtor to meet his clients.

In various embodiments, the process 1708 component is implemented to provide these composite cognitive insights to the deliver 1730 component, which in turn is implemented to deliver the composite cognitive insights in the form of a cognitive insight summary 1748 to the cognitive application 304. In these embodiments, the cognitive platform 1710 is implemented to interact with an insight front-end 1756 component, which provides a composite insight and feedback interface with the cognitive application 304. In certain embodiments, the insight front-end 1756 component includes an insight Application Program Interface (API) 1758 and a feedback API 1760, described in greater detail herein. In these embodiments, the insight API 1758 is implemented to convey the cognitive insight summary 1748 to the cognitive application 304. Likewise, the feedback API 1760 is used to convey associated direct or indirect user feedback 1762 to the cognitive platform 1710. In certain embodiments, the feedback API 1760 provides the direct or indirect user feedback 1762 to the repository of models 1728 described in greater detail herein.

To continue the preceding example, the user may have received a list of candidate restaurants that may be suitable venues for meeting his clients. However, one of his clients has a pet that they like to take with them wherever they go. As a result, the user provides feedback 1762 that he is looking for a restaurant that is pet-friendly. The provided feedback 1762 is in turn provided to the insight agents to identify candidate restaurants that are also pet-friendly. In this example, the feedback 1762 is stored in the appropriate cognitive session graph 1752 associated with the user and their original query.

In various embodiments, the composite insights provided in each cognitive insight summary 1748 to the cognitive application 304, and corresponding feedback 1762 received from a user in return, is provided to an associated cognitive session graph 1752 in the form of one or more insight streams 1764. In these and other embodiments, the insight streams 1764 may contain information related to the user of the cognitive application 304, the time and date of the provided composite cognitive insights and related feedback 1762, the location of the user, and the device used by the user.

As an example, a query related to upcoming activities that is received at 10:00 AM on a Saturday morning from a user's home may return composite cognitive insights related to entertainment performances scheduled for the weekend. Conversely, the same query received at the same time on a Monday morning from a user's office may return composite cognitive insights related to business functions scheduled during the work week. In various embodiments, the information contained in the insight streams 1764 is used to rank the composite cognitive insights provided in the cognitive insight summary 1748. In certain embodiments, the composite cognitive insights are continually re-ranked as additional insight streams 1764 are received. Skilled practitioners of the art will recognize that many such embodiments are possible and the foregoing is not intended to limit the spirit, scope or intent of the invention.

Although the present invention has been described in detail, it should be understood that various changes, substitutions and alterations can be made hereto without departing from the spirit and scope of the invention as defined by the appended claims.

What is claimed is:

1. A system comprising:
a processor;
a data bus coupled to the processor; and
a non-transitory, computer-readable storage medium embodying computer program code for managing a cognitive graph of a universal knowledge repository, the non-transitory, computer-readable storage medium being coupled to the data bus, the computer program code interacting with a plurality of computer operations and comprising instructions executable by the processor and configured for: receiving data from a plurality of data sources;

processing the data from the plurality of data sources, the processing the data from the plurality of data sources identifying a plurality of knowledge elements; and, storing the knowledge elements within the cognitive graph as a collection of knowledge elements, the cognitive graph comprising integrated machine learning functionality, the machine learning functionality including cognitive functionality, the cognitive functionality using feedback to improve accuracy of knowledge stored within the cognitive graph, the cognitive graph seamlessly functioning with a cognitive inference and learning system, the cognitive inference and learning system comprising a cognitive platform, the cognitive platform comprising a plurality of agents, the plurality of agents comprising an enrichment agent and an insight agent, the enrichment agent performing enrichment operations on the data from the plurality of data sources, results of the enrichment operations being stored within the cognitive graph, the insight agent interacting with the cognitive graph to generate a cognitive insight, the storing universally representing knowledge obtained from the data, each knowledge element of the collection of knowledge elements being persisted in its original form, persisting a knowledge element in its original form comprises once a knowledge element is stored within the cognitive graph, the knowledge element is not deleted, overwritten or modified;

performing mapping operations on a query to generate query related knowledge elements, the mapping operations generating a set of parse trees using a parse rule set, the mapping operations comprising mapping structural elements to resolve ambiguity, the mapping operations comprising mapping structural elements of the query around a verb of the query, the mapping of the structural elements transforming the structural elements into words higher up an inheritance chain within the cognitive graph, the parse trees being ranked by a conceptualization ranking rule set, the parse trees representing ambiguous portions of the text of the query;

performing a conceptualization operation, the conceptualization operation identifying relationships of concepts identified from ranking the set of parse trees using the conceptualization ranking rule set, the conceptualization operations generating a set of conceptualization ambiguity options, the set of conceptualization ambiguity options being ranked using the conceptualization ranking rule set, top-ranked conceptualization options being stored in the cognitive graph;

submitting an insight agent query from the insight agent to the universal knowledge repository; and, providing matching results to the insight agent responsive to the insight agent query based upon a matching rule set and a plurality of answer related knowledge elements in the universal knowledge repository.

2. The system of claim 1, wherein the instructions executable by the processor further comprise instructions for:

generating a cognitive insight based upon the collection of knowledge elements stored within the cognitive graph.

3. The system of claim 1, wherein:

when a first knowledge element from the collection of knowledge elements conflicts with a second knowledge element from the collection of knowledge elements, both of the first knowledge element and the second knowledge element are stored within the cognitive graph.

4. The system of claim 3, wherein:

the first knowledge element comprises a first data source property and a first time stamp property;

the second knowledge element comprises a second data source property and a second time stamp property; and, the first knowledge element and the second knowledge element comprise characteristics of at least one of:

the first knowledge element is sourced from a first data source with an associated first time stamp is contradicted by the second knowledge element sourced from a second data source and associated with a second time stamp;

the first knowledge element sourced from the first data source with the associated first time stamp is contradicted by the second knowledge element sourced from the first data source and associated with a second time stamp;

the first knowledge element is sourced from a first data source with an associated first time stamp is contradicted by the second knowledge element sourced from a second data source and associated with a second time stamp, the associated first time stamp and associated second time stamp being substantially equivalent.

5. The system of claim 3, wherein:

a first knowledge element is found to be incorrect as a result of an addition of a second knowledge element being stored within the cognitive graph relating to a same subject.

6. A non-transitory, computer-readable storage medium embodying computer program code for managing a cognitive graph of a universal knowledge repository, the computer program code comprising computer executable instructions configured for:

receiving data from a plurality of data sources;

processing the data from the plurality of data sources, the processing the data from the plurality of data sources identifying a plurality of knowledge elements; and, storing the knowledge elements within the cognitive graph as a collection of knowledge elements, the cognitive graph comprising integrated machine learning functionality, the machine learning functionality including cognitive functionality, the cognitive functionality using feedback to improve accuracy of knowledge stored within the cognitive graph, the cognitive graph seamlessly functioning with a cognitive inference and learning system, the cognitive inference and learning system comprising a cognitive platform, the cognitive platform comprising a plurality of agents, the plurality of agents comprising an enrichment agent and an insight agent, the enrichment agent performing enrichment operations on the data from the plurality of data sources, results of the enrichment operations being stored within the cognitive graph, the insight agent interacting with the cognitive graph to generate a cognitive insight, the storing universally representing knowledge obtained from the data, each knowledge element of the collection of knowledge elements being persisted in its original form, persisting a knowledge element in its original form comprises once a knowledge element is stored within the cognitive graph, the knowledge element is not deleted, overwritten or modified;

performing mapping operations on a query to generate query related knowledge elements, the mapping operations generating a set of parse trees using a parse rule set, the mapping operations comprising mapping structural elements to resolve ambiguity, the mapping operations comprising mapping structural elements of the query around a verb of the query, the mapping of the structural elements transforming the structural elements into words higher up an inheritance chain within the cognitive graph, the parse trees being ranked by a conceptualization ranking rule set, the parse trees representing ambiguous portions of the text of the query;

performing a conceptualization operation, the conceptualization operation identifying relationships of concepts identified from ranking the set of parse trees using the conceptualization ranking rule set, the conceptualization operations generating a set of conceptualization ambiguity options, the set of conceptualization ambiguity options being ranked using the conceptualization ranking rule set, top-ranked conceptualization options being stored in the cognitive graph;

submitting an insight agent query from the insight agent to the universal knowledge repository; and, providing matching results to the insight agent responsive to the insight agent query based upon a matching rule set and a plurality of answer related knowledge elements in the universal knowledge repository.

7. The non-transitory, computer-readable storage medium of claim 6, wherein the instructions executable by the processor further comprise instructions for:

generating a cognitive insight based upon the collection of knowledge elements stored within the cognitive graph.

8. The non-transitory, computer-readable storage medium of claim 6, wherein the instructions executable by the processor further comprise instructions for:

when a first knowledge element from the collection of knowledge elements conflicts with a second knowledge element from the collection of knowledge elements, both of the first knowledge element and the second knowledge element are stored within the cognitive graph.

9. The non-transitory, computer-readable storage medium of claim 8, wherein:

the first knowledge element comprises a first data source property and a first time stamp property;

the second knowledge element comprises a second data source property and a second time stamp property; and, the first knowledge element and the second knowledge element comprise characteristics of at least one of:

the first knowledge element is sourced from a first data source with an associated first time stamp is contradicted by the second knowledge element sourced from a second data source and associated with a second time stamp;

the first knowledge element sourced from the first data source with the associated first time stamp is contradicted by the second knowledge element sourced from the first data source and associated with a second time stamp;

the first knowledge element is sourced from a first data source with an associated first time stamp is contradicted by the second knowledge element sourced from a second data source and associated with a second time stamp, the associated first time stamp and associated second time stamp being substantially equivalent.

10. The non-transitory, computer-readable storage medium of claim 8, wherein a first knowledge element is found to be incorrect as a result of an addition of a second knowledge element being stored within the cognitive graph relating to a same subject.

11. The non-transitory, computer-readable storage medium of claim 6, wherein the computer executable instructions are deployable to a client system from a server system at a remote location.

12. The non-transitory, computer-readable storage medium of claim 6, wherein the computer executable instructions are provided by a service provider to a user on an on-demand basis.

* * * * *